United States Patent
Igarashi et al.

(10) Patent No.: US 7,277,948 B2
(45) Date of Patent: Oct. 2, 2007

(54) NETWORK SYSTEM WITH DYNAMIC SERVICE PROFILE UPDATING FUNCTIONS

(75) Inventors: Yoichiro Igarashi, Kawasaki (JP); Shinya Yamamura, Fukuoka (JP); Mitsuaki Kakemizu, Kawasaki (JP); Kazunori Murata, Fukuoka (JP); Masaaki Wakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 911 days.

(21) Appl. No.: 09/759,183

(22) Filed: Jan. 12, 2001

(65) Prior Publication Data
US 2001/0053694 A1  Dec. 20, 2001

(30) Foreign Application Priority Data
Jan. 31, 2000 (JP) ............... 2000-022278

(51) Int. Cl.
*H04Q 7/20* (2006.01)
*G06F 15/16* (2006.01)

(52) U.S. Cl. ............ 709/227; 709/226; 709/202; 455/433; 370/331

(58) Field of Classification Search ........ 455/422, 455/456, 433, 435, 445, 515, 525, 552, 432, 455/432.3; 709/202, 227, 249, 226; 370/331
See application file for complete search history.

(56) References Cited

U.S. PATENT DOCUMENTS

| | | | | |
|---|---|---|---|---|
| 6,038,445 | A * | 3/2000 | Alperovich et al. | 455/432.1 |
| 6,134,446 | A * | 10/2000 | Sasuta et al. | 455/456.5 |
| 6,148,197 | A * | 11/2000 | Bridges et al. | 455/432.3 |
| 6,449,479 | B1 * | 9/2002 | Sanchez | 455/433 |
| 6,480,715 | B1 * | 11/2002 | Pentikainen | 455/433 |
| 6,556,823 | B2 * | 4/2003 | Clapton et al. | 455/433 |
| 6,622,016 | B1 * | 9/2003 | Sladek et al. | 455/432.3 |
| 6,708,033 | B1 * | 3/2004 | Linkola et al. | 455/440 |
| 6,731,932 | B1 * | 5/2004 | Rune et al. | 455/432.1 |

FOREIGN PATENT DOCUMENTS

JP 10093629 4/1998

OTHER PUBLICATIONS

"Route Optimization in Mobile IP" Internet draft 08. By Perkins, C., and Johnson, D. Feb. 25, 1999. Downloaded from www.ietf.org 27 pages.*

* cited by examiner

Primary Examiner—Saleh Najjar
Assistant Examiner—David Lazaro
(74) Attorney, Agent, or Firm—Katten Muchin Rosenman LLP

(57) ABSTRACT

A network system which provides each terminal user with differentiated service, dynamically changing service profiles even in the middle of a communication session. A service control database maintains service profile definitions. When a mobile node registers with a foreign agent to initiate a conmiunication session, a service profile setting controller in the mobile node's home server sets up a service profile for the mobile user. When an event occurs within a service profile updating controller, it indicates that some control condition specified in the service profile is met. The service profile updating controller then makes access to the service control database to obtain a new service profile and the mobile node's foreign server forwards it to the foreign agent, to which the mobile node is attached. The service profile that has been established in relevant network nodes, including the home agent and foreign agent, is dynamically updated with the new one.

11 Claims, 56 Drawing Sheets

| Data Items | Detailed Data Items | Description |
|---|---|---|
| 10-1 Profile Identifier | Session Identifier | Indicate session type |
| | Profile Number | Uniquely assigned to each session |
| 10-2 Packet Extraction Parameters | Source Address | Packet filtering rules |
| | Source Port No. | |
| | Destination Address | |
| | Destination Port No. | |
| 10-3 Routine/Packet Editing Parameters | Encapsulation (Encryption) Method | How to encapsulate packets to be routed |
| | Routing Address (Multiple Entries Allowed) | IP address of the next node |
| | Type of Service (TOS) | TOS field value to be set to IP header |
| | Decapsulation Command | Request for decapsulation |
| 10-4 Individual Control Data | Service Control Type | Designate which control table to search<br>- service profile cache<br>- binding cache<br>- MIP home (mobility binding)<br>- MIP foreign (visitor list)<br>- ANYCAST (extended visitor list)<br>- routing table |
| | Control Data Identifier | Pointer to an intended part of the table |

FIG. 6

| Service Profile Cache | | Description |
|---|---|---|
| SPC | Node-specific SPC (NSPC) | Source SPC (NSPCsrc) | A collection of service profiles to be used mainly for user-independent, common services. Indexed by source address information of data packets. Created by a mobility agent at the time of initial set-up, based on static information stored in hard drives and other storage devices of network equipment. |
| | | Source Default SP (NDSPsrc) | Service profile applied when there is a hit in NSPCsrc, but no hit in individual control tables. |
| | | Destination SPC (NSPCdst) | A collection of service profiles to be used mainly for user-independent, common services. Indexed by destination address information of data packets. Created by a mobility agent at the time of initial set-up, based on static information stored in hard drives and other storage devices of network equipment. |
| | | Destination Default SP (NDSPdst) | Service profile applied when there is a hit in NSPCdst, but no hit in individual control tables. |
| | | Default SP (NDSP) | Default service profile used when no hit is found. For retrieval of a network device-specific control table (routing table). |
| | AAA Communication (ASPC) | Source SPC (ASPCsrc) | A collection of user-specific service profiles. Indexed by source address information of data packets that are sent from AAA systems when a mobile node logs in to the network. |
| | | Destination SPC (ASPCdst) | A collection of user-specific service profiles. Indexed by destination address information of data packets that are sent from AAA systems when a mobile node logs in to the network. |

FIG. 7

| Search Order | Cache Class | Cache Search Result | Individual Control Data Search Result | Next Action |
|---|---|---|---|---|
| 1 | ASPCsrc | Hit | Hit | Normal end |
|   |   |   | No Hit | Abnormal end |
|   |   | No Hit |   | Search NSPCsrc |
| 2 | NSPCsrc | Hit | Hit | Normal end |
|   |   |   | No Hit | Search NDSPsrc |
|   |   | No Hit |   | Search ASPCdst |
| 3 | ASPCdst | Hit | Hit | Normal end |
|   |   |   | No Hit | Abnormal end |
|   |   | No Hit |   | Search NSPCdst |
| 4 | NSPCdst | Hit | Hit | Normal end |
|   |   |   | No Hit | Search NDSPdst |
|   |   | No Hit |   | Use NDSP |
| 5 | NDSP | Hit | Hit | Normal end |
|   |   |   | No Hit | Abnormal end |

| Item | Description |
|---|---|
| Session ID | <NAI of Mobile Node><32-bit Value><Optional Value> |
| Session Timer | Remaining lifetime of this transaction |

| Item | Description |
|---|---|
| Session ID | \<NAI of Mobile Node\>\<32-bit Value\>\<Optional Value\> |
| AAAH Address | IP address of AAAH identified by mobile node NAI |
| Home Agent Address | IP address of home agent allocated by AAAF |
| Previous Foreign Agent NAI | NAI of previous foreign agent to which the mobile node was attached |
| Current Foreign Agent NAI | NAI of foreign agent to which the mobile node is currently attached |
| SCR Requester Address | IP address of AAAH that is requesting SCR |
| Security Information | Authentication data for validate association between this AAAF and other entities (FA, AAAH, HA allocated by AAAH) |
| Session Timer | Remaining lifetime of this transaction |
| Foreign Agent Service Profile | See FIG. 3 |
| Home Agent Service Profile | See FIG. 3 |
| Current State | Waiting, HA requested, AMA in process, HA Change Requested, FA Change Requested |

FIG. 10

| Item | Description |
|---|---|
| Session ID | ⟨NAI of Mobile Node⟩⟨32-bit Value⟩⟨Optional Value⟩ |
| Home Agent Address | IP address of home agent allocated by AAAH |
| HA-managing AAAF Address | IP address of AAAF that is allowed by AAAH to allocate home agent |
| Current AAAF Address | IP address of AAAF requesting AMR |
| Previous AAAF Address | IP address of previously used AAAF |
| Address Proxy Address | IP address of address proxy in ANYCAST service |
| Security Information | Authentication data for validate association between this AAAH and other entities (HA, AAAF) |
| Session Timer | Remaining lifetime of this transaction |
| Address Proxy Server Address | IP address of address proxy server |
| Foreign Agent Service Profile | See FIG. 3 |
| Home Agent Service Profile | See FIG. 3 |
| Current State | Waiting, HA Requested, AMA in Process, HA Change Requested, FA Change Requested |

| Item | Description |
|---|---|
| Session ID | <NAI of Mobile Node><32-bit Value><Optional Value> |
| Session Timer | Remaining lifetime of this transaction |
| Mobility Binding | Pointer to mobility binding |
| SCR Request Flag | Flag indicating that service profile is being updated in correspondent node |
| SCR Requester Address | IP address of the entity requesting SCR |

| Item | Description |
|---|---|
| IP Source Address (Home Address) | Home address assigned to mobile node. Notified by registration request or AMA message |
| Link Layer Source Address of Mobile Node | Link layer (MAC) address of mobile node |
| UDP Source Port | UDP Source port of mobile node |
| Home Agent Address | Address of home agent. Provided in registration request or AMA message |
| Registration Request Identifier | Identifier used to associate between request and response |
| Lifetime | Valid period of registration request |
| Authentication Data | Authentication data used by foreign agent to authenticate requesting mobile node |

FIG. 13

| Item | Description |
|---|---|
| Home Address | Home address assigned to mobile node |
| Care-of Address of Mobile Node | IP address of foreign agent to which mobile node is currently attached |
| Correspondent Node with Route Optimization | IP address of correspondent node to which route optimization is being applied |
| Registration Request Identifier | Identifier used to associate between request and response |
| Lifetime | Valid Period of Registration Request |
| Authentication Data | Authentication data used by foreign agent to authenticate requesting mobile node |

FIG. 14

| Item | Description |
|---|---|
| User NAI | User's Network Access Identifier (NAI) |
| User Profile | User name, Address, Phone No. etc. |
| User Authentication Data | Mobile Node-AAA Authentication Key, SPI, User ID, Password |
| Service Level Agreement (SLA) | Service agreement with customer |
| Service-specific Profile | Diffserve, Packet Filtering, ANYCAST, Multi Cast, etc |

FIG. 15

| Service Class | Description |
|---|---|
| Class A | Maximum transmission delay is guaranteed to be within a prescribed tolerance |
| Class B | In Diffserv, high priority queuing is applied as long as it does not affect Class A traffic. May be divided into several subclasses, depending on Diffserv types |
| Class C | Best-effort service. Lower priority queuing than Class B. |

| Item | Description |
|---|---|
| Flat-rate Accounting (Fixed charge for limited hours, plus additional charge for excess hours) | (Service Class-dependent Basic Charge) + (Service Class-dependent Hourly Rate) * (Excess Hours) |
| Usage-based Accounting (Proportional to the amount of packets transferred) | Summation of [ (Servic Class-dependent Rate) * (Total Amount of Packets Transferred to/from Edge Node (Foreign Agent))] |

| Control Parameters | Description |
|---|---|
| Charge | System warns the user when the amount of service charges has exceeded a limit predefined by the user, prompting him/her to decide whether to continue the service. |
| Time | User may choose a more affordable service which is available only in low-traffic hours. User may choose variable-class service which provides different levels of service depending on the time of day. |
| Service Class | User may choose variable-class service which provides different levels of service depending on the type of applications, or type of packets, to minimize the usage-based charge. |
| Roaming Option | User may enable roaming option with additional cost. User may cut the cost by disabling roaming option. |

| Received Message | Criteria | Precessing Entity | Message to be transmitted | Protocol |
|---|---|---|---|---|
| Registration Request | with AAA extension | Foreign Agent | AMR | DIAMETER |
| Registration Request | without AAA extension | Foreign Agent | Registration Request | Mobile IP |
|  |  | Home Agent | Registration Reply | Mobile IP |
| Registration Response |  | Foreign Agent | Registration Reply | Mobile IP |
| AMA |  | Foreign Agent | Registration Reply | Mobile IP |
| HAR |  | Home Agent | HAA | DIAMETER |
| Binding Update |  | Foreign Agent, Correspondent Node | Binding Acknowledge | Mobile IP |
| Binding Acknowledge | SCR is present | Home Agent | SCA | DIAMETER |
| SFR |  | Foreign Agent, Home Agent | SFA | DIAMETER |
| SCR | with Previous-FA-NAI AVP | Foreign Agent | Binding Update, SCA | Mobile IP, DIAMETER |
|  | without Previous-FA-NAI AVP | Foreign Agent | SCA | DIAMETER |
|  | Binding Update for CN required | Home Agent | Binding Update | Mobile IP |
|  | No Binding Update for CN required | Home Agent | SCA | DIAMETER |

FIG. 26

| Processing Entity | Received Message | Control Table |
|---|---|---|
| Foreign Agent | Registration Request Message | Visitor List |
| | Binding Update Message | Binding Cache |
| Home Agent | Registration Request Message | Mobility Binding |
| Correspondent Node | Binding Update Message | Binding Cache |

| Message Received | Action to be Invoked | Criteria | Destination | Message to Send |
|---|---|---|---|---|
| AMR | Create session transaction | with Previous-FA-NAI AVP | AAAH | AMR |
| | | w/o Previous-FA-NAI AVP | Current Foreign Agent | AMA |
| AMA | Set service profile to session transaction | w/o Home-Agent-Address AVP | Home Agent | HAR |
| | | with Home-Agent-Address AVP | Current Foreign Agent | AMA |
| HAA | Set home agent address to session transaction | | Current Foreign Agent | AMR |
| SCR | Update service profile | w/o Home Agent allocation | Current Foreign Agent | SCR |
| | | with Home Agent allocation | Home Agent | SCR |
| SCA | Forward SCA message | in "HA Change Requested" state | Current Foreign Agent | SCR |
| | | in "FA Change Requested" state | AAAH | SCA |
| SFR | Forward SFR message | w/o Home Agent allocation | Current Foreign Agent | SFR |
| | | with Home Agent allocation | Home Agent | SFR |
| SFA | Terminate session transaction | in "HA Release Requested" state | Current Foreign Agent | SFR |
| | | in "FA Release Requested" state | AAAH | SFA |

| Message Received | Action to be Invoked | Criteria | Destination | Message to send |
|---|---|---|---|---|
| AMR | Create session transaction | w/o Home-Agent-Address AVP | Current AAAF | AMA |
| | | with Home-Agent-Address AVP | Home Agent | HAR |
| | | (Mobile node has roamed into different AAAF domain) and (Home agent has been allocated by previous AAAF) | Purevious AAAF | AMR |
| AMA | Forward AMA message | | Current AAAF | AMA |
| HAA | Set Home Agent address to session transaction | | Current AAAF | AMA |
| SCA | Forward SCA message | in "HA Change Requested" state | Current AAAF | SCR |
| SFR | Forward SFR message, and terminate session transaction | w/o Home Agent allocation | Requesting entity | SFA |
| | | with Home Agent allocation | Home Agent | SFR |
| SFA | Terminate session transaction | in "HA Release Requested" state | Current AAAF | SFR |

| NAI | Session ID | Condition |
|---|---|---|
| userA@domain1 | \<userA@domain1\>\<10.11.22.33.\>\<19991029013445\> | if $100≦ |
| userB@domain1 | \<userB@domain1\>\<10.11.22.33.\>\<19991029003445\> | if $150≦ |
| .. | .. | .. |
| userZ@domain1 | \<userZ@domain1\>\<10.12.23.4\>\<19991029091000\> | if $50≦ |

| Service Type | | Diffserv |
|---|---|---|
| Additional Information 1 | Diffserv Activation Policy | * |
| | Service Class | Class C |
| | Direction | Upstream |
| | IP Address | * |
| | Port No. | * |
| Additional Information 2 | Diffserv Activation Policy | Time : 23:00 to 08:00 |
| | Service Class | Class B |
| | Direction | Downstream |
| | IP Address | * |
| | Port No. | * |
| Additional Information 3 | Diffserv Activation Policy | Time : 08:00 to 23:00 |
| | Service Class | Class C |
| | Direction | Downstream |
| | IP Address | * |
| | Port No. | * |

FIG. 51

| Service Type | | Diffserv |
|---|---|---|
| Additional Parameters 1 | Diffserv Activation Policy | * |
| | Service Class | Class C |
| | Direction | Upstream |
| | IP Address | * |
| | Port No. | * |
| Additional Parameters 2 | Diffserv Activation Policy | * |
| | Service Class | Class B |
| | Direction | Downstream |
| | IP Address | * |
| | Port No. | * |
| Additional Parameters 3 | Diffserv Activation Policy | Amount of Charges ≧ $100 |
| | Service Class | Class C |
| | Direction | Downstream |
| | IP Address | * |
| | Port No. | * |

FIG. 52

| Service Type | Packet Filtering | |
|---|---|---|
| Filter Activation Policy | (IP Address) AND (Time 08:00 to 21:00) | |
| Additional Parameters | IP Address | XXX.XXX.*.* |
| | Port No. | * |

FIG. 53

NETWORK SYSTEM WITH DYNAMIC SERVICE PROFILE UPDATING FUNCTIONS

BACKGROUND OF THE INVENTION

1. Field of the Invention

The present invention relates to a network system, and more particularly to a network system which controls communication over Internet Protocol (IP) networks including a mobile domain.

2. Description of the Related Art

The rapid advancement of the Internet infrastructures in recent years has brought about increasingly high IP packet traffic. Stimulated by the proliferation of cellular telephones, the development of high-speed IP-based mobile communication environments is making considerable progress. It is also expected that the standardization and deployment of the International Mobile Telecommunications 2000 (IMT2000) specifications will accelerate these development trends. Such innovations have fueled the demands for more sophisticated IP services, including the provision of differentiated quality of service (QoS) classes for individual users, and the network-wide load distribution for WWW servers. The technological basis for those value-added services, however, has not yet been matured enough. To make the highly sophisticated services possible, it is necessary to develop several new techniques described below.

One of the demanded features for future mobile communication systems is a control mechanism that dynamically updates service control data (service profiles) according to various conditions and administrative policies. While it may be similar to what is implemented in the existing telephone networks, as in the Intelligent Network (IN) service, this feature is available in conventional mobile communication systems.

Another demand is related to how to make a profit in the Internet service business, under the pressure of gradual price reduction in the market of access networks. Seeking solutions, the telephone carriers and Internet service providers (ISPs) tend to shift their business to more application-specific, value-added service areas. The users, on the other hand, have their primary interests in gaining the best quality of service while paying less money. The problem is, however, that the quality of service is traffic load dependent. Even if a person subscribes to an expensive, high-quality communication service, he/she is merely paying extra money for the same service quality as other ordinary customers may receive, when the network is a low-traffic condition. In other words, it is difficult, in such low-traffic situations, for the telecom carriers and ISPs to boost their profits by providing different rate options.

For the above reason, a simple high QoS option is no longer an attractive feature for such Internet users who connect only in low-traffic time periods. In actuality, the best combination of QoS and price for one customer is not necessarily the best thing for other customers. Obviously, a plain old service menu will not work. It is rather necessary to develop a new service product that can be customized to meet the need of each individual customer, taking into consideration his/her life style, network usage patterns, and affordable costs. In addition to those requirements, such services have to be dynamically reconfigured even in the middle of a communication session over Mobile IP networks.

SUMMARY OF THE INVENTION

Taking the above into consideration, an object of the present invention to provide a network system which permits each terminal user to enjoy differentiated service with added values in an IP network including a mobile domain, dynamically changing service classes even in the middle of a communication session, based on customized control rules.

To accomplish the above object, according to the present invention, there is provided a network system which controls communication between a user terminal and a peer terminal thereof over a network including a mobile domain. This network system comprises the following functional entities: a home agent, a foreign agent, a service control database, a home server, and a foreign server. The home agent maintains the location of the user terminal and tunnels packets from the peer terminal for delivery to the user terminal. The foreign agent is a peer node of the home agent, which detunnels and delivers the packets to the user terminal that is visiting the foreign network. The service control database maintains a customizable service profile that defines what class of service to provide to the user terminal. The home server is located in a first administrative domain to which the user terminal belongs. It comprises a service profile setting controller and a service profile updating controller. When the user terminal registers with the foreign agent to initiate a communication session, the service profile setting controller retrieves a relevant service profile from the service control database, and it distributes and sets the service profile to the home agent and foreign agent as their initial service profile. The service profile updating unit generates an event signal locally, when a control condition described in the retrieved service profile is met. In response to this event signal, the service profile updating controller obtains a new service profile from the service control database, and distributes it to the home agent and foreign agent, so that the initial service profile will be replaced with the new service profile. The foreign server, located in a second administrative domain, forwards the initial service profile and new service profile from the home server to the foreign agent.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows an example of a service profile;

FIG. 7 shows the structure of service profile caches;

FIG. 8 shows an example of a searching policy management table;

FIG. 9 shows a session transaction held in a foreign agent;

FIG. 10 shows a session transaction held in an AAAF;

FIG. 11 shows a session transaction held in an AAAH;

FIG. 12 shows a session transaction held in a home agent;

FIG. 13 shows a visitor list;

FIG. 14 shows a mobility binding;

FIG. 15 shows a typical entry of a service control database;

FIG. 16 shows various QoS classes;

FIG. 17 shows a typical rate schedule;

FIG. 18 shows a list of control conditions;

FIG. 26 shows an action table that determines the behavior of a foreign agent, home agent, and correspondent node;

FIG. 27 shows the association between message types and management tables;

FIG. 32 shows often-used DIAMETER messages and how AAAF processes them;

FIG. 42 is a table which summarizes how the AAAH handles major DIAMETER messages;

FIG. 43 shows an example of a condition table;

FIGS. 51 to 53 show various service profiles;

DESCRIPTION OF THE PREFERRED EMBODIMENTS

Preferred embodiments of the present invention will be described below with reference to the accompanying drawings.

Figure 1:
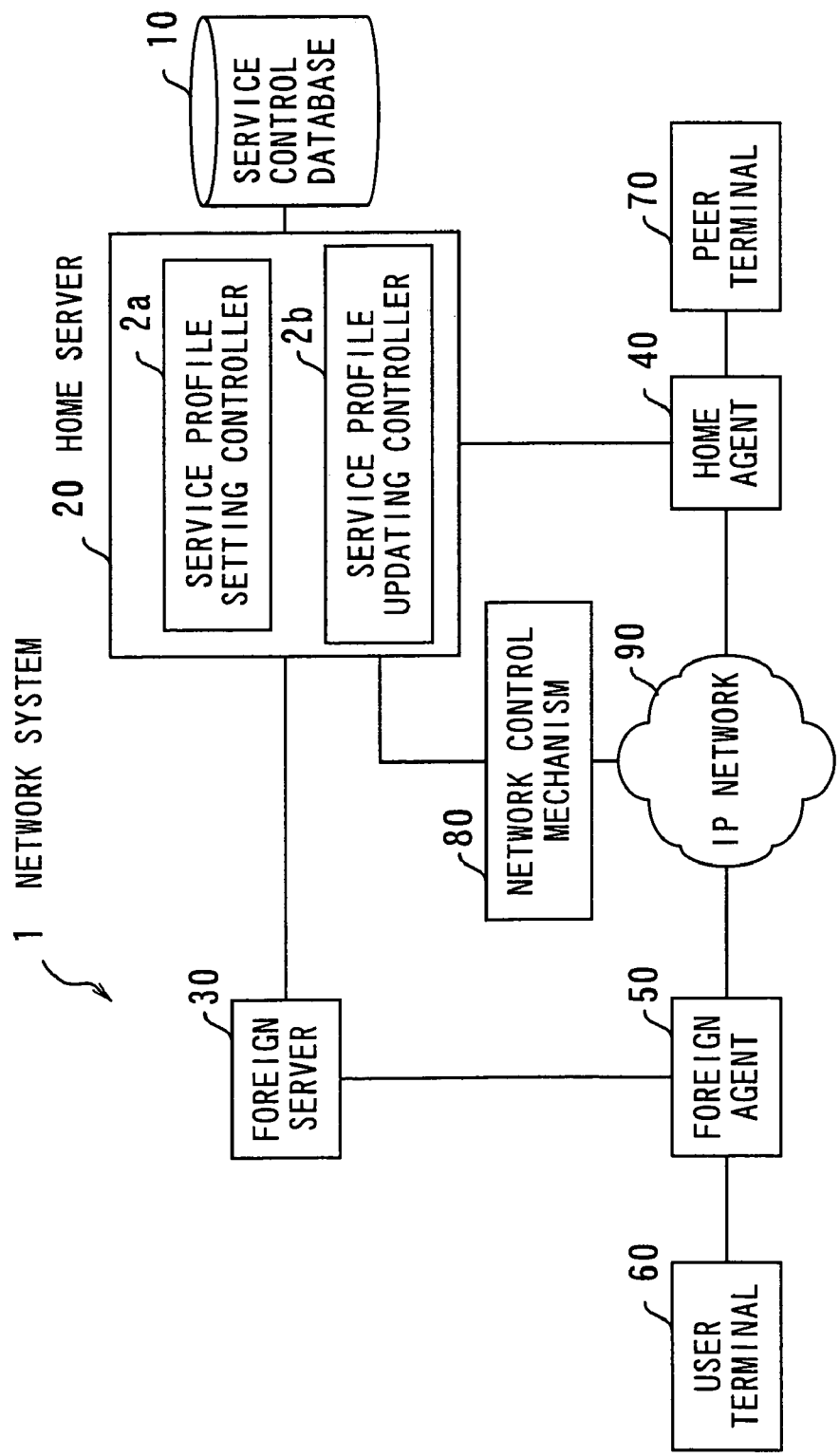
FIG. 1 is a conceptual view of a network system according to the present invention.

FIG. 1 shows a conceptual view of the present invention, where a network system 1 operates on an IP network infrastructure which includes wireless links providing a mobile environment, although they are not explicitly depicted. In this system 1, a home server 20 is linked with various functional entities including a service control database 10, a foreign server 30, a network control mechanism 80, and a home agent 40. The foreign server 30 is connected to a foreign agent 50. Further, the foreign agent 50, network control mechanism 80, and home agent 40 communicate over an IP network 90. A user terminal 60 is wirelessly attached to the IP network 90 through the foreign agent 50, acting as a mobile node in the system 1. A peer terminal 70 is a remote node with which the user terminal 60 communicates. This terminal 70 is linked to the home agent 40.

The service control database 10 maintains a service profile which defines what class of service to provide to the user terminal 60. The user can customize his own service profile by editing a relevant entry of the service control database 10 through an appropriate user interface offered by the system 1.

The home server 20 comprises a service profile setting controller 2a and a service profile updating controller 2b. When the user terminal 60 requests location registration to start a communication session, the service profile setting controller 2a makes access to the service control database 10 to extract its service profile. According to the retrieved service profile data, the service profile setting controller 2a configures relevant network devices by distributing an initial service profile to them. Such network devices include the home agent 40 and foreign agent 50, which are located along the packet route reaching the user terminal 60. The service profile updating controller 2b generates several kinds of event signals, based on the control conditions described in the retrieved service profile. When such an event occurs, it makes access to the service control database 10 to obtain a new service profile and dynamically reconfigures the relevant network devices by sending the new profile. More specific explanation for this service profile distribution will be provided in a later section with reference to FIGS. 2 and 3.

The home server 20 actually detects at least one of the following internal events: events related to user authentication, events related to network resource allocation, and events related to accounting. According to the content of those events, the service profile updating controller 2*b* produces and distributes an appropriate service profile to other network nodes.

The foreign server 30 is located in another administrative domain that is apart from the home domain of the user terminal 60. It serves the user terminal 60 through the foreign agent 50, a network node acting as a mobility agent in that domain. More specifically, it forwards a service profile to the foreign agent 50.

The home agent 40 serves the peer terminal 70, with which the user terminal 60 is communicating. That is, the peer terminal 70 (without route optimization) passes IP packets to the home agent 40, wishing to deliver them to the mobile node 60. Maintaining the current location of the user terminal 60, the home agent 40 tunnels the IP packets for delivery to the terminal 60. The foreign agent 50 detunnels and delivers the IP packets to the user terminal 60. The home agent 40 and foreign agent 50 apply a new service profile for the user terminal 60 when it is supplied from the home server 20.

The network control mechanism 80 monitors and administrates the IP network 90. It signals the home server 20 when some particular event is detected in itself. This event signal causes the home server 20 to initiate an update of relevant service profiles. That is, a service profile updating procedure is triggered by such external events, besides the home server 20's internal events described earlier.

Figure 2:
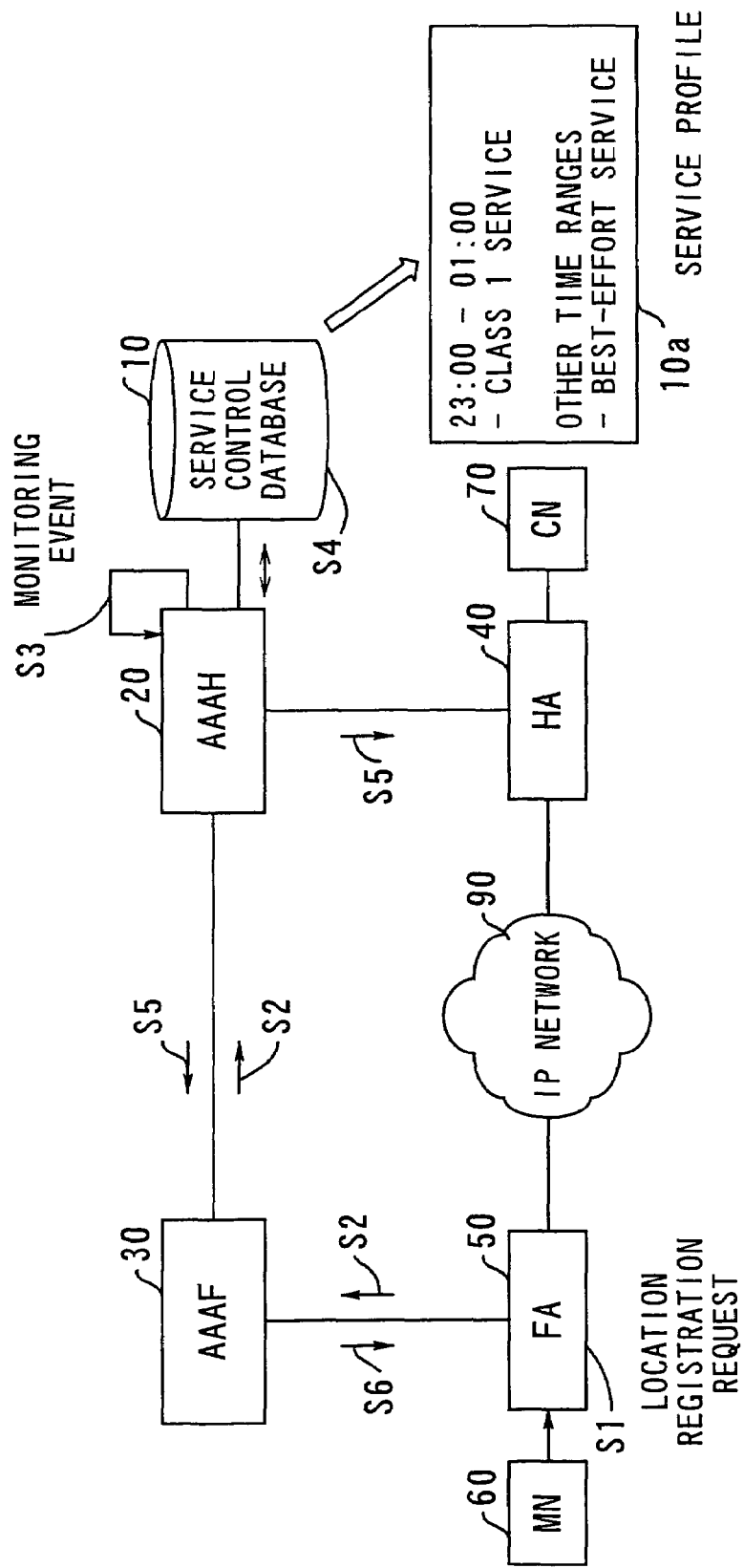
FIG. 2 shows how a service profile is distributed to network nodes.
Figure 3:
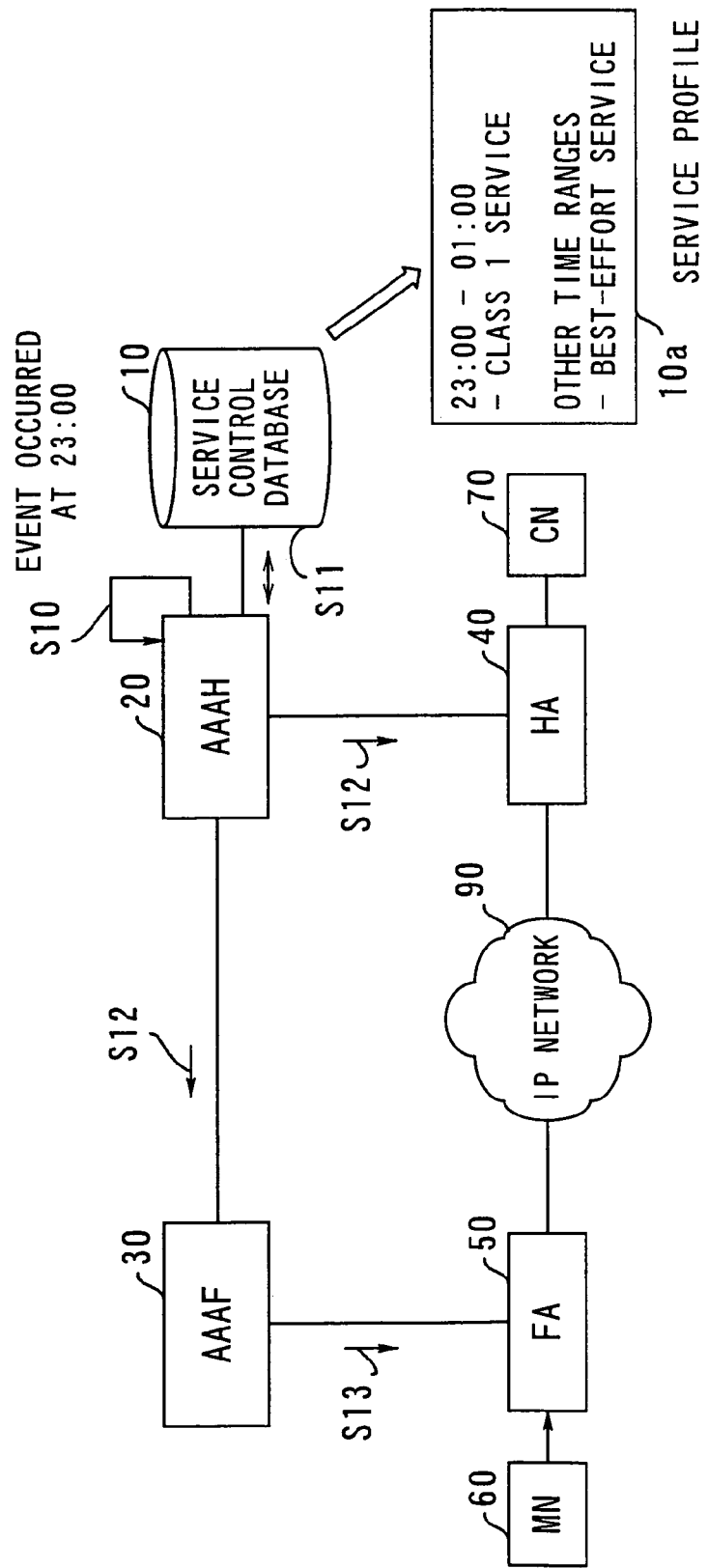
FIG. 3 shows how the service profile is updated.

Referring next to FIGS. 2 and 3, a process to set up a service profile is depicted. FIG. 2 shows how a service profile is defined when the user terminal 60 registers its location with the foreign agent 50. While being modeled on the structure explained in FIG. 1, the system shown in FIGS. 2 and 3 omits the network control mechanism 80, and its several functional entities are designated by different names in accordance with the terminology of IP mobility and "Authentication Authorization Accounting" (AAA) frame work. First, the home server 20 in FIG. 1 is called the "AAA Home" (AAAH) 20 in FIGS. 2 and 3. Second, the foreign server 30 in FIG. 1 is called the "AAA Foreign" (AAAF) 30. Third, the user terminal 60 in FIG. 1 is called a mobile node (MN) 60. Fourth, the peer terminal 70 in FIG. 1 is called a "correspondent node" (CN) 70. Further, the acronyms "HA" and "FA" are seen in FIGS. 2 and 3, denoting "home agent" and "foreign agent," respectively.

As its name implies, the AAAH 20 is an AAA server that covers the home network of the mobile node 60. The foreign server 30 is another AAA server that serves a foreign network where the mobile node 60 is currently visiting. The administrative data about the mobile node 60 is maintained not in the AAAF 30, but primarily in the AAAH 20.

In the illustrated network system 1, the service control database 10 contains a service profile 10*a*, which specifies that the system is to provide the user with Class-1 communication service during the time period from 23:00 to 01:00, while offering best-effort service in the remaining hours. That is, the system refers to the time of day as a control condition in order to provide different levels of service. The following sequence will describe how the proposed system configures itself according to a given service profile.

(S1) In an attempt to communicate with the correspondent node (CN) 70, the mobile node (MN) 60 makes a location registration through the nearest foreign agent 50. It is assumed that this access has occurred at 20:30.

(S2) The issued registration request is routed from the foreign agent 50 to the AAAF 30, and then to the AAAH 20.

(S3) Upon receipt of the request, the AAAH 20 programs a timer event since a time-sensitive control condition (i.e., the time of day) is specified in the service profile.

(S4) The home server 20 makes access to the service control database 10 to extract the service profile 10*a*.

(S5) Because the present time does not fall within the specified time range (23:00 to 01:00), the AAAH 20 produces and sends a best-effort service profile to the AAAF 30 and home agent 40.

(S6) The AAAF 30 forwards the best-effort service profile to the foreign agent 50.

Through the above processing steps, the foreign agent 50 and home agent 40 are configured to operate in the best-effort mode. This mode allows the mobile node 60 to communicate with the correspondent node 70 via the IP network 90, although no specific parameters or assurance for the quality of service is provided, hence the best effort.

FIG. 3 shows an example of how the service profile is updated when a new service control condition becomes effective.

(S10) The mobile node 60 is still continuing the session with the correspondent node 70. At 23:00, the AAAH 20 generates a timer event as previously programmed.

(S11) Upon the timer event, the AAAH 20 makes access to the service control database 10 to extract the service profile 10*a* again.

(S12) Since the time range specified in the service profile 10*a* has been reached, the AAAH 20 produces and sends a new service profile to the AAAF 30 and home agent 40, requesting them to enable the Class-1 quality of service.

(S13) The AAAF 30 forwards the Class-1 service profile to the foreign agent 50.

Through the above processing steps, the foreign agent 50 and home agent 40 are configured to operate in the Class-1 service mode. This mode permits the mobile node 60 to communicate with the correspondent node 70 via the IP network 90, enjoying the quality of Class-1 service.

As has been explained above, according to an aspect of the present invention, the network system 1 is designed to dynamically adapt to a change in the service control conditions even in the middle of a communication session, by delivering a new service profile to the relevant network devices. Conventionally, the service profile defined at the time of location registration is used by the network devices until the mobile node leaves the network. It is therefore impossible to reconfigure the network devices even when the service profile has to be changed. Unlike the conventional systems, the present invention permits a new service profile to be applied to relevant network devices when any of the control conditions defined in the profile is met. This mechanism is not restricted to the stage of mobile node's location registration, but can work at any time, thus permitting the system to provide customers with more sophisticated services.

Figure 4:
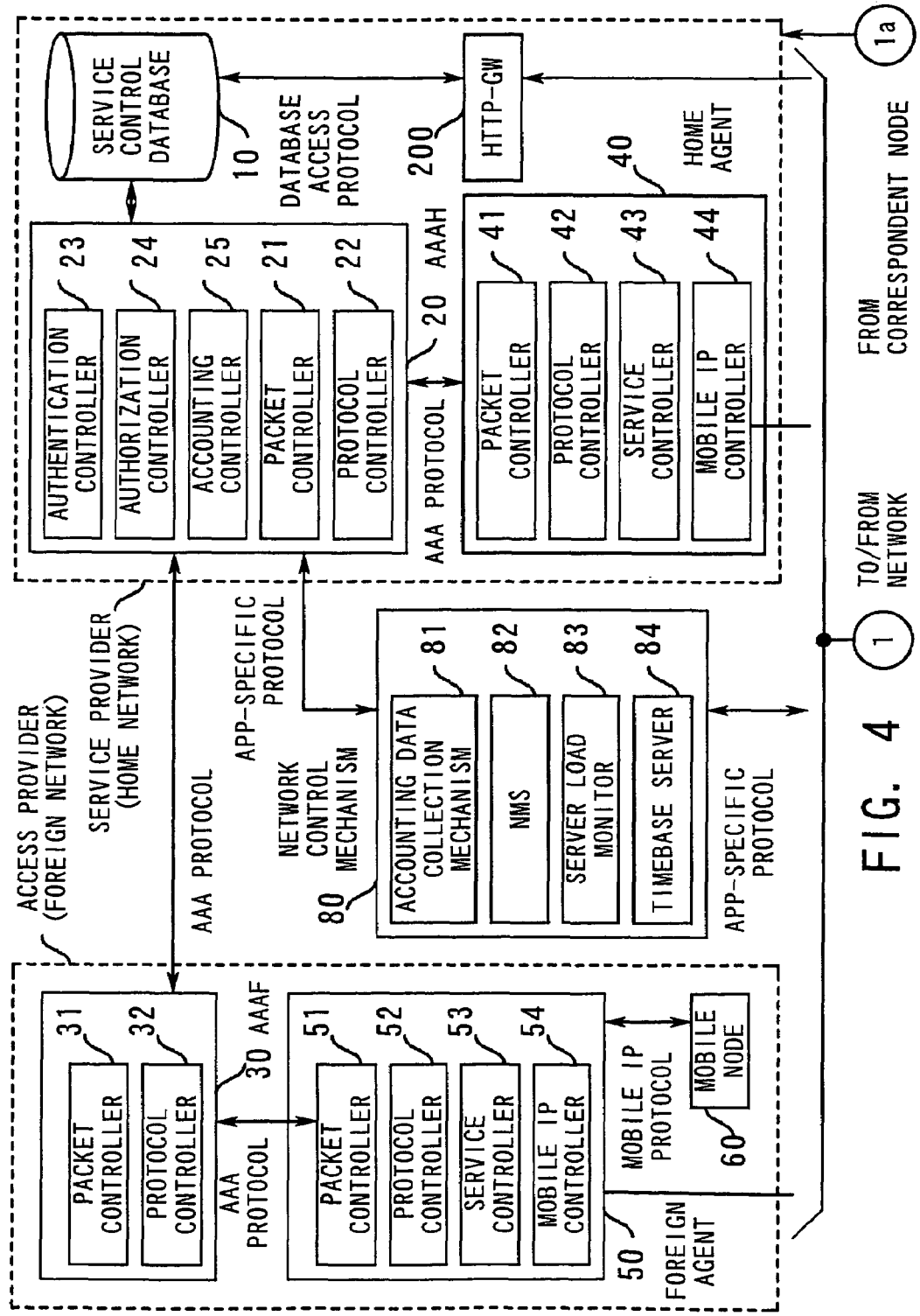
FIGS. 4 and 5 show functional blocks constituting the proposed network system.
Figure 5:
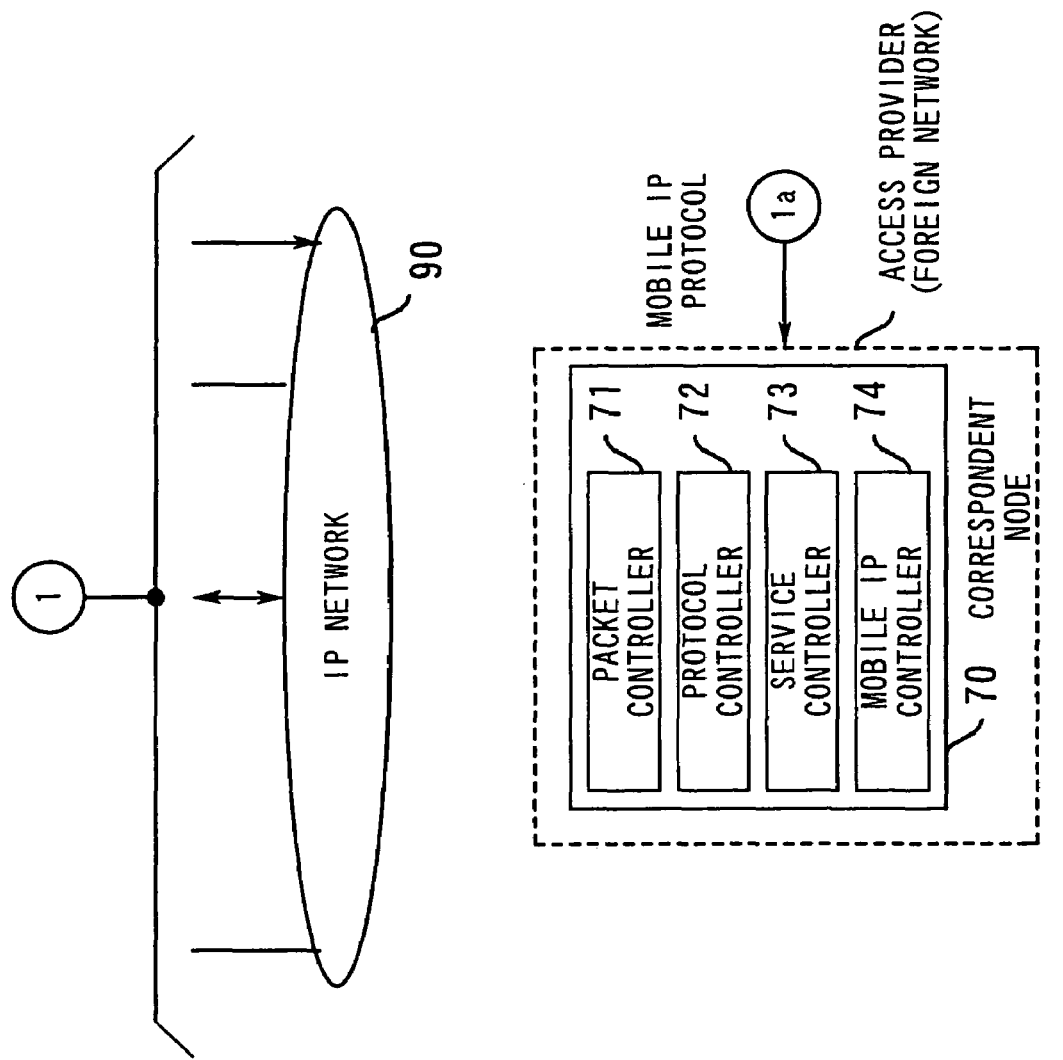

The following section will explain the structure and operation of the proposed network system 1 in greater detail. FIGS. 4 and 5 show major functional blocks of the system 1. The service control database 10, AAAH 20, and home agent (HA) 40 are shown on the right-hand side of FIG. 4 as functional entities of the service provider that serves the mobile node's home network. Hyper Text Transfer Protocol-Graphics Windowing (HTTP-GW) 200 is another entity of the service provider. The AAAF 30 and foreign agent (FA) 50 are located on the left-hand side of FIG. 4. These are functional entities of the access provider, which serve a foreign network the mobile node (MN) 60 is currently visiting. Conceptually, the correspondent node 70 (FIG. 5) is located on the service provider's side.

The AAAH 20 comprises: a packet controller 21, a protocol controller 22, an authentication controller 23, an authorization controller 24, and an accounting controller 25. The functions of the service profile setting controller 2a and service profile updating controller 2b described earlier in FIG. 1 are distributed in the above components of the AAAH 20. The AAAF 30, on the other hand, comprises a packet controller 31 and a protocol controller 32, which cooperatively provide a mobile node interfacing function to link with the mobile node 60. They also provide a service profile forwarding function to deliver a service profile to relevant network devices.

The home agent 40 comprises a packet controller 41, protocol controller 42, a service controller 43, and a Mobile IP controller 44. These components work together to provide a correspondent node interfacing function to link with the correspondent node 70. They also provide a tunneling control function to tunnel IP packets for delivery to the mobile node 60, maintaining the mobile node's current location even when it is away from home. They further provide a service profile updating function to reconfigure the home agent 40 with a new service profile.

Similarly to the above home agent 40, the foreign agent 50 comprises a packet controller 51, a protocol controller 52, a service controller 53, and a Mobile IP controller 54. These components cooperate to provide a mobile node interfacing function to allow the visiting mobile node 60 to attach itself to the network. They also provide a detunneling control function to detunnel and deliver IP packets to the mobile node 60, as well as a service profile updating function to update the service profile for the mobile node 60.

The network control mechanism 80 comprises an accounting data collection mechanism 81, a network management system (NMS) 82, a server load monitor 83, and a timebase server 84. The correspondent node 70 comprises a packet controller 71, a protocol controller 72, a service controller 73, and a Mobile IP controller 74. The details of those components will be described later.

The service control database 10 comprises a service profile storage unit and a service profile manager (both not shown in FIG. 4). The service profile storage unit stores customized service profiles which defines what class of service to provide to each mobile node. The service profile manager sets up and maintains those service profiles.

The term "Mobile IP protocol" refers to all protocol specifications defined in the Internet standard RFC2002, entitled "IP Mobility Support," and any other future extensions thereof. The mobile node 60 is a mobile terminal having Mobile IP protocol functions. The correspondent node 70, a peer node of the mobile node 60, is also equipped with the Mobile IP functionality.

AAA protocol is the standard specifications used by a group of servers that provide what the Internet Engineering Task Force (IETF) calls "Authentication, Authorization, and Accounting (AAA) services." The AAA services may be implemented by using various protocols that transport AAA information and network policies. The present invention assumes the use of DIAMETER protocol that the IETF is currently evaluating. In the present invention, the AAA capabilities are provided by three dedicated control blocks, i.e., authentication controller 23, authorization controller 24, and accounting controller 25.

According to the present invention, some new parameters have to be exchanged between the AAA facilities. To this end, the proposed system uses Attribute Value Pairs (AVPs) defined in the DIAMETER protocol specifications to transport extended attributes. The present invention proposes some extended attributes for the distribution of service definition policies and its related parameters. The present invention also proposes several new messages to dynamically update the service profiles.

The service control database 10 is accessible through the use of an appropriate database access protocol. What type of protocol to use is dependent on the choice of which database system product to use to implement the service control database 10. The Light Directory Access Protocol (LDAP) is a typical protocol suitable for the purpose.

Referring to the AAAH 20 in FIG. 4, the authentication controller 23 performs authentication of a mobile user, retrieving relevant authentication data from the service control database 10 by using his/her Network Access Identifier (NAI) as a search keyword. The accounting controller 25 stores accounting records of each user. When an event monitoring request command for a specific user is received from the authorization controller 24, it begins to monitor that user's accounting records. If a particular condition is met, the accounting controller 25 generates and sends a corresponding event signal to the authorization controller 24.

The authorization controller 24 is triggered by the authentication controller 23 when it has successfully finished the user authentication. The authorization controller 24 first retrieves the service profile of the user from the service control database 10. It determines whether to provide, or not to provide the user with each service, referring to its administrative policy. For each authorized service, it then produces a service profile to be applied to relevant network devices (i.e., foreign agent 50 and home agent 40). The details of the service profile will be discussed later with reference to FIG. 6. If the policy requires the system to detect some particular conditions, the authorization controller 24 configures the network control mechanism 80 and/or accounting controller 25 so that they will generate an event signal when such a condition is satisfied.

The foreign agent 50 is defined in RFC2002 as a functional entity which serves the visiting mobile node 60. While it is not aware of the home address of the mobile node 60, the foreign agent 50 handles IP packets directed to its "care-of address" (i.e., the address of the foreign agent 50 itself). It receives encapsulated packets and decapsulates them for delivery to a link layer address that is associated with the mobile node 60's home address.

The home agent 40 is another functional entity defined in RFC2002. It holds the home address of the mobile node 60 and receives IP packets directed to this address. Those packets are encapsulated and sent out toward the foreign agent care-of address that is associated with the mobile node 60's home address. In the Mobile IP terminology, this association is called a "mobility binding."

The network control mechanism 80 refers collectively to various network control functions including hardware and software for supervising and administering the network. Although their details are not presented, FIG. 4 shows several major functional blocks related to the invention: an accounting data collection mechanism 81, a network management system (NMS) 82, a server load monitor 83, and a timebase server 84. The accounting data collection mechanism 81 measures the data packet traffic and calculates the amount to be billed. The server load monitor 83 monitors the burden imposed on the servers. The timebase server 84 provides a unified clock signal over the network, hence the timebase. Those elements of the network control mechanism 80 communicate with the AAAH 20 and other network elements on the IP network 90 by using their respective application-specific protocols, such as SNMP, COPS, DIAMETER, RADIUS, NTP, Telnet, and CL.

The HTTP-GW 200 is an application interface which allows the ISP operator or user to manipulate the service control database 10 directly. The present invention proposes the use of web-based interface for this purpose.

Referring next to FIG. 6, an example of service profile definitions will be explained. The illustrated service profile is broadly divided into the following sections: "Profile Identifier" 10-1, "Packet Extraction Parameters" 10-2, "Routing/Packet Editing Parameters" 10-3, and "Individual Control Parameters" 10-4. The Profile Identifier section 10-1 gives a couple of parameters that make each individual service profile uniquely distinguishable from others. The Packet Extraction Parameters section 10-2 defines a packet filter that extracts any relevant packets out of the incoming packets that are received. The Routing/Packet Editing Parameters section 10-3 contains information about how to manipulate the IP header of each packet that falls within the filtering rule specified in the Packet Extraction Parameters section 10-2, as well as about where those packets should be routed. The "Individual Control Parameters" section 10-4 provides a list of tables that will be consulted to process the packets extracted by the aforementioned packet filter. The following will provide further details of those parameters.

Referring first to the Profile Identifier section 10-1 of FIG. 6, the profile identifier is shared by relevant functional entities on the network to locate an appropriate service profile pertaining to a particular user session, as well as to identify which specific services are needed in that user session. It consists of a session identifier (session ID) and a profile number which is unique to each individual session. The session ID format complies with the Session-Id Attribute Value Pair (AVP) defined in the DIAMETER protocol. In the present invention, the format should be as follows:

<NAI of Mobile Node><32-bit Value><Optional value>

In the Packet Extraction Parameters section 10-2 of FIG. 6, a packet filter is defined by the IP address and port number of the source and destination nodes. The wildcard character "*" may be used in the IP address designation (as in "172.27.180.*" or "172.27.*.*") to represent a part that can be replaced with any value. The source and destination IP addresses and port numbers of each incoming packet are compared with the above parameters individually, and then the results are ANDed to determine whether all the four values match with the parameters.

The Routing/Packet Editing Parameters section 10-3 of FIG. 6, on the other hand, specifies the following items: encapsulation (or encryption) method, forward address(es), type of service (TOS) parameter, and decapsulation switch. The encapsulation (or encryption) method and forward address specified here would be used to encapsulate and tunnel the packets without using an individual control table. Packet transfer to the care-of address of the mobile node 60 is performed according to a mobility binding, whose details will be described later. The TOS parameter, if specified, is set to the TOS field of the IP header of a packet. This is applied to both the packets filtered by the Packet Extraction Parameters section 10-2 and those edited with individual control parameters (e.g., those encapsulated through the use of a mobility binding). The decapsulation switch specifies whether to decapsulate the packets filtered by the Packet Extraction Parameters section 10-2. The decapsulation, when enabled, will be done before searching an individual control table.

The individual control parameters section 10-4 contains the following two parameters: service control type and control data identifier. The service control type refers to the type of a control table that is to be searched subsequently, and the control data identifier is an identifier or pointer that gives a link to an entry of the intended table. More specifically, the individual control tables include: service profile caches, Mobile IP-specific control data tables (e.g., binding cache, mobility binding, visitor list), a routing table, and service-specific control data tables (e.g., ANYCAST table). A particular entry of one of those tables is located by the control data identifier.

FIG. 7 shows the structure of service profile caches, and FIG. 8 gives an example of a searching policy management table used when searching them. The service profile caches (SPCs) 501 listed in FIG. 7 include SPCs for user-specific services, in addition to SPCs for common services. They are basically independent of each other; there is no inherent priority relationship implied among them. The searching policy management table 502 of FIG. 8 defines in what order the caches 501 would be searched, depending on the implementation. Typically, the search range is expanded from user-specific service profiles to common service profiles.

FIGS. 9 to 12 depicts session transactions held at network entities to maintain a linkage between DIAMETER messages transmission and a service profile. More specifically, FIG. 9 shows a session transaction 511 held in the foreign agent 50. FIG. 10 shows a session transaction 512 in the AAAF 30. FIG. 11 shows a session transaction 513 in the AAAH 20. FIG. 12 shows a session transaction 514 in the home agent 40.

All mobile nodes visiting the foreign agent 50 are registered in a visitor list. FIG. 13 shows an entry of the visitor list held in the foreign agent 50. This visitor list entry 520 is represented in table form, whose contents include the association between the IP address (home address) and the link layer address of the mobile node 60.

FIG. 14 shows a mobility binding in table form. As previously noted, IP packets directed to the mobile node 60's home address are redirected by the home agent 40 to the IP address of the foreign agent 50 that the mobile node 60 is currently visiting, the latter address being referred to as the care-of address. The mobility binding table 521 of FIG. 14 associates the home address and the care-of address, allowing the home agent 40 to encapsulate and tunnels those packets toward the foreign agent 50. The present invention enhances this the mobility binding table 521 by adding a record field for storing the IP address of a correspondent node 70 with which the mobile node 60 is currently communicating by using a route optimization capability. The "Route Optimization" is an extension to the Mobile IP protocol, which informs the correspondent node 70 of the care-of address of the mobile node 60 by sending a Binding Update message, so that the correspondent node 70 will be able to send packets directly to the mobile node 60, without having to go to the home agent 40 first. According to the present invention, the home agent 40 records the IP address of the correspondent node 70 when a route optimization procedure takes place, and uses that information to locate Because of the above enhanced mobility binding function, the present invention does not depend on the type of a signaling procedure being used.

FIG. 15 shows an example of an entry of the service control database 10. Services are provided under a Service Level Agreement (SLA) between the user and his/her Internet service provider. There may be various SLA specifications, such as a Quality of Service (QoS) table 531 in FIG. 16, a rate schedule table 532 in FIG. 17, and a control condition table 533 in FIG. 18.

Figure 19:
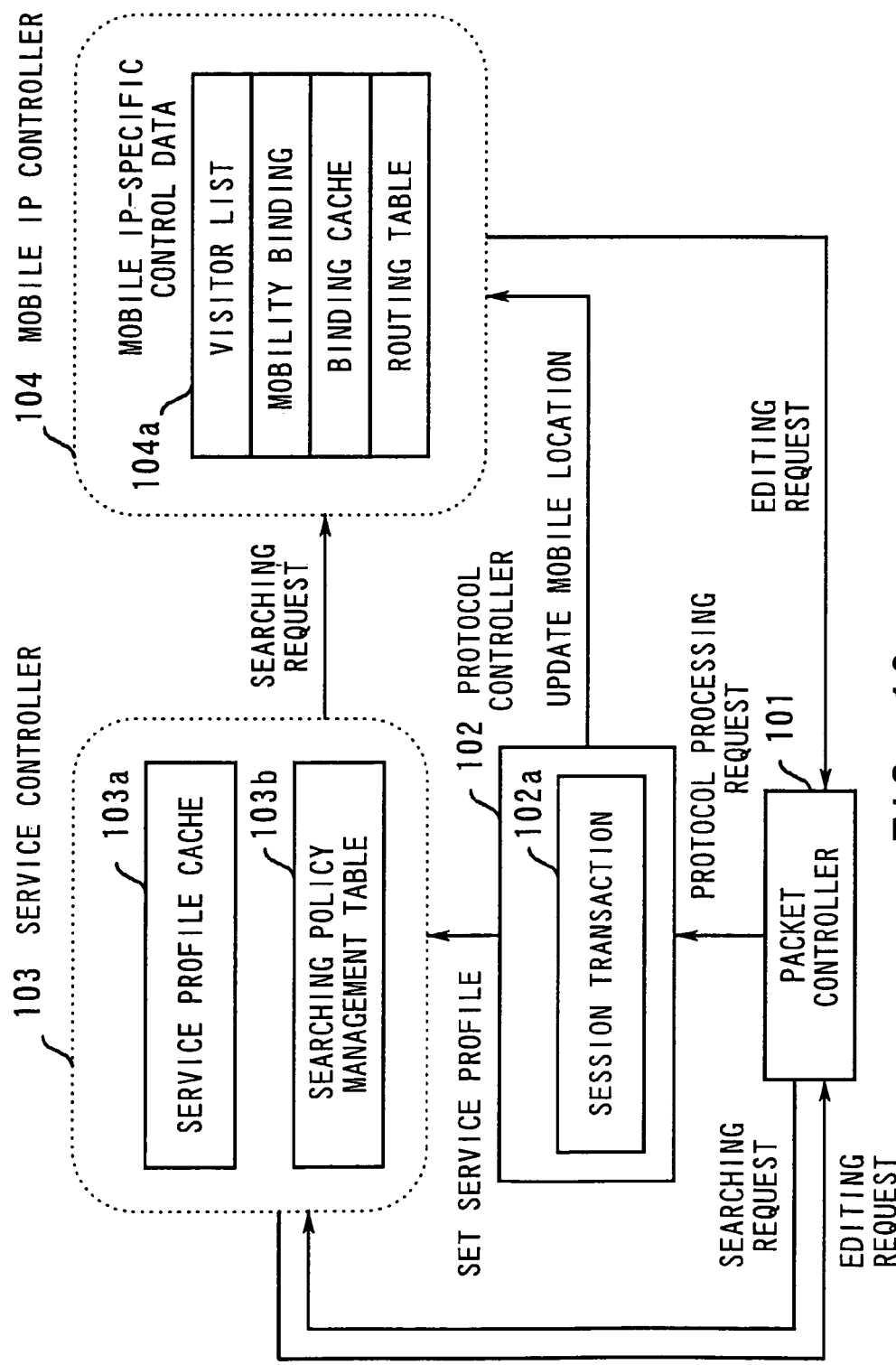
FIG. 19 shows functional blocks of a foreign agent, home agent, and correspondent node.

Referring now to the block diagram of FIG. 19, the details of the foreign agent 50, home agent 40, and correspondent node 70 will be explained. FIG. 19 shows a packet controller 101, a protocol controller 102, a service controller 103, and a Mobile IP controller 104, which represent functional elements that have been briefly explained earlier in FIGS. 4 and 5. More specifically, the packet controller 101 in FIG. 19 represents the packet controllers 41, 51, and 71 in FIGS. 4 and 5. Likewise, the protocol controller 102 represents the protocol controllers 42, 52, and 72. The service controller 103 represents the service controllers 43, 53, and 73.

The packet controller 101 has a packet filtering function which decodes the header information of each packet to determine whether it is a data packet or protocol packet. It also edits and forwards the packets to the next node according to the instructions from the service controller 103.

The protocol controller 102 processes Mobile IP and DIAMETER protocol messages. According to the protocol specifications, it extracts necessary information from the received messages and sets it to the service-specific control data maintained in the Mobile IP controller 104. The protocol controller 102 has a session transaction 102a to manage DIAMETER sessions, receiving and updating service profiles stored in its local service profile cache.

The service controller 103 employs a service profile cache 103a storing a collection of service profiles and a searching policy management table 103b describing the procedure of service profile searching.

The Mobile IP controller 104 maintains Mobile IP-specific control data 104a, which may include the following lists and tables: a visitor list, mobility bindings, a binding cache, and a routing table. More specifically, the foreign agent 50 has a visitor list to manage the visitors that need Mobile IP support. The home agent 40 maintains the current mobility bindings. The home agent 40 and foreign agent 50 have a binding cache and a routing table. The routing tables are configured differently in each router (i.e., home agent 40 and foreign agent 50) to determine an appropriate path to be used for transmission of a packet.

Figure 20:
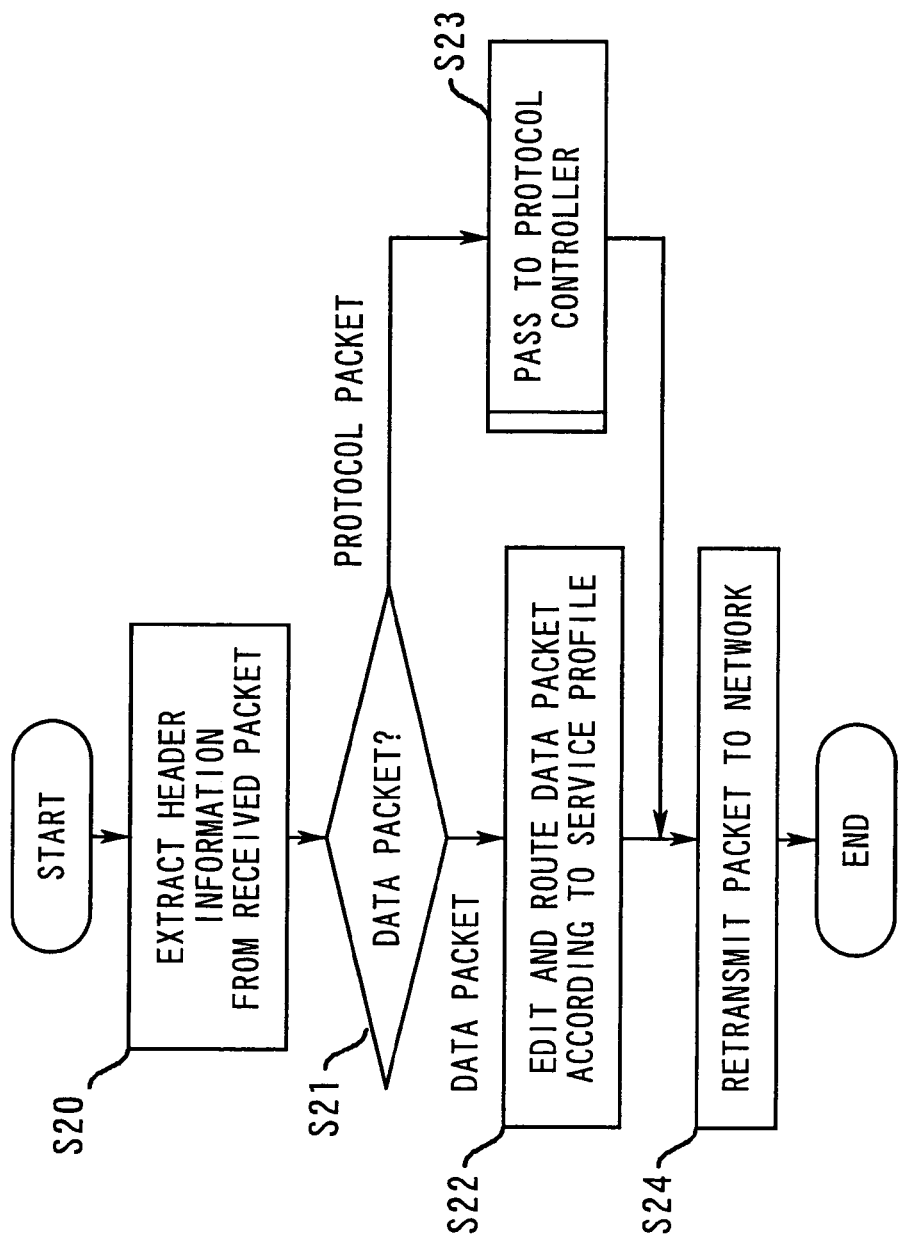
FIG. 20 is a flowchart which shows how a packet controller operates.

Referring next to the flowcharts of FIGS. 20 to 27, the following section will explain how the foreign agent 50, home agent 40, and correspondent node 70 modify a service profile. First, FIG. 20 shows a process flow of the packet controller 101.

Figure 56:
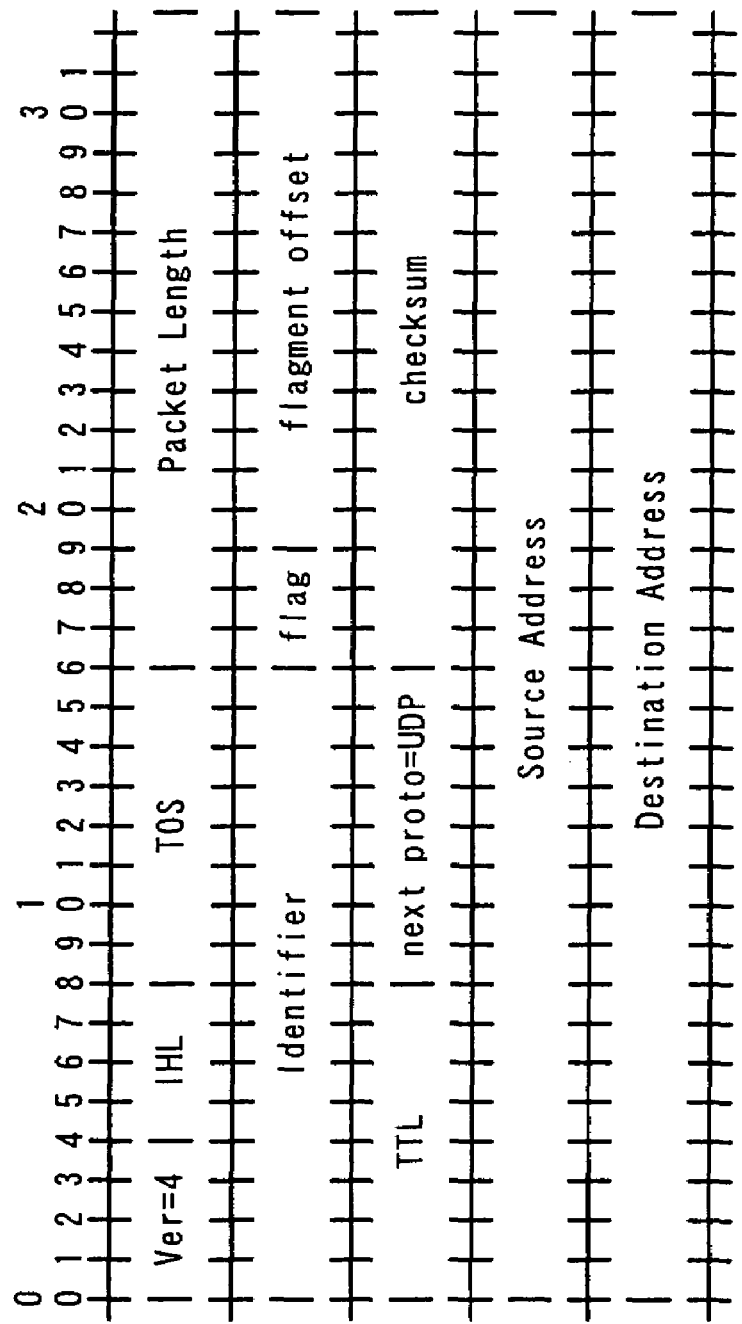
FIG. 56 shows the format of IP header.

(S20) When a packet is received, the packet controller 101 extracts its IP header information (see FIG. 56).

(S21) From the destination address and port number contained in the extracted IP header, the packet controller 101 determines whether the packet is a data packet or a protocol packet. If it is a data packet, the process advances to step S22. If it is a protocol packet, the process proceeds to step S23.

(S22) The packet controller 101 searches the service profile cache for an appropriate service profile that meets the header information. With this service profile, it edits the packet and determines where to route the packet.

(S23) The packet controller 101 passes the packet to the protocol controller 102.

(S24) The packet controller 101 retransmits the packet to the network.

Figure 21:
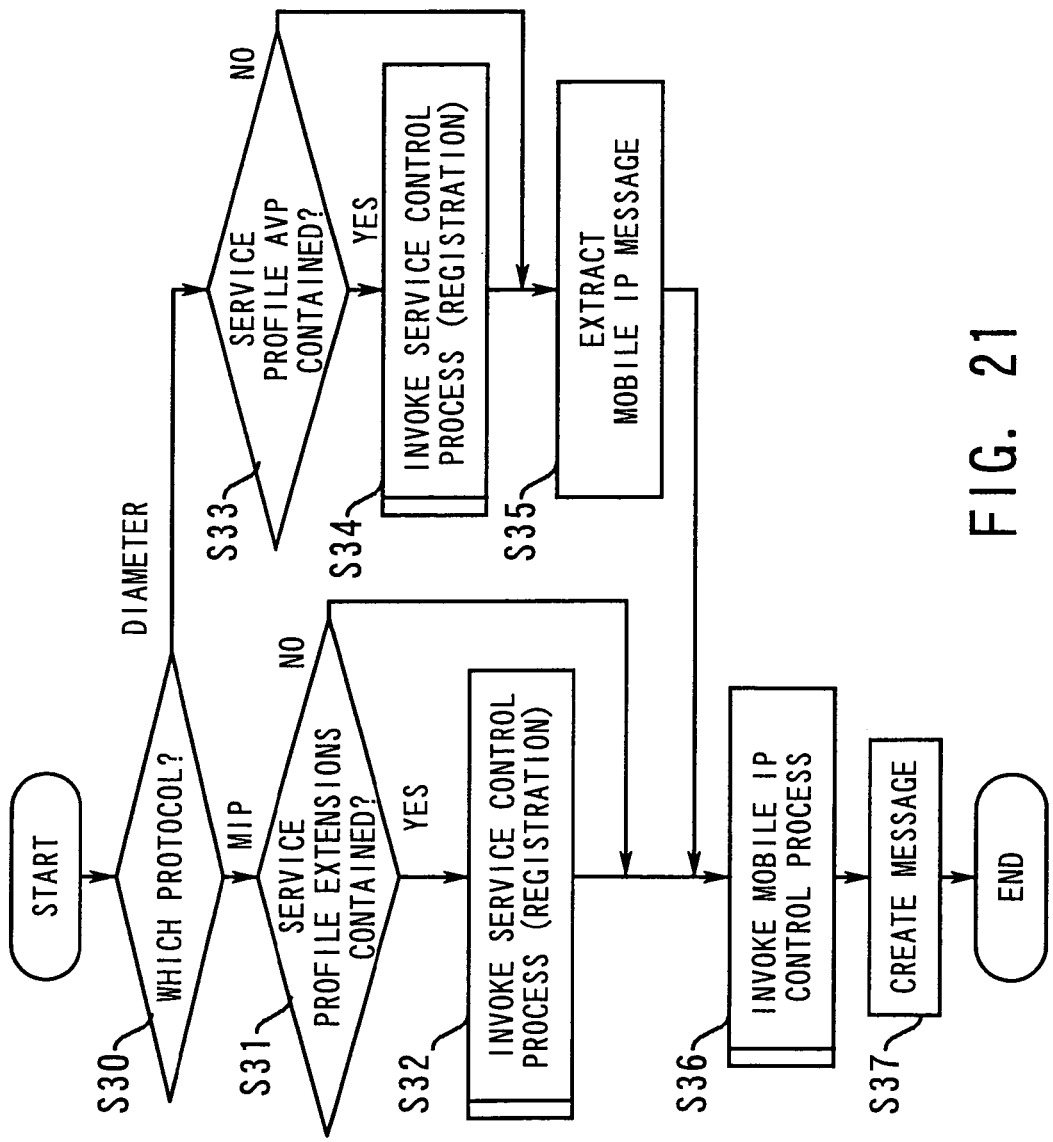
FIG. 21 is a flowchart which shows how a protocol controller operates.

FIG. 21 shows a process flow when the protocol controller 102 receives a protocol packet from the packet controller 101 at step S23.

(S30) The protocol controller 102 examines the port number in the UDP header to determine which protocol control message the packet is carrying, Mobile IP or DIAMETER. If it is a Mobile IP message, the process advances to step S31. If it is a DIAMETER message, the process branches to step S33.

(S31) Now that the packet has turned out to be a Mobile IP message, the protocol controller 102 then determines whether the message has service profile extensions. If so, the process advances to step S32.

If not, the process skips to step S36.

(S32) The protocol controller 102 invokes a service control process in "registration" mode.

(S33) Since the packet has turned out to be a DIAMETER message, the protocol controller 102 then determines whether the message contains a service profile AVP. If so, the process advances to step S34. If not, the process skips to step S35.

(S34) The protocol controller 102 invokes a service control process in "registration" mode.

(S35) The protocol controller 102 extracts a Mobile IP message out of the DIAMETER message.

(S36) The protocol controller 102 invokes a Mobile IP control process.

(S37) The protocol controller 102 edits the message and terminates the present processing.

Figure 22:
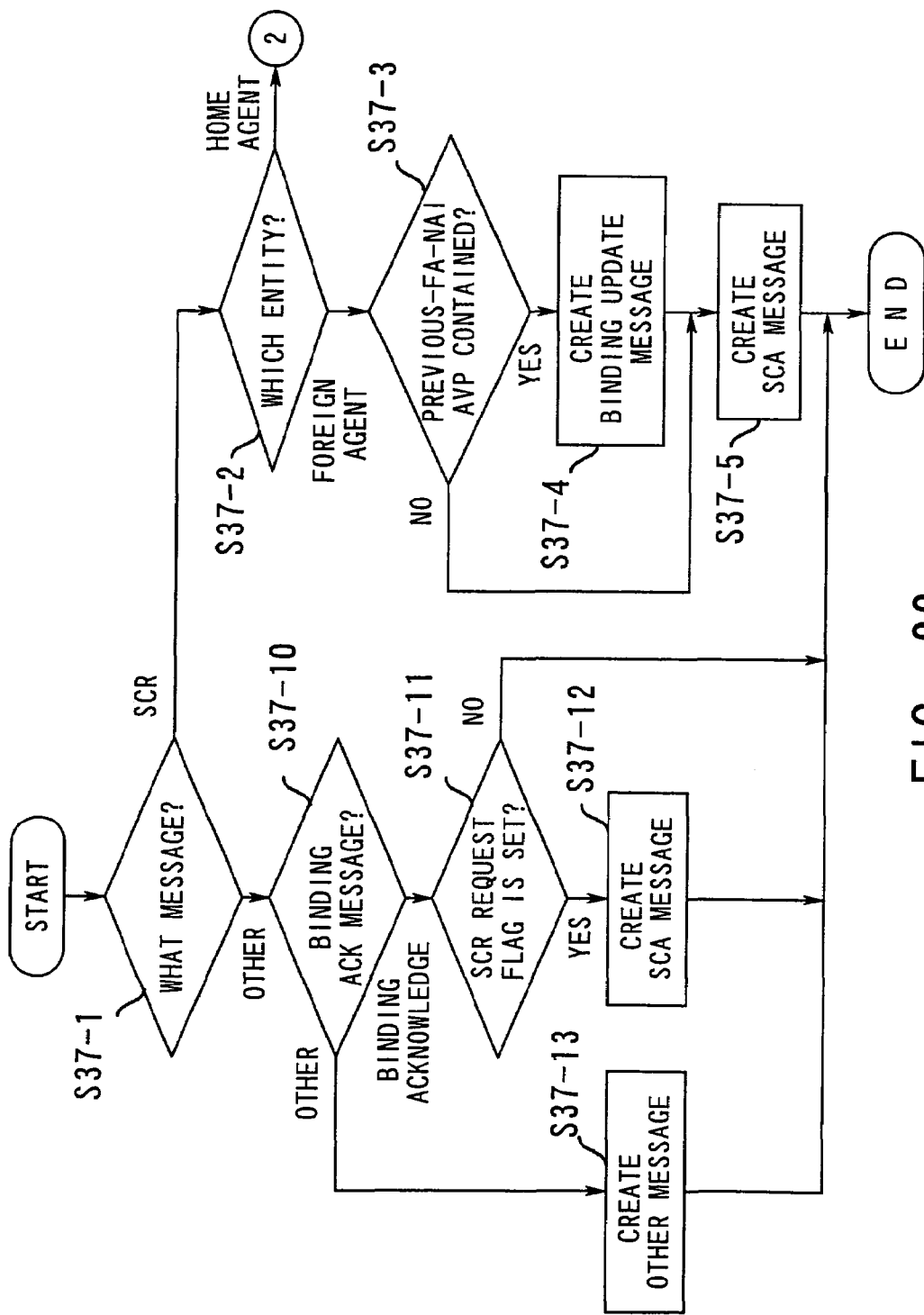
FIGS. 22 and 23 show a flowchart explaining how messages are created.
Figure 23:
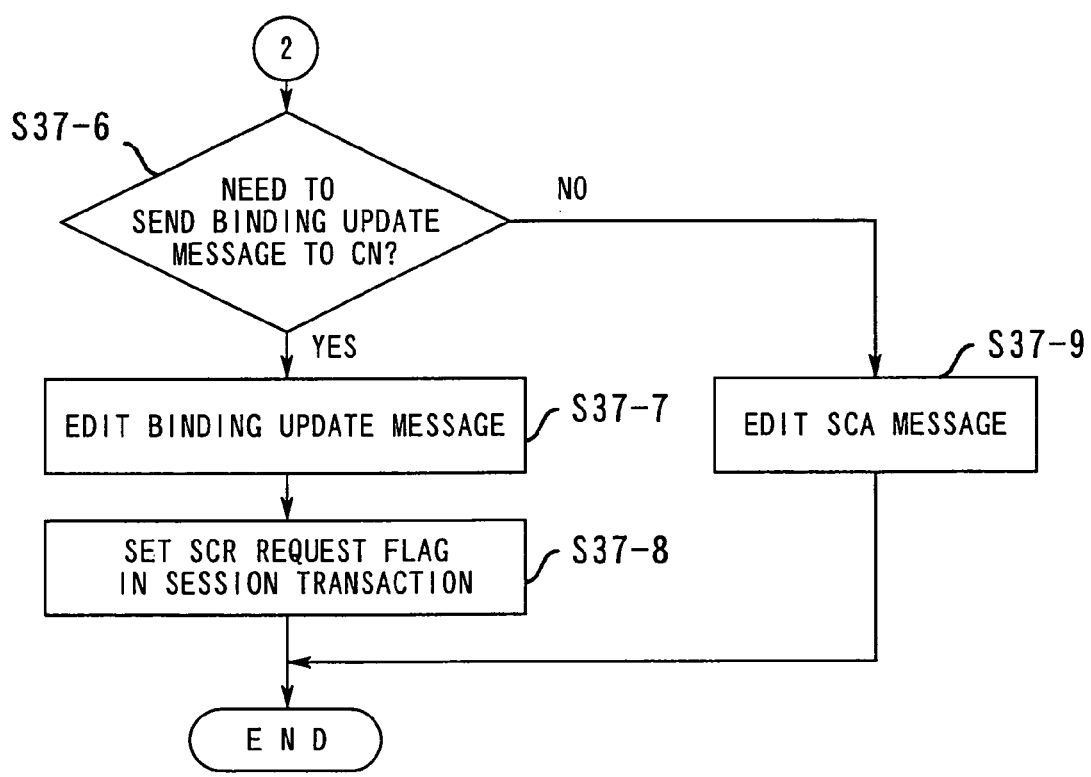

The details of message editing at the above step S37 are shown in a separate flowchart of FIGS. 22 and 23.

(S37-1) The protocol controller 102 determines the type the received message. If it is a Service Change Request (SCR) message, the process branches to step S37-2. Otherwise, the process advances to step S37-10.

(S37-2) The protocol controller 102 then determines which entity is processing the request. If it is the foreign agent (FA) 50, the process advances to step S37-3. If it is the home agent (HA) 40, the process branches to step S37-6 (FIG. 23).

(S37-3) The protocol controller 102 determines whether the SCR message contains a Previous-FA-NAI AVP. If this particular AVP is contained, the process advances to step S37-4. If not, the process skips to step S37-5.

(S37-4) The protocol controller 102 creates a Binding Update message to be sent to the previous foreign agent. This Binding Update message should include the service profile specified in the SCR message.

(S37-5) The protocol controller 102 creates a response message to be sent back to the sender of the SCR message. This response message is referred to as a Service Change Answer (SCA) message.

(S37-6) The protocol controller 102 determines whether there is any correspondent node that is supposed to receive a binding update message. More specifically, the protocol controller 102 looks into the filed titled "Correspondent Node with Route Optimization" in the mobility binding table (FIG. 14), which is an extended field that the present invention proposes. Now it is determined whether this field contains any valid IP address other than "0.0.0.0." If a valid IP address is found, the process advances to step S37-7. Otherwise, the process proceeds to step S37-9.

(S37-7) Since a valid IP address is found, the protocol controller 102 creates a Binding Update message to be sent to the corresponding node. This Binding Update message should include the service profile specified in the SCR message.

(S37-8) The protocol controller 102 sets the SCR request flag in the session transaction, along with the SCR requester address.

(S37-9) Since no valid IP address is set, the protocol controller 102 creates an SCA message to be sent back to the sender of the SCR message.

(S37-10) The protocol controller 102 determines whether the received message is a binding acknowledge message. If so, the process advances to step S37-11. Otherwise, the process branches to step S37-13.

(S37-11) The protocol controller 102 examines whether the SCR request flag in the session transaction is set. If the flag is set, the process advances to step S37-12. Otherwise, the process is terminated.

(S37-12) Referring to the SCR requester address recorded in the session transaction, the protocol controller 102 creates an SCA message to be returned to the requester as a response to its SCR message. The protocol controller 102 then clears the SCR request flag and SCR requester address fields in its session transaction.

(S37-13) The protocol controller 102 determines how to react to the received message by consulting an action table 600 shown in FIG. 26. For each type of received message, the action table 600 suggests what conditions should be tested and what message(s) should be returned. The home agent 40, foreign agent 50, and correspondent node 70 use this table to process messages that they receive.

Figure 24:
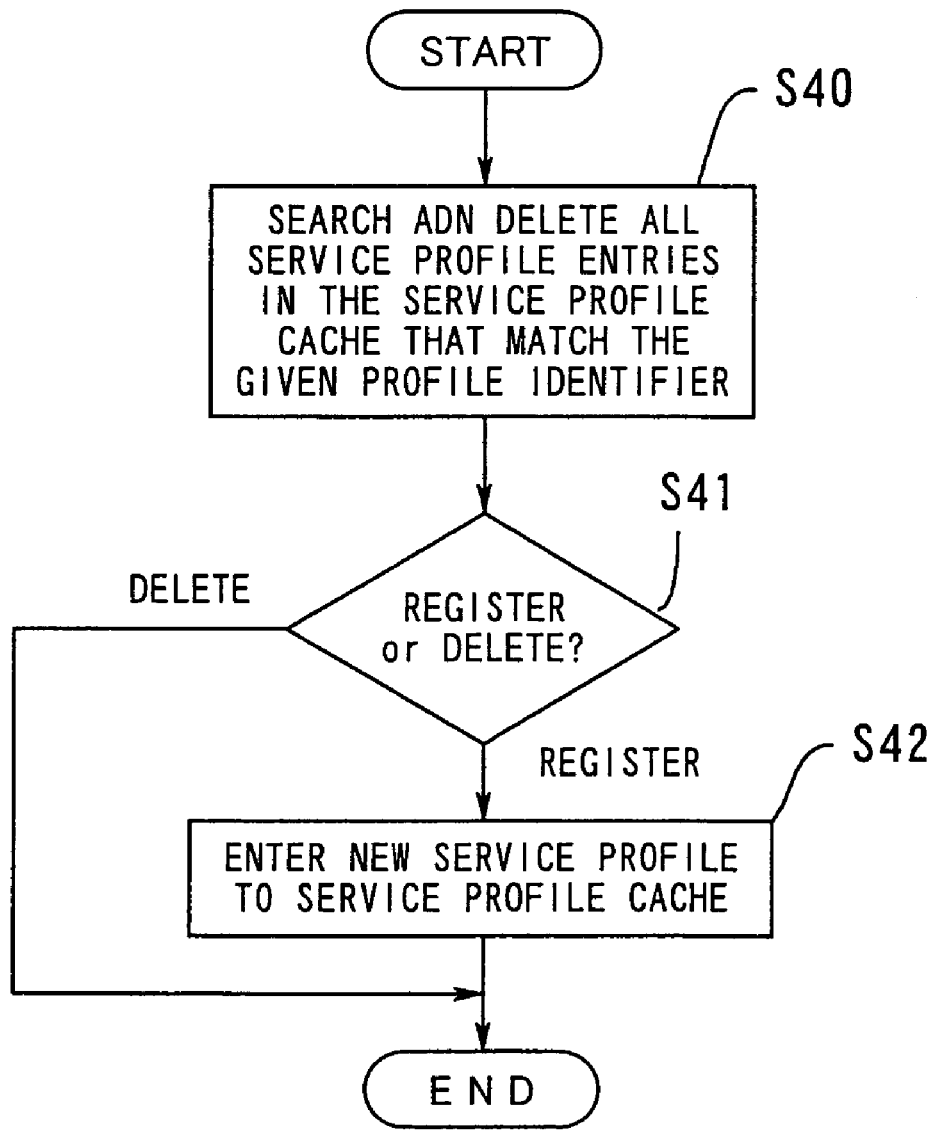
FIG. 24 is a flowchart which shows how a service controller operates.

FIG. 24 shows a process flow of the service controller 103. This processing is what has been referred to as a "service control process" at step S32 or S34 in the flowchart of FIG. 21.

(S40) The service controller 103 searches the service profile cache and deletes all service profile entries that match the given profile identifier.

(S41) The service controller 103 examines the content of the request. If it is a request for deletion, the process is terminated. If it is a request for registration, the process advances to step S42.

(S42) The service controller 103 enters a newly given service profile to the service profile cache.

Figures 25A, 25B:
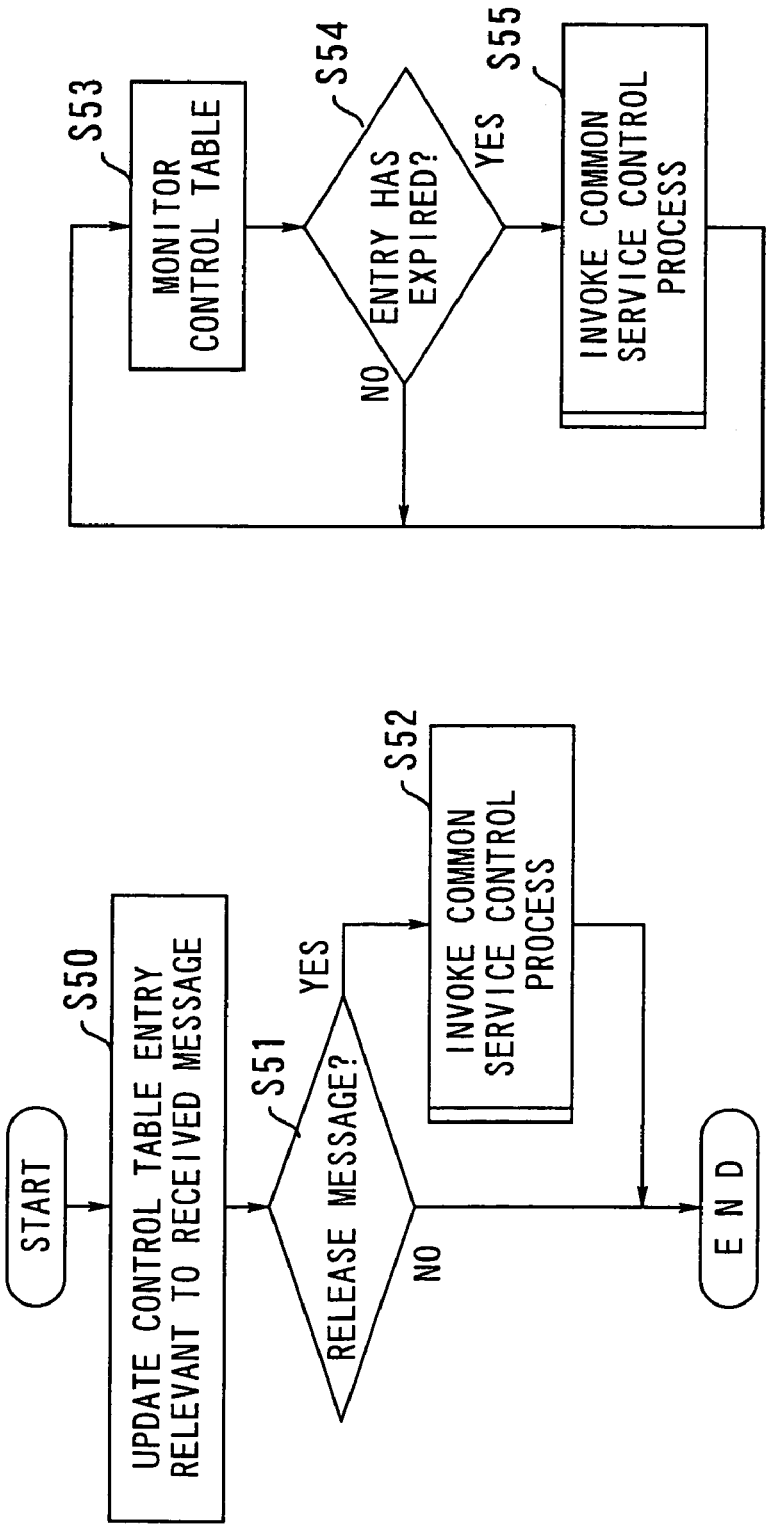
FIG. 25(A) is a flowchart of a message handling process executed by a Mobile IP controller.
FIG. 25(B) is a flowchart of a management table supervisory program which runs on the Mobile IP controller periodically as a separate process from message processing.

FIGS. 25(A) and 25(B) are flowchart showing how the Mobile IP controller 104 operates. More specifically, FIG. 25(A) shows a message handling process, while FIG. 25(B) shows a management table supervisory program which runs periodically and independently of the message handling process of FIG. 25(A).

(S50) Given a Mobile IP message, the Mobile IP controller 104 updates a relevant control table entry, according to a table 610 shown in FIG. 27. This table 610 indicates which control table will be affected when a particular type of message is received, depending on which entity (i.e., foreign agent, home agent, or corresponding node) is processing it.

(S51) The process advances to step S52, if the received message is a release request message (i.e., registration request message with a zero-valued registration timer or a Session Free Request (SFR) message). If not, the process is terminated.

(S52) The Mobile IP controller 104 calls a service control process in "delete" mode.

In parallel to the above, the Mobile IP controller 104 repeats the following steps.

(S53) The Mobile IP controller 104 periodically monitors a control table (i.e., visitor list, mobility binding, binding cache). Each entry of this table has a lifetime parameter which defines the valid term of that entry.

(S54) The Mobile IP controller 104 determines whether the entries have reached their lifetimes. If there is such an entry that has expired, the process advances to step S55. Otherwise, the process returns to step S53.

(S55) Given an expired entry, the Mobile IP controller 104 identifies a corresponding service profile from the pointer value or identifier of that entry. It then invokes a service control process in "delete" mode, passing the profile identifier of the identified service profile.

Figure 28:
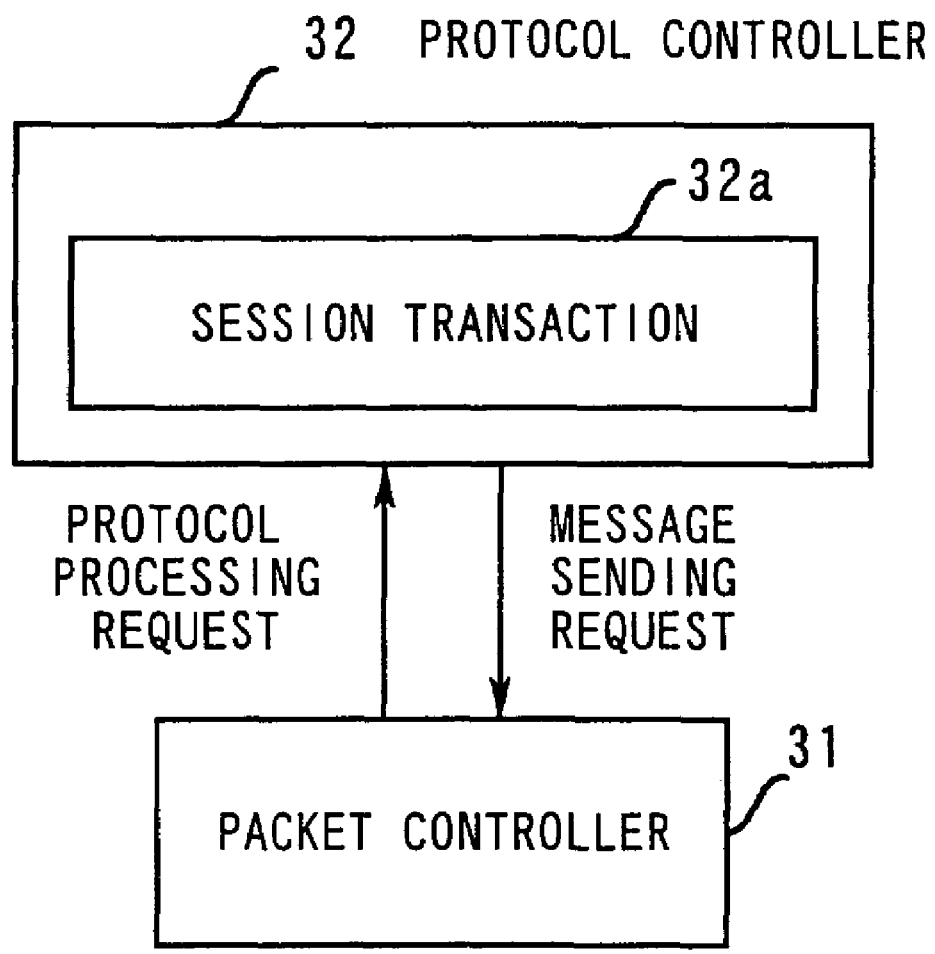
FIG. 28 shows functional blocks of AAAF.

Referring next to FIGS. 28 to 32, the following section will explain the AAAF 30 in greater detail. FIG. 28 shows functional blocks of the AAAF 30. It comprises a packet controller 31 and a protocol controller 32 to support the DIAMETER protocol. The protocol controller 32 comprises a session transaction 32a which manages DIAMETER sessions.

Figure 29:
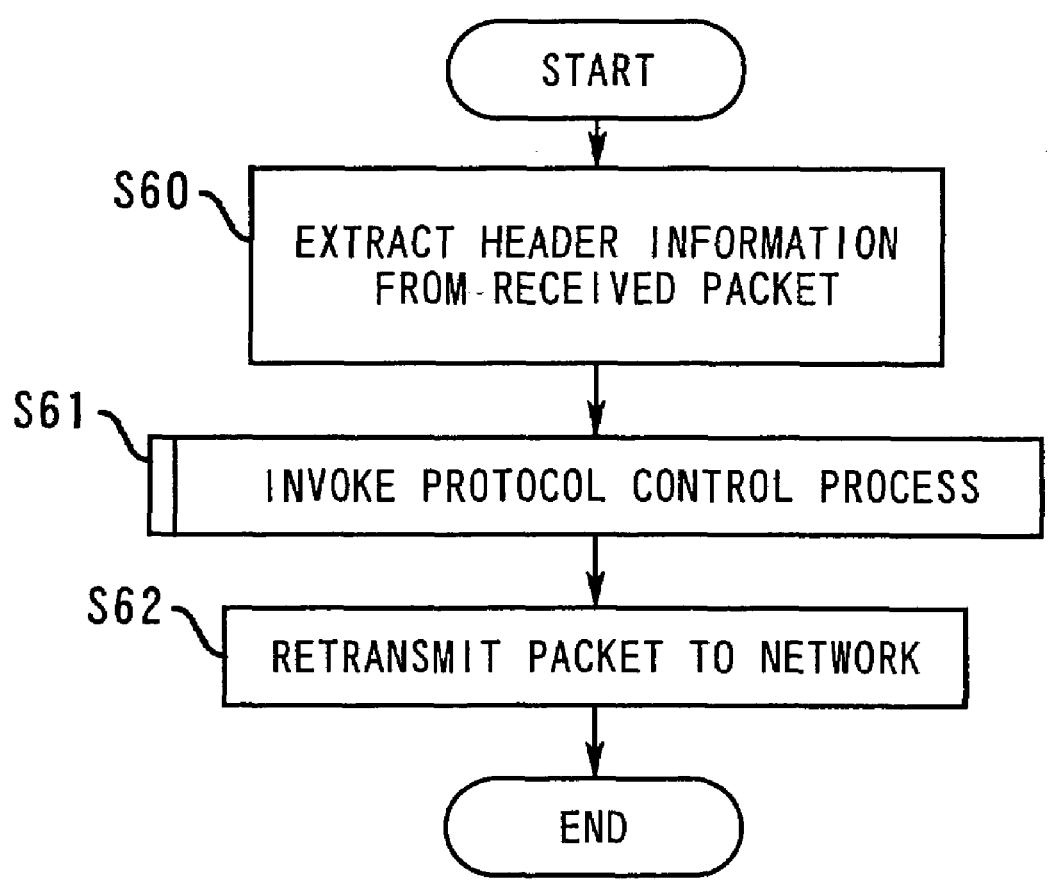
FIG. 29 is a flowchart which shows the operation of a packet controller in AAAF.

FIG. 29 is a flowchart which shows how the packet controller 31 operates in the AAAF 30.

(S60) When a packet is received, the packet controller 31 extracts its IP header information (see FIG. 56) and passes a DIAMETER protocol message to the protocol controller 32.

(S61) Appropriate protocol processing is made at the protocol controller 32, depending the type of the received message.

(S62) The packet controller 31 receives the resultant message, if any, from the protocol controller 32 and forwards it to the network.

Figure 30:
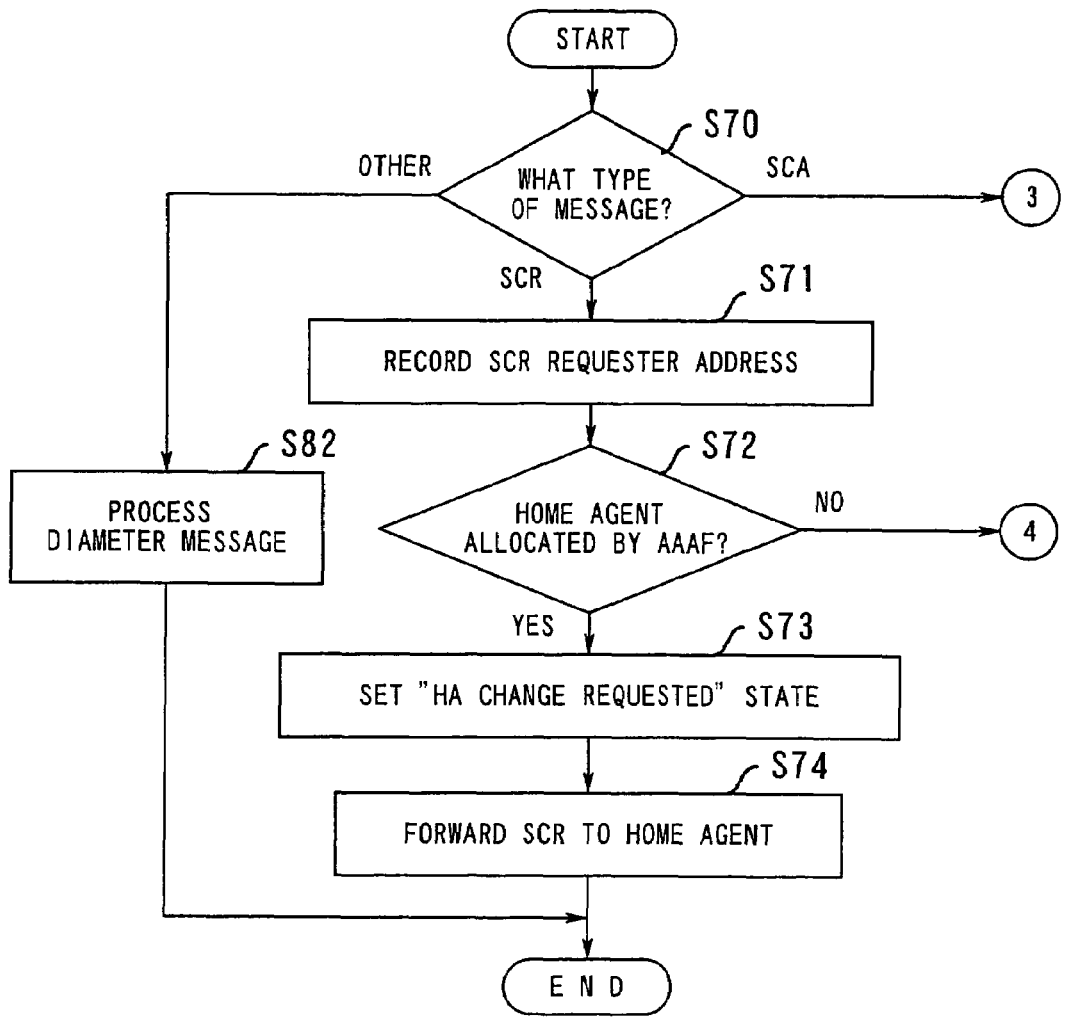
FIGS. 30 and 31 show a flowchart which explains the operation of a protocol controller in AAAF.
Figure 31:
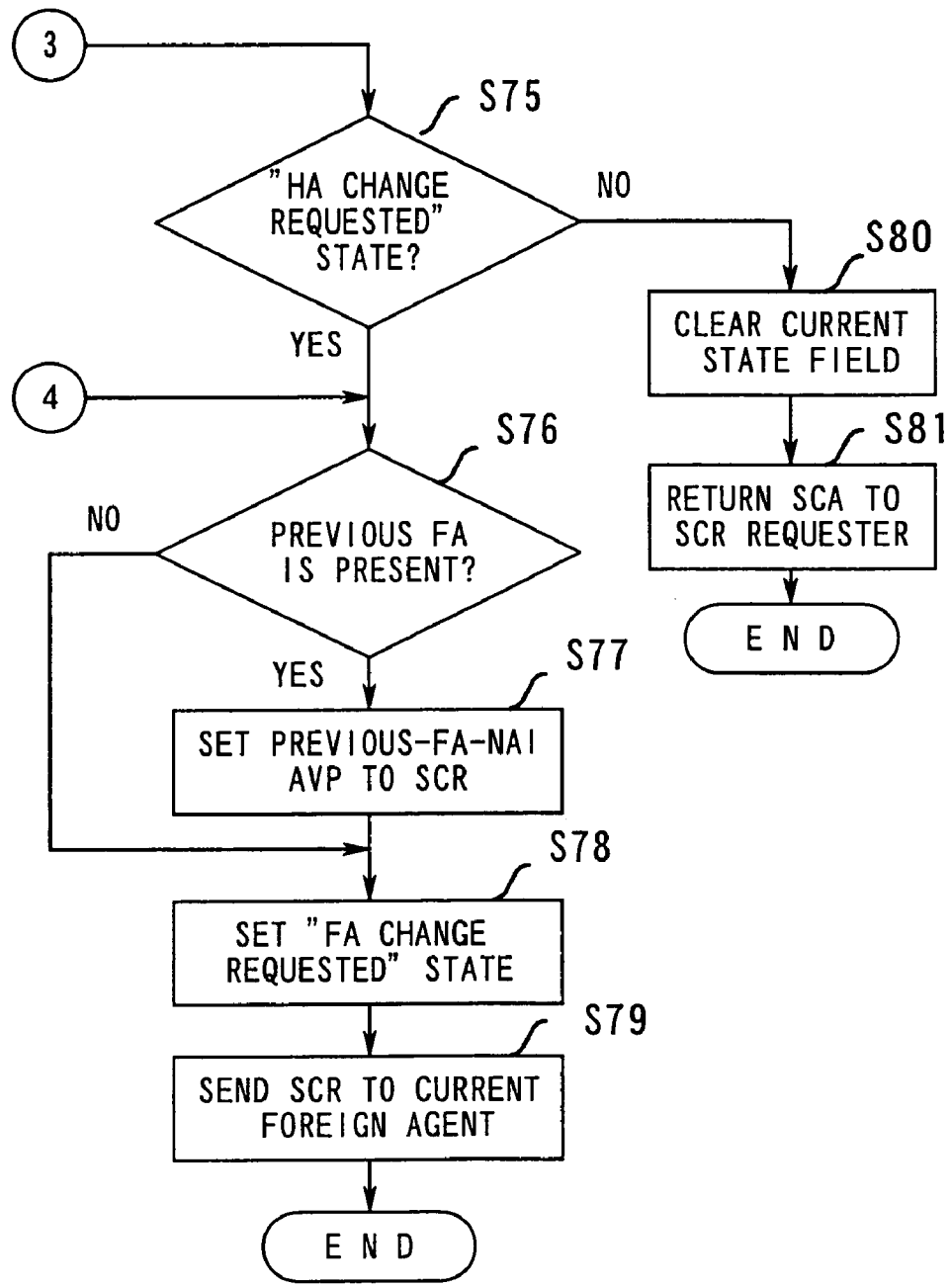

FIGS. 30 and 31 show a process flow of the protocol controller 32 in the AAAF 30, which is invoked at the above step S61.

(S70) When a message is received, the protocol controller 32 determines what type of message it is. If it is an SCR message, the process advances to step S71. If it is an SCA message, the process proceeds to step S75. If it is neither SCR nor SCA, the process branches to step S82.

(S71) Since the received message has turned out to be an SCR message, the protocol controller 32 locates a relevant session transaction by using the session ID specified in the message. Then it sets the received message's source IP address to the SCR Requester Address field of the session transaction, thereby recording who is requesting the change of service profile.

(S72) The protocol controller 32 examines the Home Agent Address field of the session transaction. If a valid IP address is found, it means that the home agent has been allocated by the AAAF 30. If this is the case, the process advances to the process advances to step S73. If the field value is "0.0.0.0," the process branches to step S76.

(S73) The protocol controller 32 sets "HA Change Requested" to the Current State field of the session transaction. This state value "HA Change Requested" indicates that a service change request has been sent to the home agent.

(S74) The protocol controller 32 forwards the received SCR message to the home agent and terminates the process.

(S75) Now that the received message has turned out to be an SCA message, the protocol controller 32 first locates a relevant session transaction by using the specified session ID. It then checks the Current State field of the session transaction to determine whether the session is in the "HA Change Requested" state. If so, the process advances to step S76. Otherwise, the process proceeds to step S80.

(S76) Since the session is in the "HA Change Requested" state, the protocol controller 32 now looks into the Previous Foreign Agent NAI filed in the session transaction. If the field holds a specific value, the process advances to step S77. Otherwise, the process proceeds to step S78.

(S77) The protocol controller 32 puts a Previous-FA-NAI AVP into an SCR message to be sent to the current foreign agent.

(S78) The protocol controller 32 sets "FA Change Requested" to the Current State field of the session transaction. This state value "FA Change Requested" indicates that a service change request has been sent to the foreign agent.

(S79) The protocol controller 32 obtains the IP address of the foreign agent from the Current Foreign Agent NAI field of the session transaction. It forwards the received SCR message to the current foreign agent and terminates the current process.

(S80) Since the current state is not the "HA Change Requested" state, the protocol controller 32 sets it to a "Waiting" state.

(S81) The protocol controller 32 creates an SCA message, sends it back to the SCR source address recorded in the SCR Requester Address field of the session transaction, and terminates the process.

(S82) Now that the received DIAMETER message has turned out to be other than the service change request/answer messages (SCR, SCA), the protocol controller 32 processes the message according to its message type. FIG. 32 shows a message-action table 620 which summarizes often-used DIAMETER messages, including SCR and SCA, and how the AAAF 30 handles them. Their details, however, will not be provided here, since they are not what the present invention contributes to.

Referring next to FIGS. 33 to 43, the following section will describe the AAAH 20 in greater detail.

Figure 33:
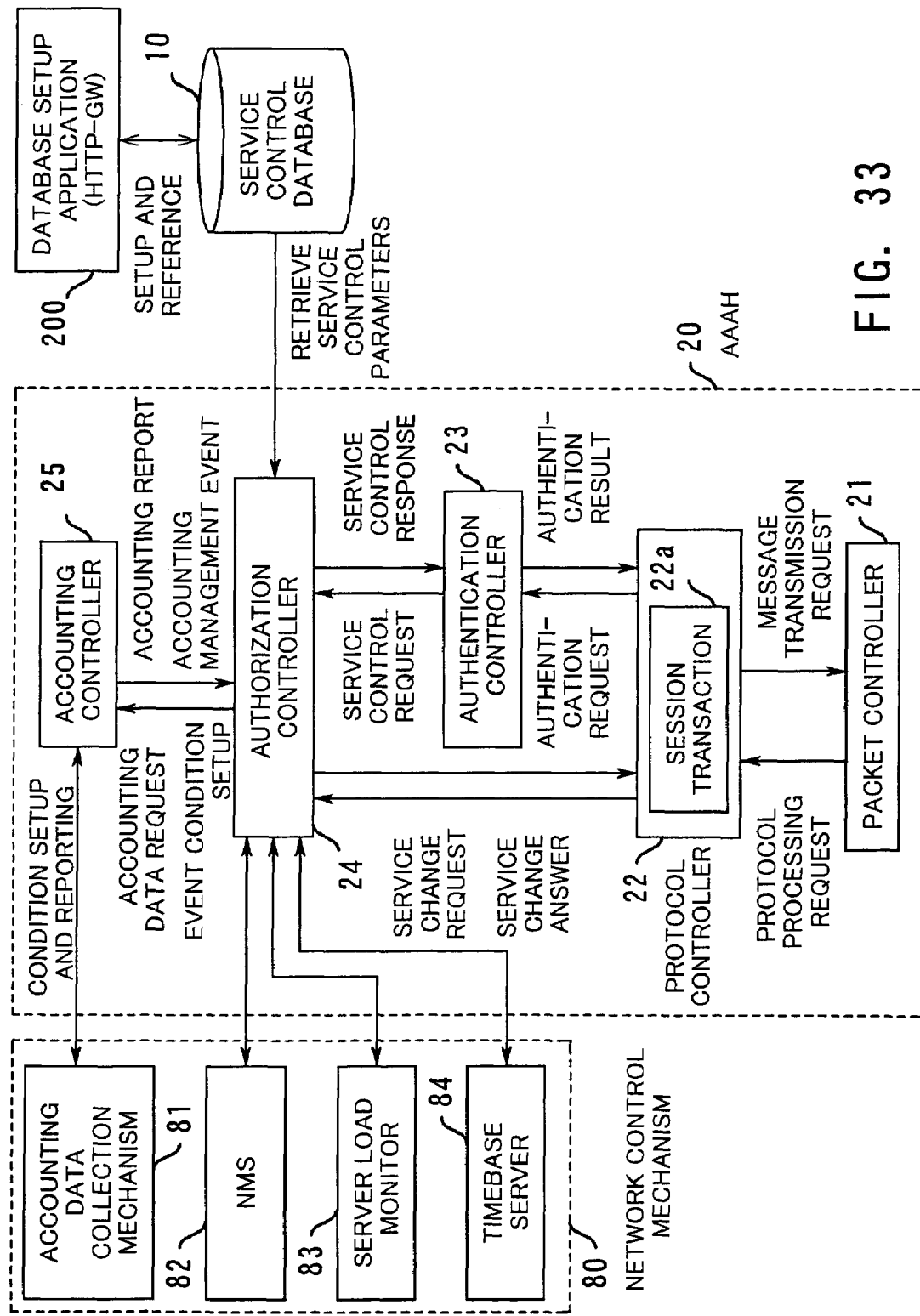
FIG. 33 shows functional blocks of AAAH and network control mechanism.

FIG. 33 shows functional blocks constituting the AAAH 20 and network control mechanism 80. The AAAH 20 comprises the following blocks: a packet controller 21, a protocol controller 22, an authentication controller 23, an authorization controller 24, and an accounting controller 25. The packet controller 21 and protocol controller 22 provide functions to support the DIAMETER protocol. The authentication controller 23 verifies the user's authenticity by consulting his/her authentication data stored in the service control database 10. The authorization controller 24 retrieves the user's service profile from the service control database 10 and determines whether the user is authorized to use network resources. It also produces a specific service profile which describes what class of service to provide to the user. The accounting controller 25 manages accounting information of each user.

More specifically, the service profile for a particular user may contain some variables and conditions (e.g., time ranges, accounting records, network traffic loads) that would lead to a change in network parameters. If such variables or conditions are specified, the authorization controller 24 makes a necessary arrangement, using an appropriate protocol, so that other functional blocks will observe those variables and generate an event signal upon detection of the specified condition(s). The functional blocks supporting this event generation mechanism include the network management system 82, server load monitor 83, and timebase server 84, which have been described earlier in FIG. 4 as part of the network control mechanism 80. In addition, the accounting controller 25 provides functions to detect accounting management events (i.e., events related to resource usage), if required.

The accounting controller 25 supplies accounting records of a particular user to the authorization controller 24 in response to its accounting data request. Monitoring those accounting records, it generates an accounting management event when a condition specified by the authorization controller 24 is met. To collect information on resource usage of each user, the accounting controller 25 communicates with the accounting data collection mechanism 81 of the network control mechanism 80.

The network control mechanism 80 measures and monitors the above-described variables according to the conditions specified by the AAAH 20. When a specific condition is satisfied, it notifies the AAAH 20 of that event, using an appropriate protocol. The functions of the network control mechanism 80 can be realized by using existing technologies, or implemented with some proprietary approach. Their detailed internal operations and protocols used therefor will not be presented because they are not necessarily the scope of the present invention.

The message exchange between the home server 20 and network control mechanism 80 is via the packet controller 21 and protocol controller 22, although the authorization controller 24 and accounting controller 25 in FIG. 33 are directly coupled to the network control mechanism 80 for simplicity purposes.

The service control database 10 is linked with a database set-up application which allows the user or ISP operator to manipulate data in the service control database 10. More specifically, this application may be an HTTP-GW 200, which provides a web interface for configuration of and access to a database. As most database systems have, the service control database 10 has a lock mechanism to prevent any data inconsistency from being introduced by concurrent access from multiple entities.

Referring now to the flowcharts of FIGS. 34 to 43, the following section will describe the operation of the home server 20 in detail.

Figure 34:
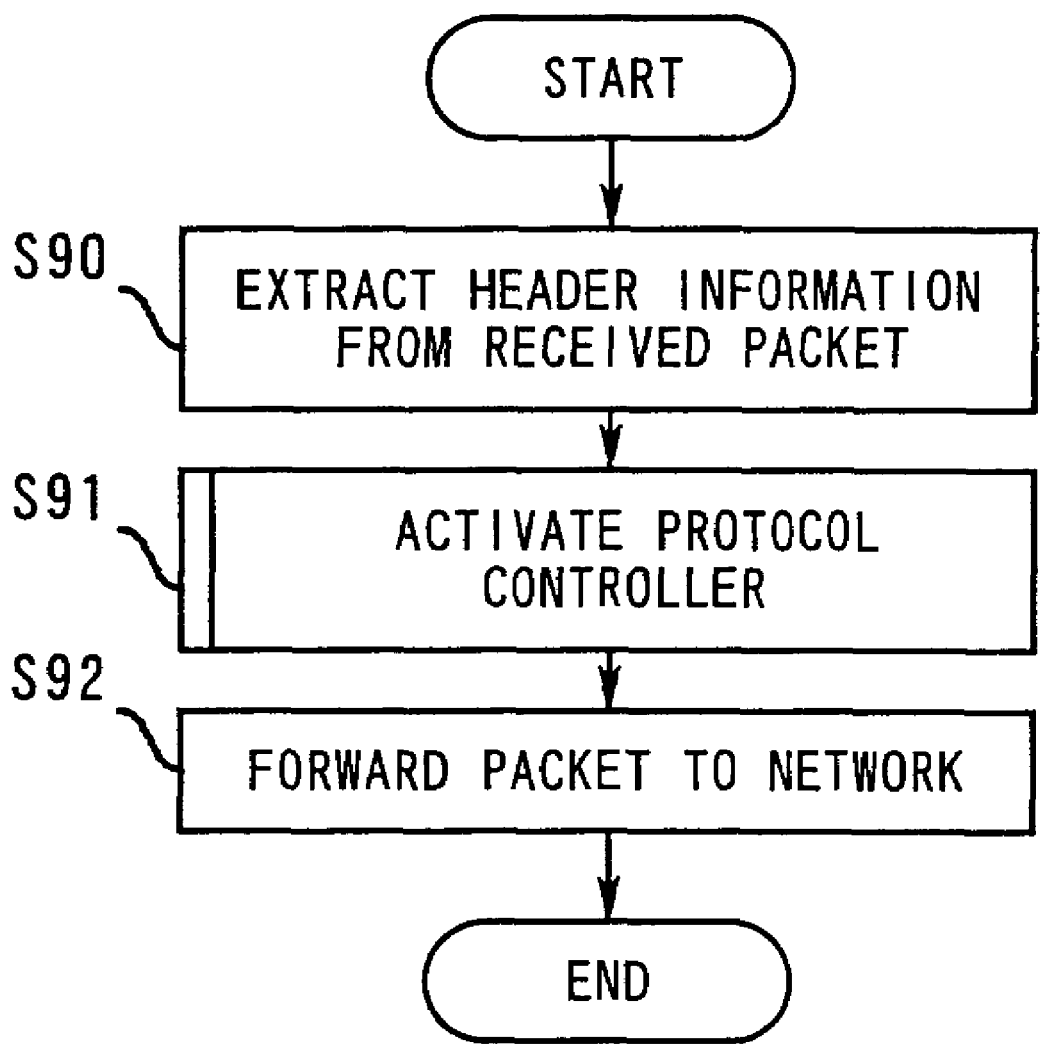
FIG. 34 is a flowchart which shows the operation of a packet controller in AAAH.

FIG. 34 shows a process flow of the packet controller 21 in the AAAH 20.

(S90) When a packet is received, the packet controller 21 extracts its IP header information (see FIG. 56), and if the packet is a DIAMETER message, it so notifies the protocol controller 22

(S91) Appropriate protocol processing is made at the protocol controller 32, depending the type of the received message.

(S92) The packet controller 21 receives the resultant message, if any, from the protocol controller 22 and forwards it to the network.

Figure 35:
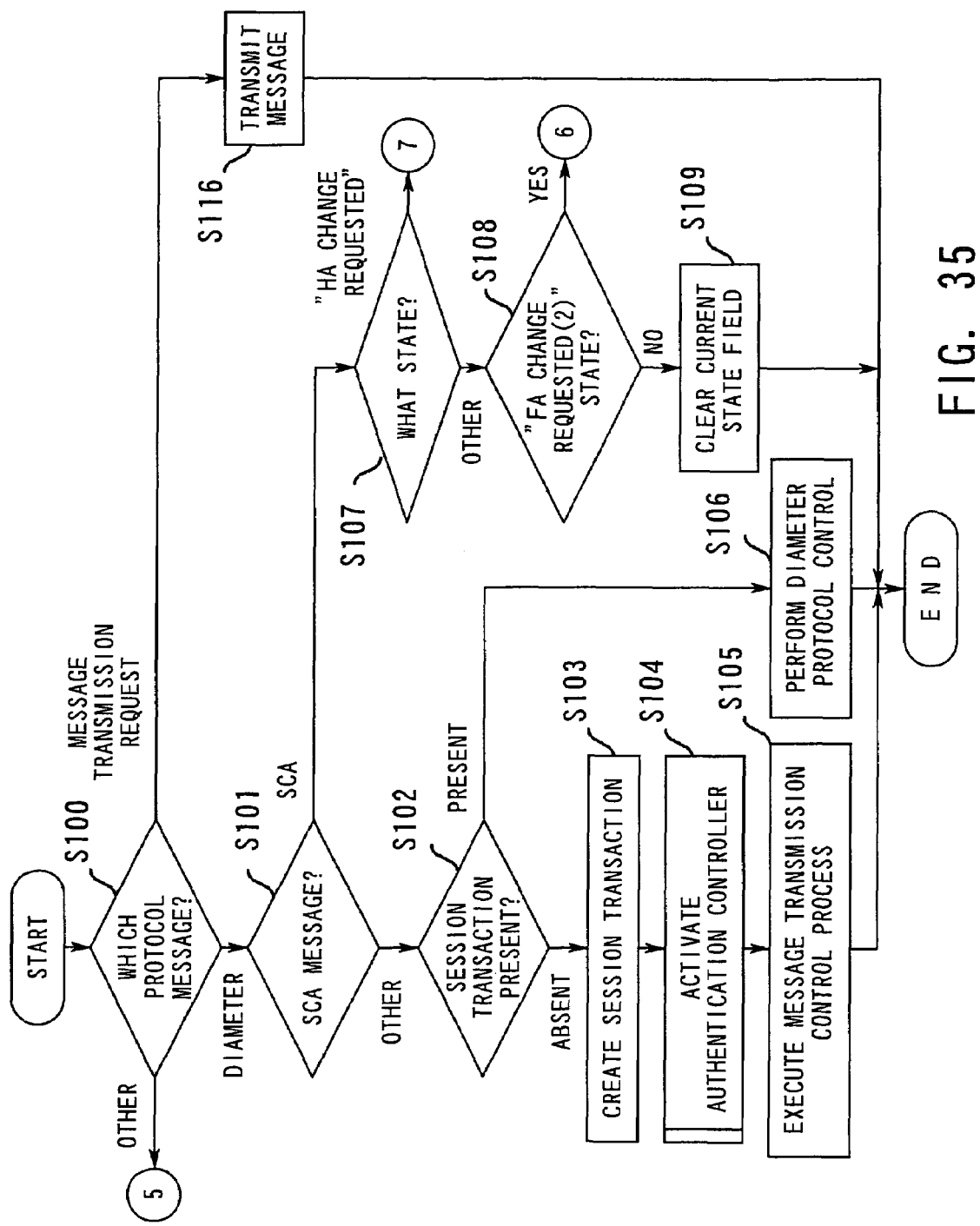
FIGS. 35 and 36 show a flowchart which explains the operation of a protocol controller in AAAH.
Figure 36:
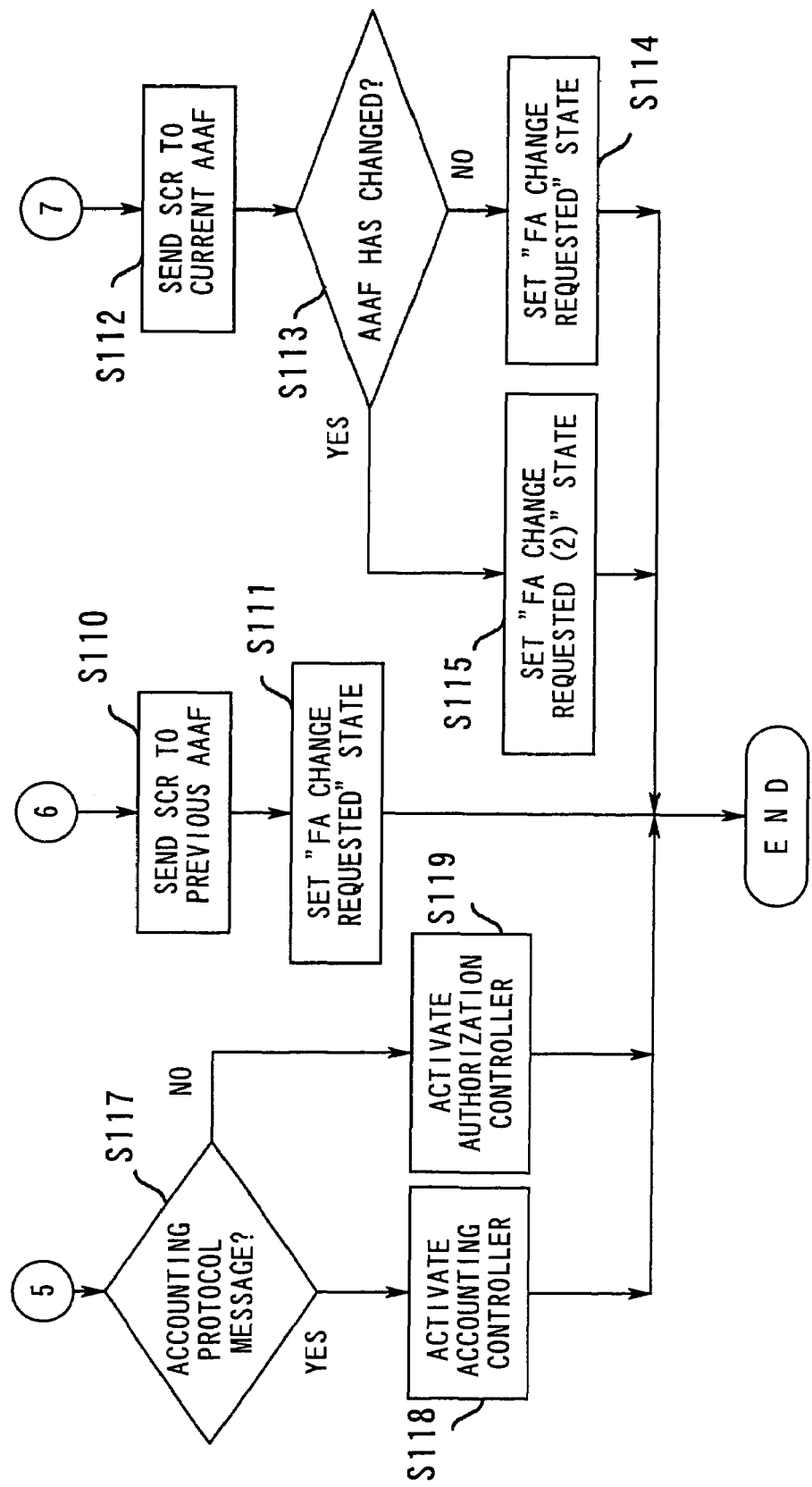

FIGS. 35 and 36 show a process flow of the protocol controller 22 in the AAAH 20.

(S100) When a request is given, the protocol controller 22 determines which protocol message it is, referring to the UDP port being used. If it is a message transmission request, the process branches to step S116. If it is a DIAMETER message, the process advances to step S101. Otherwise, the process advances to step S117.

(S101) The protocol controller 22 determines what type of message it is. If it is an SCA message, the process branches to step S107. If not, the process advances to step S102.

(S102) The protocol controller 22 searches the session transactions 22a by using the given session ID as a search keyword. If a session transaction is found, the process advances to step S106. Otherwise, the process proceeds to step S103.

(S103) The absence of a corresponding session transaction means that an AA-Mobile-Node-Request (AMR) message has been received for the first time. Then the protocol controller 22 newly creates a session transaction.

(S104) The protocol controller 22 activates the authentication controller 23 to invoke an authentication process.

(S105) The authentication controller 23 determines what message to return. The protocol controller 22 sends out the message accordingly (described in detail later), and terminates the process.

(S106) Since a corresponding session transaction has been found, the protocol controller 22 performs DIAMETER protocol processing for the received message according to the session transaction. Actually, this step S106 follows a message-action table 700 of FIG. 42, which summarizes often-used DIAMETER messages and their handling at the AAAH 20. After that, the protocol controller 22 terminates the process.

(S107) The protocol controller 22 retrieves a session transaction by using the specified session ID and determines whether its Current State field indicates the "HA Change Requested" state. If so, the process branches to step S112. Otherwise, the process proceeds to step S108.

(S108) The protocol controller 22 now determines whether the current state is the "FA change requested (2)." This state indicates the second occurrence of "FA Change Requested" from the AAAH's viewpoint. If the Current State field gives the "FA Change Requested (2)" state, the process proceeds to step S110. Otherwise, the process advances to step S109.

(S109) The protocol controller 22 sets "Waiting" to the Current State field of the session transaction and then terminates the process.

(S110) Since the Current State field indicates the "FA Change Requested (2)" state, the protocol controller 22 sends an SCR message to the previous AAAF 30, which is recorded in the session transaction.

(S111) The protocol controller 22 sets "FA Change Requested" to the Current State field of the session transaction and then terminates the process.

(S112) Since the session is in the "HA Change Requested" state, the protocol controller 22 sends out an SCR message to the current AAAF 30 whose address was entered to the session transaction at the time of location registration.

(S113) The protocol controller 22 checks whether the previous AAAF address field in the session transaction has a valid IP address. If such an address is found, it means that the mobile node 60 has left the domain of its previous AAAF. If this is the case, the process advances to step S115. If not, the process advances to step S114.

(S114) Since the field has no previous AAAF address recorded, the protocol controller 22 sets an "FA Change Requested" state to the session transaction, and then it terminates the process.

(S115) Since the field contains the previous AAAF address, the protocol controller 22 sets an "FA Change Requested (2)" state to the session transaction, and then it terminates the process.

(S116) The protocol controller 22 sends out the requested message (described later) and terminates the process.

(S117) The protocol controller 22 determines whether the message is an accounting control message. If so, the process advances to step S118. Otherwise, the process proceeds to step S119.

(S118) To process the received accounting control message, the protocol controller 22 activates the accounting controller 25 and exits from the process.

(S119) The protocol controller 22 activates the authorization controller 24 and terminates the process.

Figure 37:
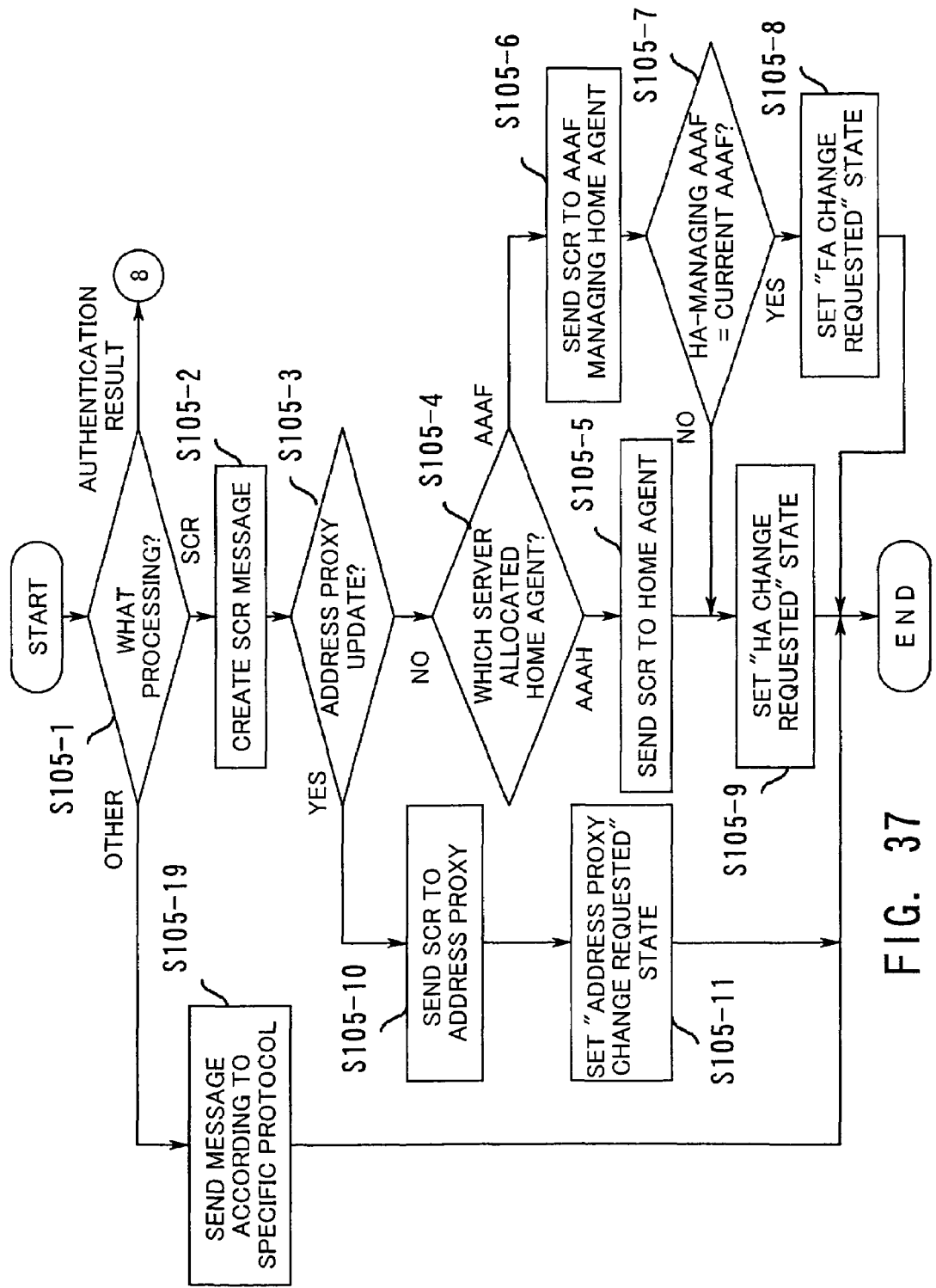
FIGS. 37 and 38 show a flowchart which provides the details of message transmission control.
Figure 38:
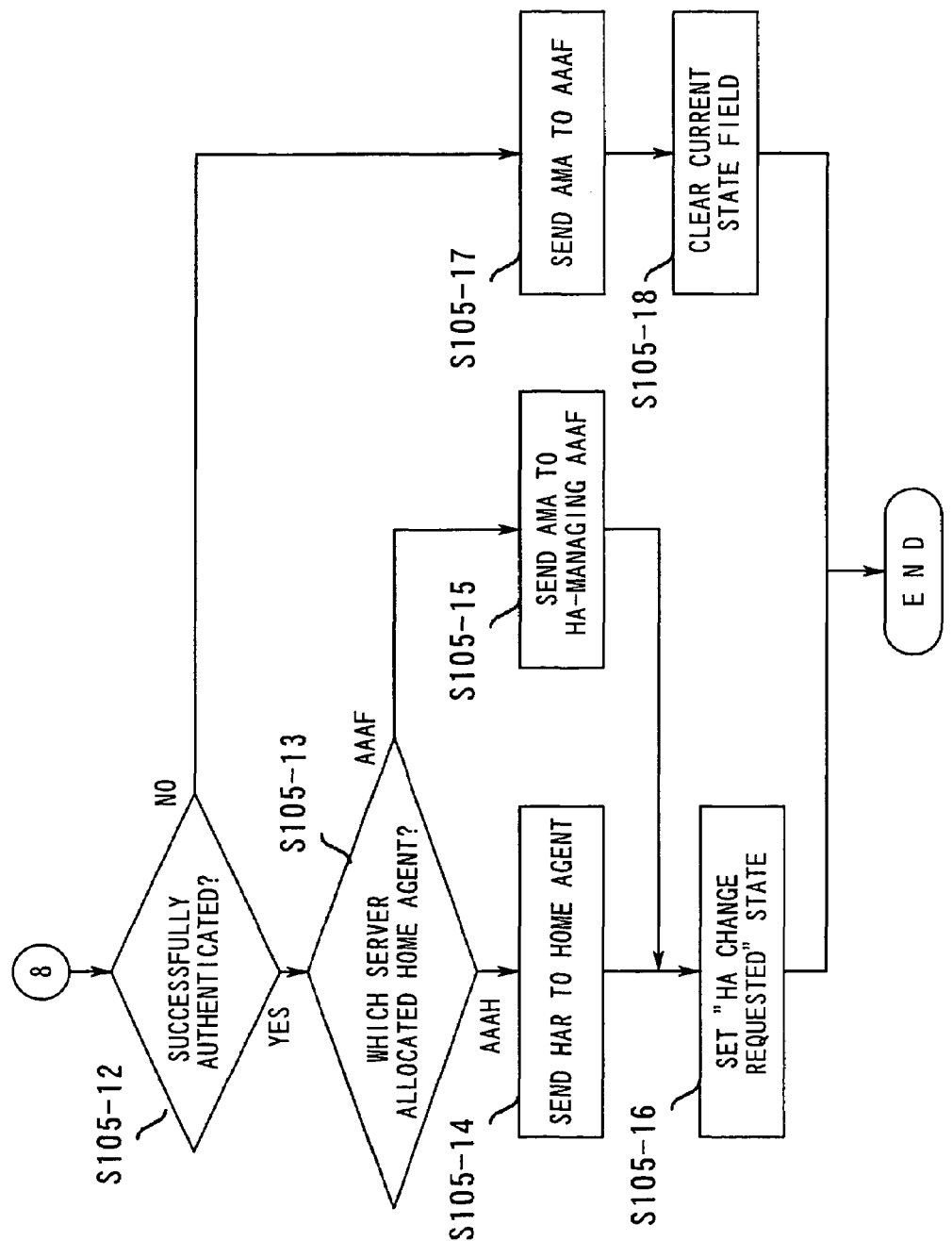

FIGS. 37 and 38 show the detailed process flow of the message transmission processing which is invoked at step S105 and S116.

(S105-1) The protocol controller 22 determines what kind of message processing is intended. If it is a service change request, the process advances to step S105-2. If it is the authentication result, the process proceeds to step S105-12. Otherwise, the process branches to step S105-19.

(S105-2) The protocol controller 22 creates an SCR message.

(S105-3) The protocol controller 22 determines whether an address proxy change request is intended. If so, the process advances to step S105-10. Otherwise, the process proceeds to step S105-4.

(S105-4) The protocol controller 22 retrieves a session transaction by using the specified session ID and examines its Home Agent Address field. If a valid home agent address other than "0.0.0.0" is found in the field, it indicates that the home agent has been allocated by the AAAH 20 itself. If this is the case, the process advances to step S105-5. On the other hand, the zero-valued address "0.0.0.0" suggests that an AAAF has allocated the home agent. In this case, the process proceeds to step S105-6.

(S105-5) The protocol controller 22 sends an SCR message to the home agent IP address found at step S105-4.

(S105-6) Since no valid address is found, the protocol controller 22 now refers to the HA-managing AAAF Address field in the session transaction and sends an SCR message to that AAAF IP address.

(S105-7) Referring to the session transaction, the protocol controller 22 checks whether the HA-managing AAAF Address is equal to the Current AAAF Address. If so, the process advances to step S105-8. Otherwise, the process proceeds to step S105-9.

(S105-8) The protocol controller 22 sets "FA Change Requested" to the Current State field of the session transaction, and then it exits from the message transmission process.

(S105-9) The protocol controller 22 sets "HA Change Requested" to the Current State field of the session transaction. Then it exits from the message transmission process.

(S105-10) Now that an address proxy change request is present, the protocol controller 22 sends an SCR message to the address proxy server.

(S105-11) The protocol controller 22 then sets "Address Proxy Change Requested" to the Current State field of the session transaction, and it exits from the process.

(S105-12) The protocol controller 22 checks the result of the mobile node authentication. If the mobile node has been successfully authenticated, the process advances to step S105-13. If not, the process branches to step S105-17.

(S105-13) The protocol controller 22 determines which AAA server (i.e., AAAF or AAAH) allocates a home agent to the mobile node. This decision actually depends on the service provider's local policy. If it is AAAH, then the process advances to step S105-14. If it is AAAF, the process branches to step S105-15.

(S105-14) The protocol controller 22 sends a Home-Agent-MIP-Request (HAR) to the home agent that is specified in the AMR message, or that is dynamically allocated by the AAAH.

(S105-15) The protocol controller 22 sends an AA-Mobile-Node-Answer (AMA) message to the requesting AAAF. It then enters the IP address of this AAAF to the HA-managing AAAF Address field of the session transaction. The process then proceeds to step S105-16.

(S105-16) The protocol controller 22 sets "HA Registration Requested" to the Current State field in the session transaction, and then it exits from the process.

(S105-17) Now that the authentication has failed, the protocol controller 22 sends an AMA message to the requesting AAAF, which includes an error code to inform the AAAF that the mobile node's authentication data is invalid.

(S105-18) The protocol controller 22 then sets "Waiting" to the Current State field of the session transaction, and it exits from the process.

(S105-19) The protocol controller 22 sends a message according to a given specific protocol, and then it terminates the process.

Figure 39:
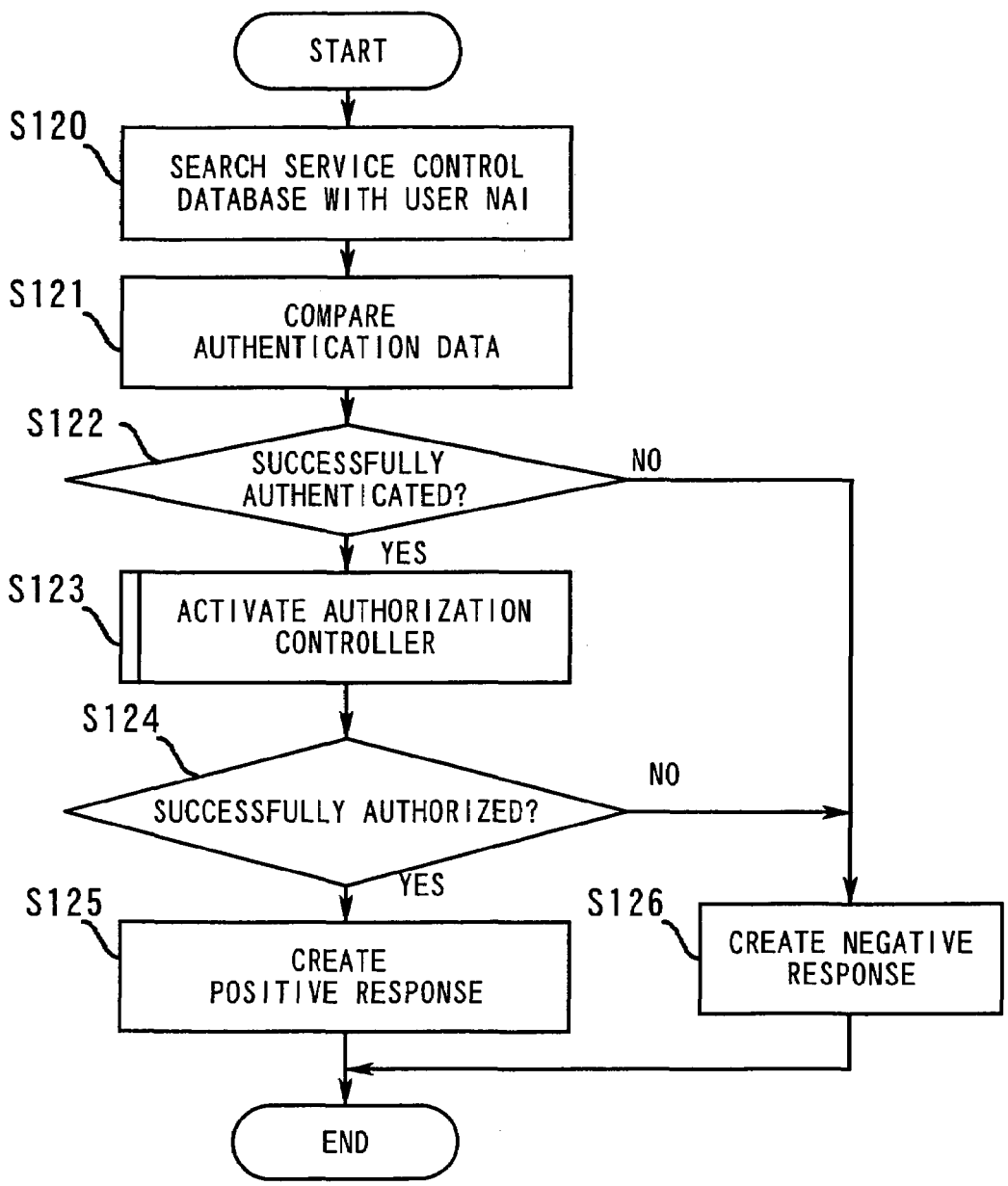
FIG. 39 is a flowchart which shows the operation of an authentication controller.

FIG. 39 shows a process flow of the authentication controller 23, which is called by the protocol controller 22 at step S104 (FIG. 35).

(S120) Upon receiving an authentication request, the authentication controller 23 retrieves relevant authentication data from the service control database 10 by using the user's NAI as a search keyword.

(S121) The authentication controller 23 then compares the retrieved authentication data with that in the received AMR message.

(S122) If the two sets of authentication data agree with each other, the process advances to step S123. Otherwise, the process branches to step S126.

(S123) If the user is successfully authenticated, the authentication controller 23 then activates the authorization controller 24.

(S124) The authentication controller 23 receives the authorization result. If the user is successfully authorized, then the process advances to step S125. If the authorization has failed, the process proceeds to step S126.

(S125) The authentication controller 23 creates a positive response message indicating successful authentication and authorization. It then terminates the process, returning the created response message to the calling process.

(S126) For notification of the fact that the user has failed to authenticate or authorize himself/herself, the authentication controller 23 creates a negative response message that indicates unsuccessful authentication or authorization. It then terminates the process, returning the created response message to the calling process.

Figure 40:
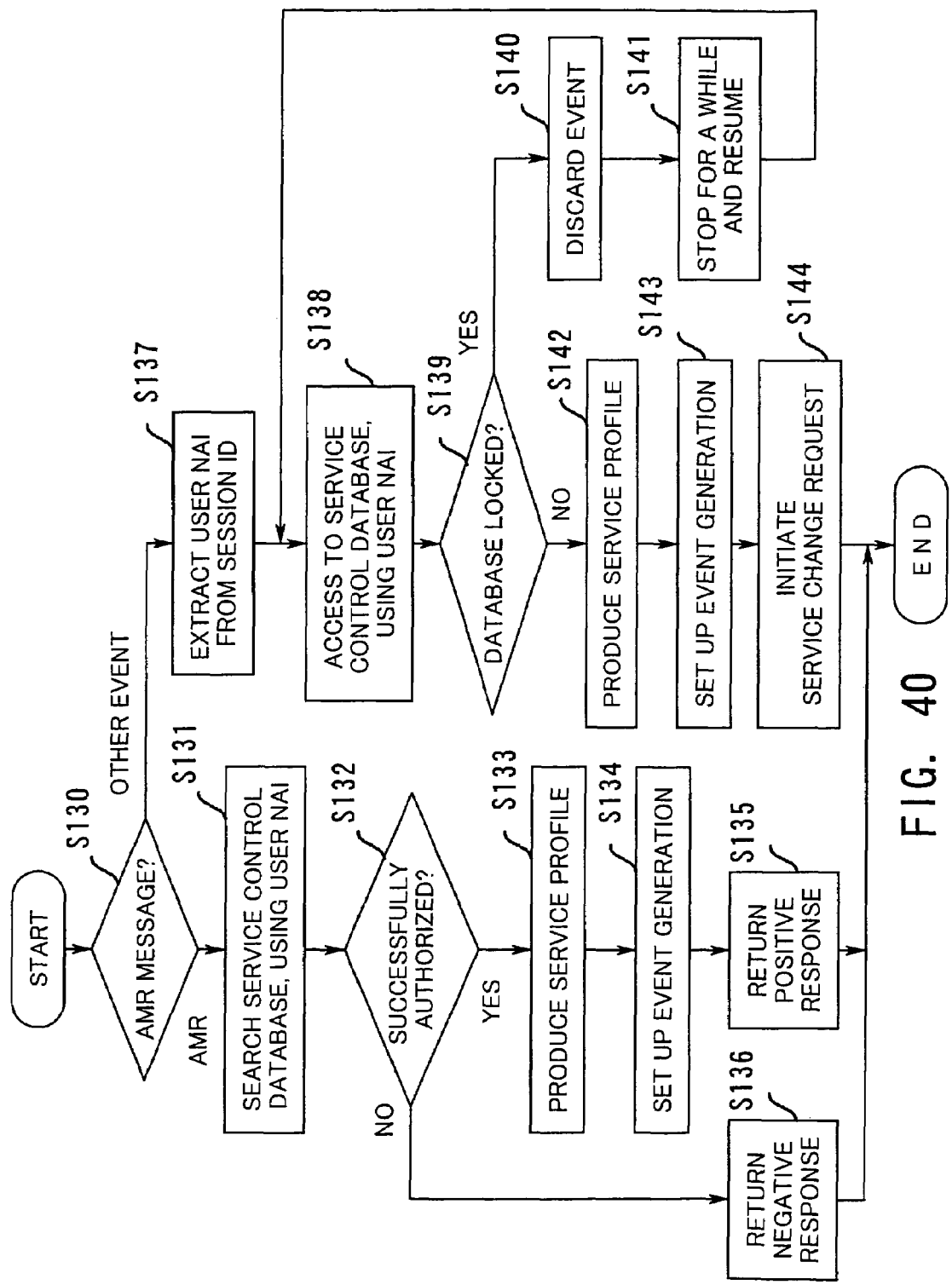
FIG. 40 is a flowchart which shows the operation of an authorization controller.

FIG. 40 shows a process flow of the authorization controller 24, which is called by the authentication controller 23 at step S123 (FIG. 39).

(S130) The authorization controller 24 determines whether the received message is an AMR message. If it is AMR, the process advances to step S131. If it indicates any other event, the process branches to step S137.

(S131) The authorization controller 24 searches the service control database 10 by using the user's NAI as a keyword, which is contained in the received AMR message.

(S132) The authorization controller 24 determines whether to authorize the use of network resources and services, by examining the control conditions described in the user's service control data. If the user is successfully authorized, the process advances to step S133. If not, the process goes to step S136.

(S133) Based on the retrieved service control data, the authorization controller 24 creates a service profile for controlling data packets to/from the user.

(S134) The service control data may include some time ranges, service charges, or any other variable factors that would affect the level of service. In this case, the authorization controller 24 configures the accounting controller 25 and/or network control mechanism 80 so that they will generate an event signal when the specified conditions are met. Details of this part, however, will not be explained here.

(S135) The authorization controller 24 creates a positive response message for a notification that the user has been successfully authorized. The authorization controller 24 then terminates the process, returning the created response message to the calling process.

(S136) The authorization controller 24 creates a negative response message for a notification that the user has failed to be authorized. The authorization controller 24 then terminates the process, returning the created response message to the calling process.

(S137) The authorization controller 24 extracts the user NAI, searching for a relevant session transaction having a session ID that is specified in the event. (Alternatively, the session ID may be obtained from a table that associates protocol message identifiers with session IDs, which is produced when the event condition is set.

(S138) The authorization controller 24 searches the service control database by using the user NAI as a keyword.

(S139) The authorization controller 24 determines whether the service control database is being locked because some other entity is using it. If so, the process advances to step S140. If not, the process proceeds to step S142.

(S140) The authorization controller 24 neglects the received event.

(S141) The authorization controller 24 stops processing for a while, and then resumes from step S138 for.

(S142) Since the database access has been successful, the authorization controller 24 now produces a service profile for controlling data packets to/from the user, based on the retrieved service control data. This service profile identifier includes the session ID specified in the event message.

(S143) The service control data may include some time ranges, service charges, or any other variable factors that would affect the service profile. In this case, the authorization controller 24 configures the accounting controller 25 and/or network control mechanism 80 so that they will generate an event signal when the specified conditions are met.

(S144) The authorization controller 24 produces a message transmission request including a service change request.

Figures 41A, 41B:
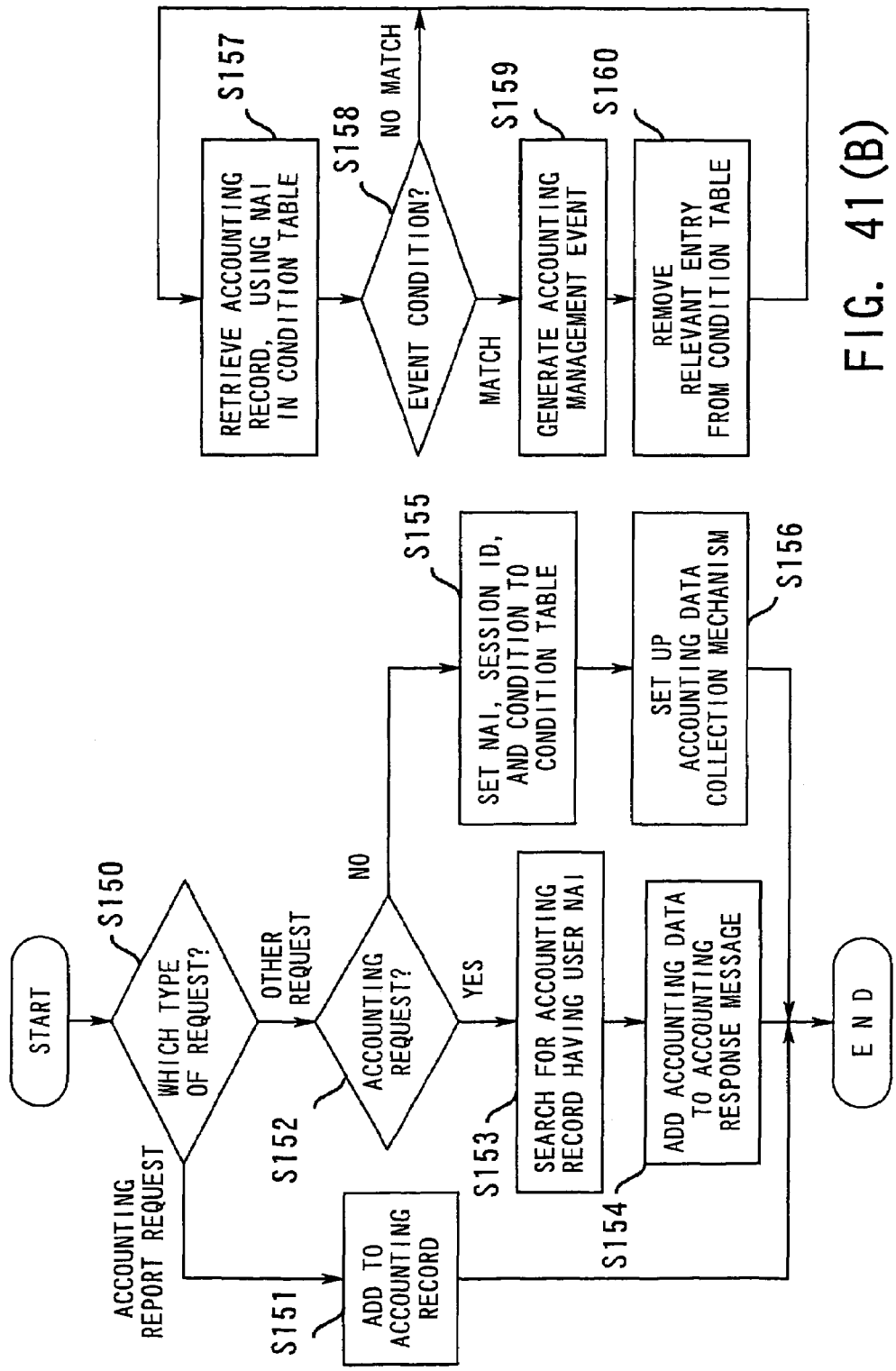
FIG. 41(A) is a flowchart which shows the operation of an accounting controller.
FIG. 41(B) is a flowchart of another process that the accounting controller executes in parallel with its main process of FIG. 41(A)

FIGS. 41(A) and 41(B) are flowcharts showing how the accounting controller 25 operates. In parallel with its main process of FIG. 41(A), the accounting controller 25 periodically executes another process depicted in FIG. 41(A) to monitor some internal events in it. The following steps S150 to S156 are the main processing steps.

(S150) When a processing request is given, the accounting controller 25 first determines which type of request it is. If it is an accounting report request, the process advances to step S151. If not, the process proceeds to step S152 for further determination.

(S151) The accounting controller 25 adds a charge to the accounting record of the user, and then it exits from the process.

(S152) The accounting controller 25 determines whether the request is an accounting request. If so, the process advances to step S153. Otherwise, the process branches to step S155.

(S153) Using the specified NAI of the user as a keyword, the accounting controller 25 searches the accounting database for the user's accounting record.

(S154) Based on the retrieved record, the accounting controller 25 constructs an accounting response message including the user's accounting data. Then it exits from the process.

(S155) The received request is now interpreted as an event setup request. Then the accounting controller 25 sets the specified NAI, session ID, and other conditions to its local condition table 701 shown in FIG. 43.

(S156) The accounting controller 25 sets up the accounting data collection mechanism 81 so as to generate a report that meets the required accuracy level, depending the conditions established at step S155. For example, the accounting data collection mechanism 81 is allowed to provide an accounting report at a moderate pace as long as the user has not used the contracted service so much. On the other hand, when the usage-based service charge has almost reached the predetermined amount, the accounting data collection mechanism 81 must report the situation more frequently. After setting such conditions, the accounting controller 25 terminates the process.

The following steps S157 to S160 are executed periodically and independently of the above steps.

(S157) The accounting controller 25 retrieves an accounting record associated with the NAI that is registered in an entry of the condition table 701 (FIG. 43).

(S158) The accounting controller 25 compares the retrieved accounting record with a condition stated in the condition table 701. If the record does not agree with the conditions specified in the present entry, the accounting controller 25 seeks the next entry, updating its pointer to the condition table 701. In this way, the process repeats the steps S157 and S158 until a match is found. If there is a match, the process proceeds to step S159.

(S159) The accounting controller 25 then produces an accounting management event with the session ID that is recorded in the matched entry of the condition table 701.

(S160) The accounting controller 25 removes that entry from the condition table 701. It then moves the table pointer again and repeats the process from step S157.

According to the present invention, the proposed network system 1 updates the service profile in a variety of situations. The following section will present a few different situations where the entities of the network system 1 exchange Mobile IP and DIAMETER messages to update their service profile setups.

Figure 44:
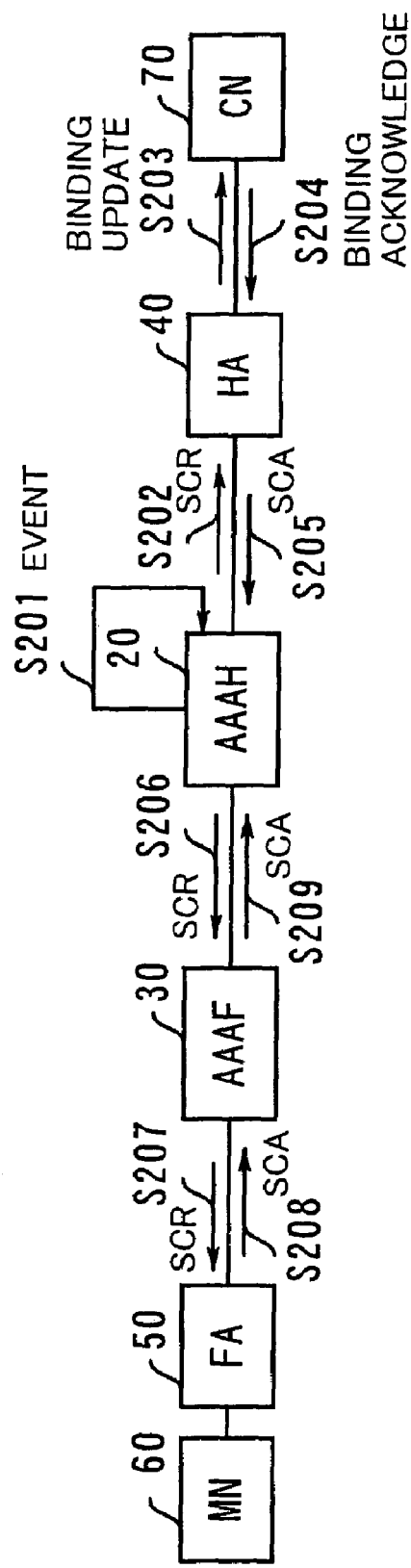
FIG. 44 shows a service profile updating process triggered by an AAAH internal event in such a situation where the home agent has been allocated by AAAH.

Referring first to FIG. 44, a first example situation is depicted, in which an event detected within the AAAH 20 initiates a service profile change.

(S201) The AAAH 20 has been monitoring some conditions since the location registration of the mobile node 60. It now produces an event signal internally, indicating that one of the predefined conditions is met. Then the AAAH 20 searches for a relevant session transaction having a session ID that is indicated in the event signal. Subsequently, it extracts the user NAI from the session transaction, and then retrieves relevant service control data from the service control database 10 by using the NAI as a keyword.

Based on the retrieved service control data, the AAAH 20 produces a new service profile for the user. The profile identifier is determined as a combination of the session ID contained in the event signal and a profile number. The profile number may be newly assigned each time, or it may be the same as what has been previously defined in the location registration procedure. The AAAH 20 looks into the retrieved session transaction to investigate which server allocated the current home agent 40 to the mobile node 60.

(S202) In the present context, the AAAH 20 oversees the home agent 40. Therefore, an SCR message carrying the new service profile is sent from the AAAH 20 to the home agent 40.

(S203) Upon receipt of that SCR message, the home agent 40 first removes the current service profile, which has the same profile identifier as that being specified in the received SCR message, from its local service profile cache. The home agent 40 then enters the received new service profile to the service profile cache. In this way, the service profile entry with the specified profile identifier is replaced with the new one. (Alternatively, all cache entries having the specified session ID may be replaced.)

Retrieving a mobility binding from its session transaction, the home agent 40 determines whether there is any correspondent node which can directly tunnels packets to the mobile node 60 through an optimized path. In the present example (and also in other examples that follow), it is assumed that the correspondent node 70 has been subjected to such path optimization. Accordingly, the home agent 40 sends a Binding Update message to the correspondent node 70 which includes the new service profile.

(S204) Upon receiving the Binding Update message, the correspondent node 70 replaces its current service profile with the new service profile specified in the received message in the same way as the home agent 40 has done. The correspondent node 70 then returns a Binding Acknowledge message back to the home agent 40 as the response to the Binding Update message of step S203.

(S205) Receiving the Binding Acknowledge message, the home agent 40 sends an SCA message to the AAAH 20. The AAAH 20 is the sender of the SCR message, and this SCA message is a response to its request.

(S206) Upon receipt of SCA from the home agent 40, the AAAH 20 checks the Current State field of the session transaction to determine whether the session is in the "HA Change Requested" state. Since this test yields a result "true" in the present context, the AAAH 20 sends an SCR message containing the new service profile to the current AAAF 30, which is recorded in the Current AAAF Address field of the session transaction (FIG. 11). The AAAH 20 then sets "FA Change Requested" to the Current State field of the session transaction.

(S207) Upon receipt of the SCR, the AAAF 30 locates a relevant session transaction with the specified session ID and then tests whether the current home agent 40 has been allocated by the AAAF 30 itself. This test results in "false" in the present example, and therefore the AAAF 30 forwards the SCR message to the current foreign agent 50 which is specified in the session transaction. The AAAF 30 then sets "FA Change Requested" to the Current State field of the session transaction.

(S208) Upon receipt of the SCR, the foreign agent 50 replaces its current service profile with the new service profile specified in the received message in the same way as the home agent 40 has done. The foreign agent 50 then sends an SCA message back to the AAAF 30 as the response to the SCR.

(S209) The AAAF 30 receives SCA from the foreign agent 50. Since the Current State field of the session transaction indicates that the session is in the "FA Change Requested" state, the AAAF 30 forwards the SCA message to the AAAH 20, which originated the SCR message at step S206. The AAAH 20 neglects the received SCA message this time, because the session is currently in the "FA Change Requested" state.

Figure 45:
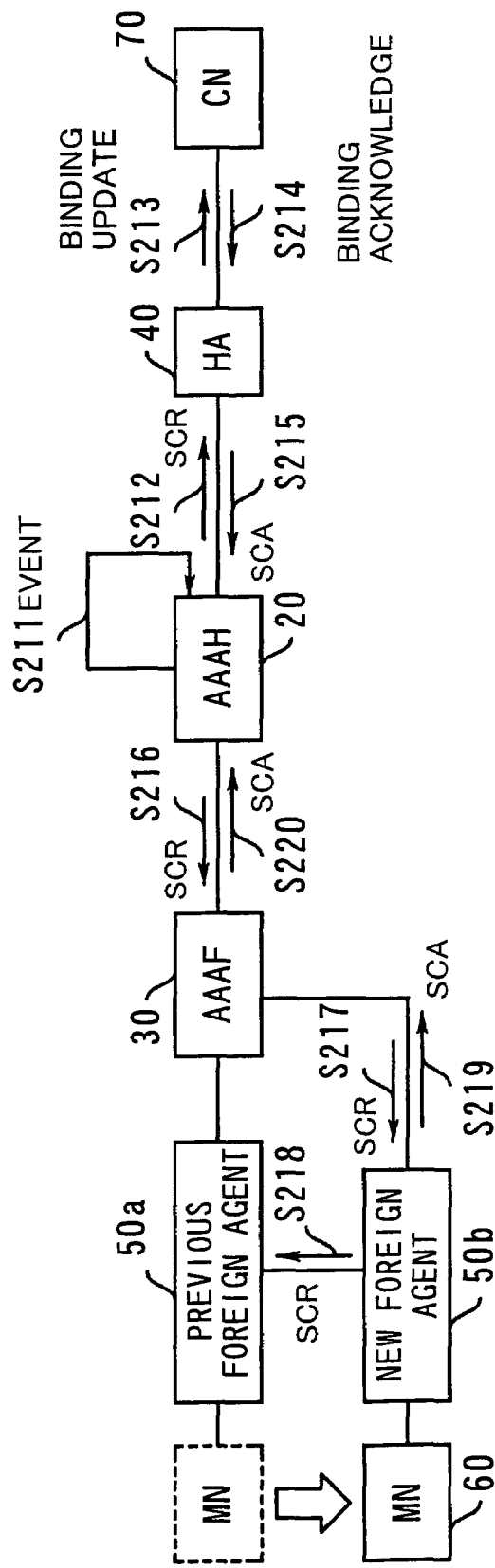
FIG. 45 shows a service profile updating process triggered by an AAAH internal event in such a situation where the home agent has been allocated by AAAH and the mobile node has moved and registered with another foreign agent within the same administrative domain.

FIG. 45 shows another example situation, where the mobile node 60 has changed its location from the previous foreign agent 50a to the new foreign agent 50b within the same administrative domain of the AAAF 30. The home agent 40 of the mobile node 60 has been allocated by the AAAH 20. In this situation, an event detected in the AAAH 20 initiates a service profile updating procedure in the following sequence of processing steps.

(S211) The AAAH 20 has been monitoring some conditions since the location registration of the mobile node 60, and it now produces an internal event signal indicating that one of the predefined conditions is met. Then the AAAH 20 searches for a relevant session transaction having a session ID that is indicated in the event signal. Subsequently, it extracts the user NAI from the session transaction, and then retrieves relevant service control data from the service control database 10 by using the NAI as a search keyword. Based on the retrieved service control data, the AAAH 20 produces a new service profile for the user, the profile identifier of which contains the session ID indicated in the event signal. The AAAH 20 also looks into the retrieved session transaction to investigate which server allocated the current home agent 40 to the mobile node 60.

(S212) The AAAH 20 oversees the home agent 40 in the present example, and therefore, it sends an SCR message carrying the new service profile to the home agent 40.

(S213) Upon receipt of that SCR message, the home agent 40 first removes the current service profile, which has the same profile identifier as that being specified in the received SCR message, from its local service profile cache. The home agent 40 then enrolls the received new service profile to the service profile cache. The home agent 40 retrieving a mobility binding from its session transaction, identifies a correspondent node 70 having an optimized path to the mobile node 60, and sends to this correspondent node 70 a Binding Update message containing the new service profile.

(S214) Upon receiving the Binding Update message, the correspondent node 70 replaces its current service profile with the new service profile specified in the received message. The correspondent node 70 then responds to the home agent 40 by sending back a Binding Acknowledge message.

(S215) Receiving the Binding Acknowledge message, the home agent 40 sends an SCA message to the requesting AAAH 20 as a response to the SCR message received at step S212.

(S216) Upon receipt of the SCA message, the AAAH 20 checks the Current State field of the session transaction to determine whether the session is in the "HA Change Requested" state. Since this test yields a result "true" in the present context, the AAAH 20 sends an SCR message containing the new service profile to the current AAAF 30, which is identified by the Current AAAF Address field of the session transaction (FIG. 11). The AAAH 20 then sets "FA Change Requested" to the Current State field of the session transaction.

(S217) Upon receipt of the SCR, the AAAF 30 locates a relevant session transaction with the specified session ID and then tests whether the current home agent 40 has been allocated by the AAAF 30 itself. Since this test results in "false" in the present example, the AAAF 30 consults the session transaction to see whether its Previous Foreign Agent NAI field holds a valid value. As previously stated, it is assumed in the present example that the mobile node 60 has changed its point of attachment from the previous foreign agent 50a to another foreign agent 50b. Thus the session transaction stores the NAI of the foreign agent 50a in its Previous Foreign Agent NAI field, as well as the NAI of the new foreign agent 50b in its Current Foreign Agent NAI field. Accordingly, the AAAF 30 forwards the SCR message with a Previous-FA-NAI AVP to the new foreign agent 50b, and then sets "FA Change Requested" to the Current State field of the session transaction.

(S218) Receiving the SCR message, the foreign agent 50b replaces its current service profile with the new service profile specified in the request. The SCR message contains a Previous-FA-NAI AVP, which allows the foreign agent 50b to send the Binding Update message containing the new service profile to the IP address of the previous foreign agent 50a.

(S219) The new foreign agent 50b returns an SCA message to the AAAF 30 as the response to the SCR message.

(S220) The SCA message arrives at the AAAF 30. Since the session is in the "FA Change Requested" state, the AAAF 30 forwards the SCA message to the AAAH 20, which originated the SCR message at step S216. The AAAH 20 neglects the received SCA message this time, because the session is currently in the "FA Change Requested" state.

Figure 46:
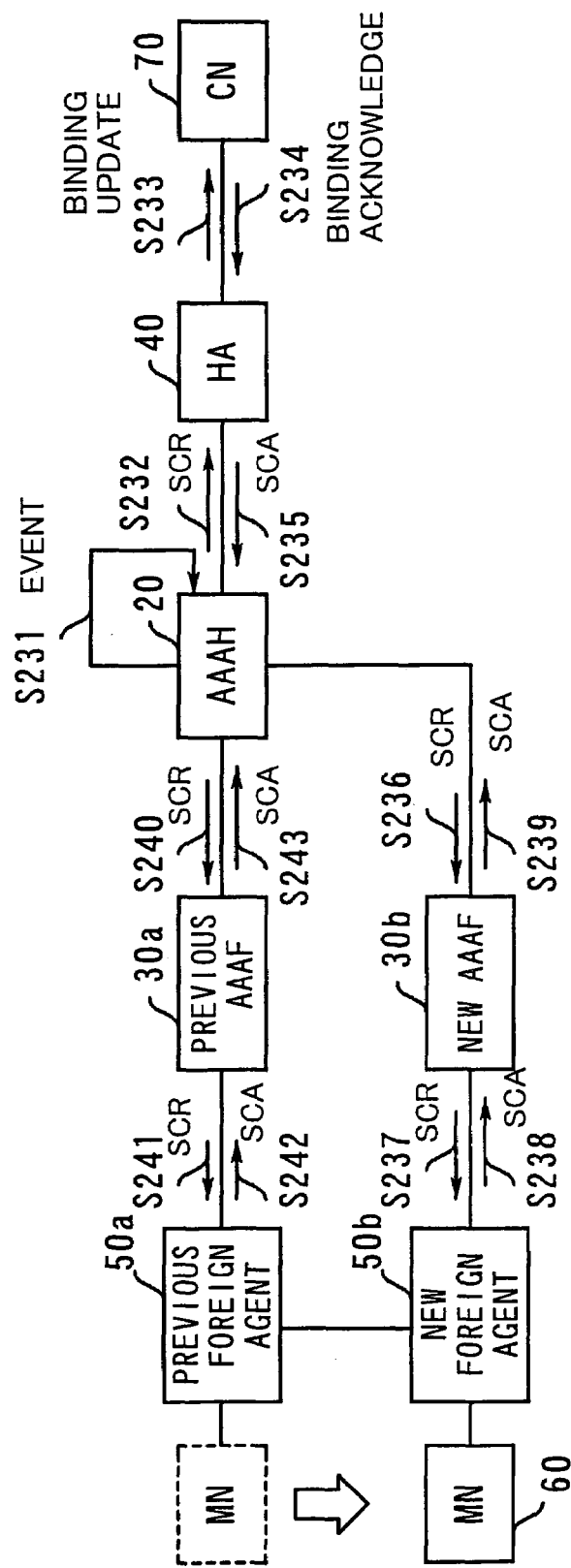
FIG. 46 shows a service profile updating process triggered by an AAAH internal event in such a situation where the home agent has been allocated by AAAH and the mobile node has moved and registered with a new foreign agent in a different administrative domain.

FIG. 46 shows yet another example situation as follows. In an attempt to make access from a foreign network under the control of a foreign agent 50a, the mobile node 60 initiates a location registration procedure. The AAAH 20 allocates a home agent 40 on behalf of the mobile node 60, and some necessary service control data for the user is applied to the communication path between the home agent 40 and foreign agent 50a. The mobile node 60 communicating with a correspondent node 70 now roams into another foreign network in a different AAAF's administrative domain. That is, the mobile node 60 has changed its point of attachment from the previous foreign agent 50a to a new foreign agent 50b in the domain of a new AAAF 30b. In such a situation, an event detected in the AAAH 20 initiates a service profile updating procedure in the following sequence of processing steps.

(S231) The AAAH 20 has been monitoring some conditions since the location registration of the mobile node 60, and it now produces an internal event signal indicating that one of the predefined conditions is met. Then the AAAH 20 searches for a relevant session transaction having a session ID that is indicated in the event signal. Subsequently, it extracts the user NAI from the session transaction, and then retrieves relevant service control data from the service control database 10 by using the NAI as a search keyword. Based on the retrieved service control data, the AAAH 20 produces a new service profile for the user, the profile identifier of which contains the session ID indicated in the event signal. The AAAH 20 also looks into the retrieved session transaction to investigate which server allocated the current home agent 40 to the mobile node 60.

(S232) The AAAH 20 oversees the home agent 40 in the present example, and therefore, it sends an SCR message carrying the new service profile to the home agent 40.

(S233) Upon receipt of that SCR message, the home agent 40 first removes the current service profile, which has the same profile identifier as that being specified in the received SCR message, from its local service profile cache. The home agent 40 then enrolls the received new service profile to the service profile cache. Referring to the session transaction to retrieve a mobility binding, the home agent 40 identifies a correspondent node 70 having an optimized path to the mobile node 60, and sends to this correspondent node 70 a Binding Update message containing the new service profile.

(S234) Upon receiving the Binding Update message, the correspondent node 70 replaces its current service profile with the new service profile specified in the received message. The correspondent node 70 then responds to the home agent 40 by sending back a Binding Acknowledge message.

(S235) Receiving the Binding Acknowledge message, the home agent 40 sends an SCA message to the requesting AAAH 20 as a response to the SCR message received at step S212.

(S236) In response to the SCA message from the home agent 40, the AAAH 20 tests whether the session is in the "HA Change Requested" state. Since this test yields a result "true" in the present context, the AAAH 20 sends an SCR message containing the new service profile to the new AAAF 30b. Note that this destination address is found in the Current AAAF Address field of the session transaction (FIG. 11). Because the AAAF address has changed in the present example situation, the AAAH 20 sets "FA Change Requested (2)" to the current state filed of the relevant session transaction.

(S237) Upon receipt of the SCR, the AAAF 30b locates a relevant session transaction with the specified session ID and then tests whether the current home agent 40 has been allocated by the AAAF 30b itself. Since this test results in "false" in the present example, the AAAF 30b then consults the session transaction to see whether its Previous Foreign Agent NAI field holds a valid NAI. This test yields a "false" result because the previous foreign agent 50a is under the control of the other AAAF 30a. Accordingly, the new AAAF 30b forwards the SCR message to the IP address of the new foreign agent 50b, which is found in the Current Foreign Agent NAI field of the session transaction. The AAAF 30b then sets "FA Change Requested" to the Current State field of the session transaction.

(S238) Receiving the SCR message, the new foreign agent 50b replaces its current service profile with the new service profile specified in the request, and then it returns an SCA message to the new AAAF 30b as the response to its request.

(S239) The SCA message arrives at the new AAAF 30b. Since the session is in the "FA Change Requested" state, the AAAF 30b forwards the SCA message to the AAAH 20, which originated the SCR message at step S236.

(S240) Upon receiving the SCA message from the new AAAF 30b, the AAAH 20 looks into the Current Session Status. Since it indicates the "FA Change Requested (2)" state, the AAAH 20 now supplies the previous AAAF 30a with the same SCR message that it sent to the new AAAF 30b. The AAAH 20 changes the Current State field to "FA Change Requested."

(S241) Upon receipt of the SCR, the previous AAAF 30a locates a relevant session transaction with the specified session ID and then tests whether the current home agent 40 has been allocated by the AAAF 30a itself. Since this test results in "false" in the present context, the AAAF 30a then consults the session transaction to see whether its Previous Foreign Agent NAI field holds a valid NAI. In the present case, the NAI of the previous foreign agent 50a is not found in the Previous Foreign Agent NAI field, but still in the Current Foreign Agent NAI field of the session transaction. For this reason, the AAAF 30a forwards the SCR message to the foreign agent 50a, setting "FA Change Requested" to the Current State field.

(S242) In response to the SCR message, the previous foreign agent 50a replaces its current service profile with the new service profile specified in the request. It then sends an SCA message back to the AAAF 30a as the response to the SCR.

(S243) The SCA message arrives at the AAAF 30a. Since the session is currently in the "FA Change Requested" state, the AAAF 30a transfers the SCA message to the AAAH 20, which originated the SCR message at step S240. The AAAH 20 neglects the received SCA message this time, because the session is currently in the "FA Change Requested" state.

Figure 47:
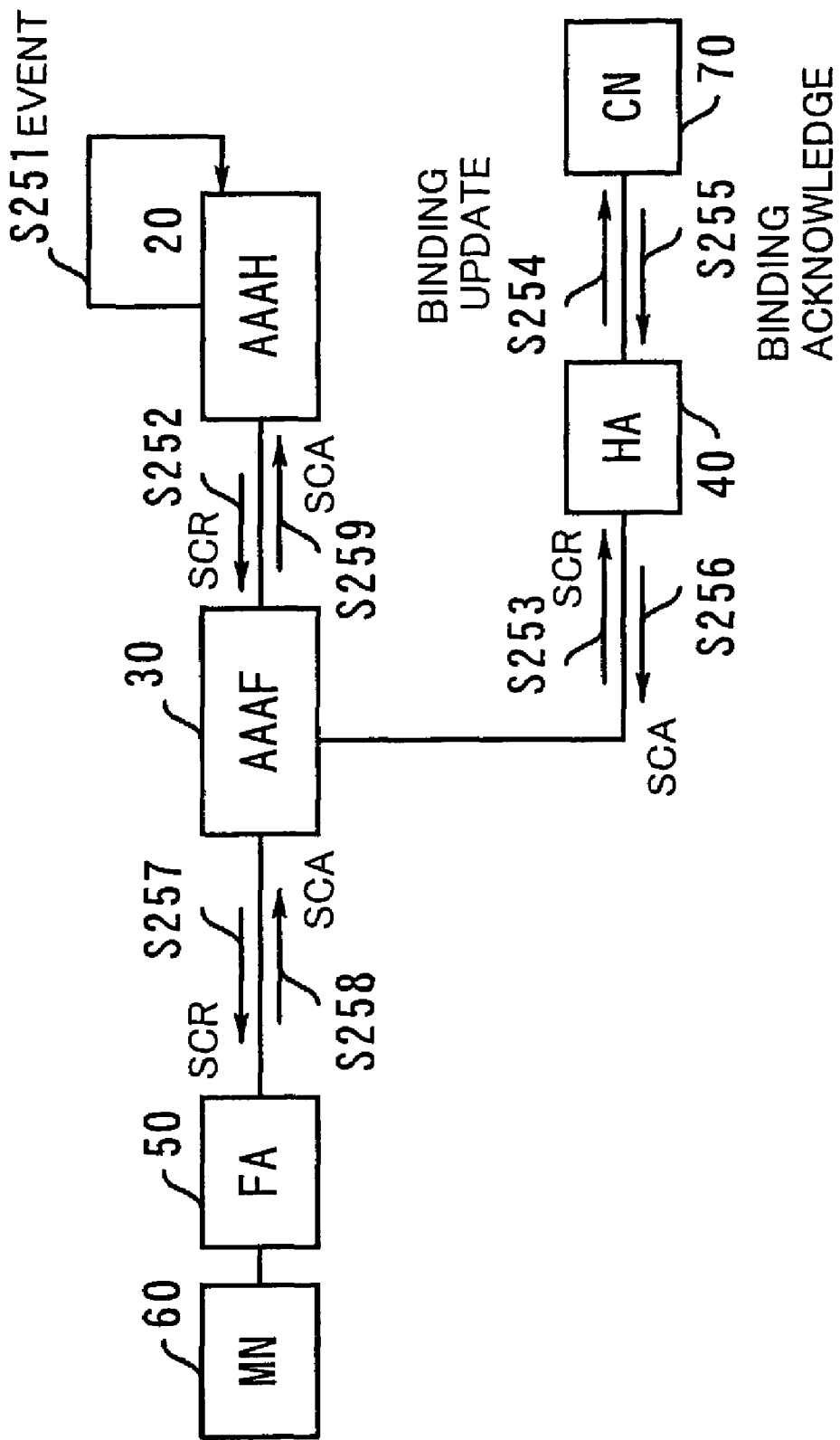
FIG. 47 shows a service profile updating process triggered by an AAAH internal event in such a situation where the home agent has been allocated by AAAF.

FIG. 47 shows still another example situation. In an attempt to make access from a foreign network under the control of a foreign agent 50, the mobile node 60 initiates a location registration procedure. The AAAF 30 allocates a home agent 40 on behalf of the mobile node 60, and some necessary service control data for the user is applied to the communication path between the home agent 40 and foreign agent 50. The mobile node 60 is now communicating with a correspondent node 70 through the above path. In such a situation, an event detected in the AAAH 20 initiates a service profile updating procedure in the following sequence of processing steps.

(S251) The AAAH 20 has been monitoring some conditions since the location registration of the mobile node 60, and it now produces an internal event signal indicating that one of the predefined conditions is met. Then the AAAH 20 searches for a relevant session transaction having a session ID that is indicated in the event signal. Subsequently, it extracts the user NAI from the session transaction, and then retrieves relevant service control data from the service control database 10 by using the NAI as a search keyword. Based on the retrieved service control data, the AAAH 20 produces a new service profile for the user, the profile identifier of which contains the session ID indicated in the event signal. The AAAH 20 also looks into the retrieved session transaction to investigate which server allocated the current home agent 40 to the mobile node 60.

(S252) According to the present assumption, the IP address of the AAAF 30 must be found in the HA-managing AAAF Address field of the session transaction. Therefore, the AAAH 20 sends an SCR message carrying the new service profile to the AAAF 30. The AAAH 20 sets "FA Change Requested" to its session state since the above IP address value equals the value in the "Current AAAF Address" field of the session transaction.

(S253) Upon receipt of the SCR, the AAAF 30 locates a relevant session transaction with the specified session ID and then tests whether the current home agent 40 has been allocated by the AAAF 30 itself. This test yields a result of "true" in the present context, and therefore the AAAF 30 forwards the SCR message to the IP address of the home agent 40 which is found in the session transaction. It then sets "HA Change Requested" state to the Current State field of the session transaction.

(S254) Upon receipt of the SCR, the home agent 40 first removes the current service profile, which has the same profile identifier as that being specified in the received SCR message, from its local service profile cache. The home agent 40 then enrolls the received new service profile to the service profile cache. Referring to the session transaction to retrieve a relevant mobility binding, the home agent 40 identifies a correspondent node 70 having an optimized path to the mobile node 60, and sends to this correspondent node 70 a Binding Update message containing the new service profile.

(S255) Upon receipt of the Binding Update message, the correspondent node 70 replaces its current service profile with the new service profile specified in the received message. The correspondent node 70 then responds to the home agent 40 by sending back a Binding Acknowledge message.

(S256) Receiving the Binding Acknowledge message, the home agent 40 sends an SCA message back to the requesting AAAF 30 as a response to the SCR message received at step S253.

(S257) Upon receipt of SCA, the AAAF 30 checks the session transaction to determine whether the session is in the "HA Change Requested" state. Since this test yields a result of "true" in the present context, the AAAF 30 sends an SCR message containing the new service profile to the foreign agent 50, whose address is found in the Current Foreign Agent NAI field of the session transaction. The AAAF 30 sets "FA Change Requested" to the Current State field.

(S258) In response to the SCR message, the foreign agent 50 replaces its current service profile with the new service profile specified in the request in the same way as the home agent 40 has done. It then sends an SCA message back to the AAAF 30 as the response to the SCR.

(S259) Since the session is currently in the "FA Change Requested" state, the AAAF 30 transfers the received SCA message to the AAAH 20, which originated the SCR message at step S240. The AAAH 20, however, neglects this SCA message because the session is currently in the "FA Change Requested" state.

Figure 48:
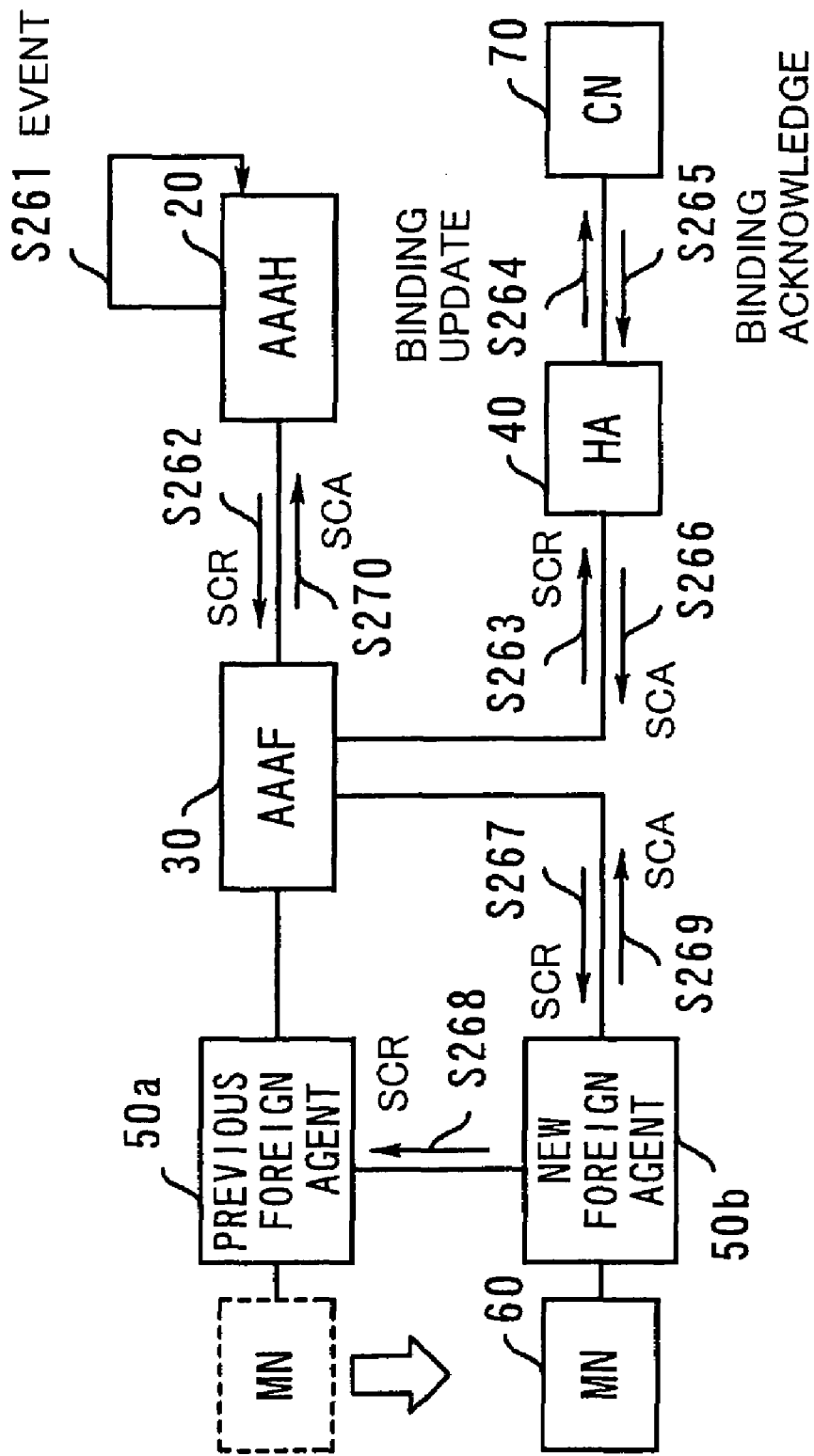
FIG. 48 shows a service profile updating process triggered by an AAAH internal event in such a situation where the home agent has been allocated by AAAF and the mobile node has moved and registered with another foreign agent within the same administrative domain.

FIG. 48 shows a further example situation, where the mobile node 60 has changed its location from the previous foreign agent 50*a* to the new foreign agent 50*b* within the same administrative domain of the AAAF 30. The home agent 40 of the mobile node 60 has been allocated by the AAAF 30. In this situation, an event detected in the AAAH 20 initiates a service profile updating procedure in the following sequence of processing steps.

(S261) The AAAH 20 has been monitoring some conditions since the location registration of the mobile node 60, and it now produces an internal event signal indicating that one of the predefined conditions is met. Then the AAAH 20 searches for a relevant session transaction having a session ID that is indicated in the event signal. Subsequently, it extracts the user NAI from the session transaction, and then retrieves relevant service control data from the service control database 10 by using the NAI as a search keyword. From the retrieved service control data, the AAAH 20 produces a new service profile for the user, the profile identifier of which contains the session ID indicated in the event signal. The AAAH 20 also looks into the retrieved session transaction to investigate which AAA server allocated the current home agent 40 to the mobile node 60.

(S262) According to the present assumption, the IP address of the AAAF 30 must be found in the HA-managing AAAF Address field of the session transaction. Therefore, the AAAH 20 sends an SCR message carrying the new service profile to the AAAF 30. The AAAH 20 sets "FA Change Requested" to its session state since the above IP address value equals the value in the "Current AAAF Address" field of the session transaction.

(S263) Upon receipt of the SCR, the AAAF 30 locates a relevant session transaction with the specified session ID and then tests whether the current home agent 40 has been allocated by the AAAF 30 itself.

This test yields a result of "true" in the present context, and therefore the AAAF 30 forwards the SCR message to the IP address of the home agent 40 which is found in the session transaction. It then sets "HA Change Requested" state to the Current State field of the session transaction.

(S264) Upon receipt of the SCR, the home agent 40 first removes the current service profile, which has the same profile identifier as that being specified in the received SCR message, from its local service profile cache. It then enrolls the received new service profile to the service profile cache. Referring to the session transaction to retrieve a relevant mobility binding, the home agent 40 identifies a correspondent node 70 having an optimized path to the mobile node 60, and sends to this correspondent node 70 a Binding Update message containing the new service profile.

(S265) The correspondent node 70 replaces its current service profile with the new service profile specified in the received Binding Update message. It then responds to the home agent 40 by sending back a Binding Acknowledge message.

(S266) Receiving the Binding Acknowledge message, the home agent 40 sends an SCA message back to the requesting AAAF 30 as a response to the SCR message received at step S263.

(S267) Upon receipt of the SCA message, the AAAF 30 checks the session transaction to determine whether the session is in the "HA Change Requested" state. Since this test yields a result of "true" in the present context, the AAAF 30 checks the session transaction to see whether its Previous Foreign Agent NAI field holds a valid NAI. As previously noted, it is assumed that the mobile node 60 has changed its point of attachment from the previous foreign agent 50*a* to another foreign agent 50*b* in the same administrative domain. Thus the session transaction stores the NAI of the foreign agent 50*a* in its Previous Foreign Agent NAI field, as well as the NAI of the current foreign agent 50*b* in its Current Foreign Agent NAI field. Accordingly, the AAAF 30 forwards the SCR message with a Previous-FANAI AVP to the new foreign agent 50*b*, while setting an "FA Change Requested" state to the session transaction.

(S268) In response to the SCR message, the foreign agent 50*b* updates its current service profile with the new service profile specified in the request. The received SCR message contains a Previous-FA-NAI AVP, which allows the foreign agent 50*b* to send the Binding Update message containing the new service profile to the IP address of the previous foreign agent 50*a*.

(S269) The new foreign agent 50*b* returns an SCA message to the AAAF 30 as the response to the SCR message.

(S270) Since the session is currently in the "FA Change Requested" state, the AAAF 30 transfers the received SCA message to the AAAH 20, which originated the SCR message at step S262. The AAAH 20 neglects this SCA message because the session is in the "FA Change Requested" state.

Figure 49:
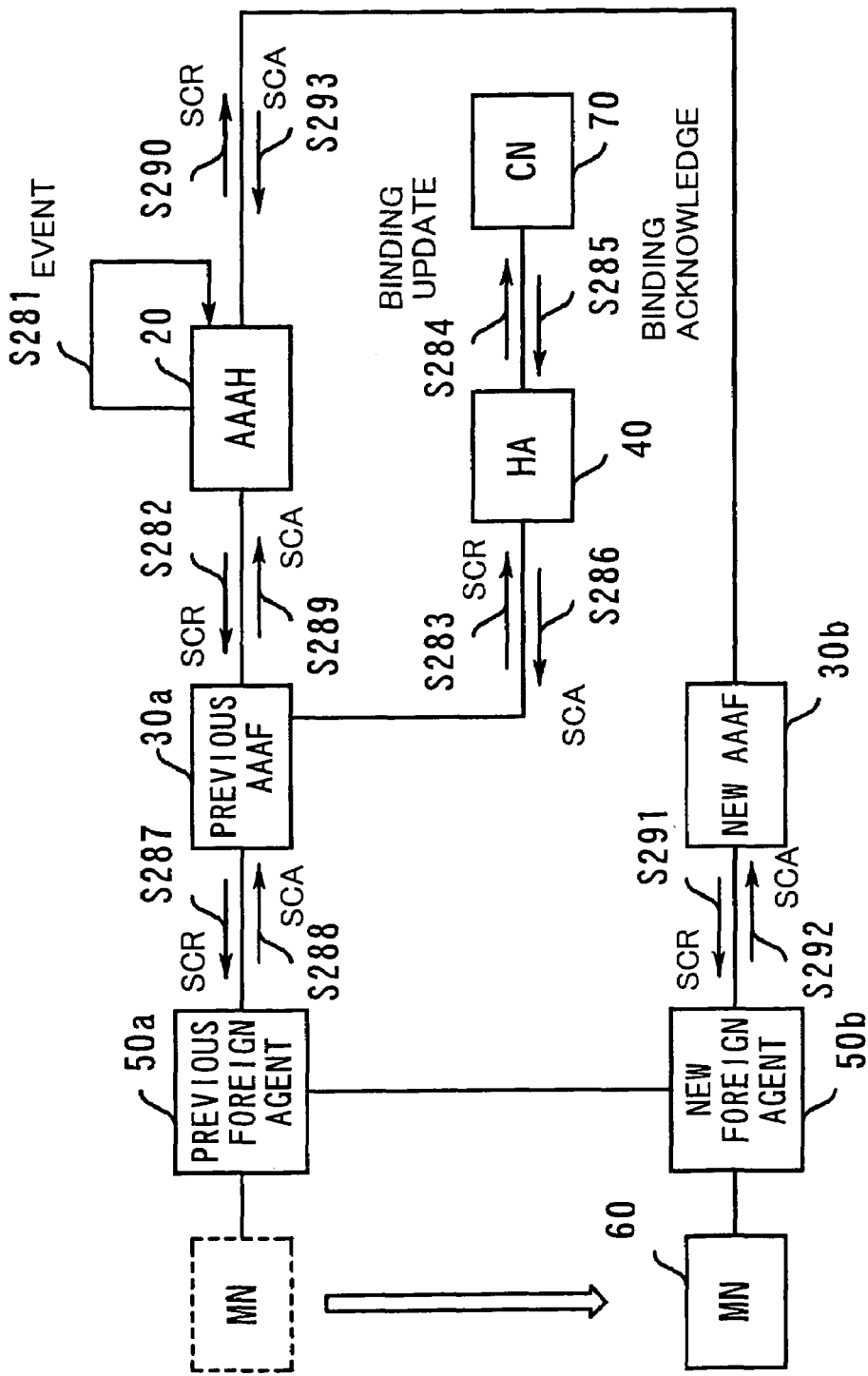
FIG. 49 shows a service profile updating process triggered by an AAAH internal event in such a situation where the home agent has been allocated by AAAF and the mobile node has moved and registered with a foreign agent in a different administrative domain.

FIG. 49 shows a still further example situation as follows. In an attempt to make access from a foreign network under the control of a foreign agent 50*a*, the mobile node 60 initiates location registration. The AAAF 30*a* allocates a home agent 40 on behalf of the mobile node 60, and some necessary service control data for the user is delivered to relevant entities along the path between the home agent 40 and foreign agent 50*a*. The mobile node 60, communicating with a correspondent node 70, now roams into another foreign network that belongs to a different AAAF's administrative domain. That is, the mobile node 60 has changed its point of attachment from the previous foreign agent 50*a* to a new foreign agent 50*b* in the domain of a new AAAF 30*b*. In such a situation, an event detected in the AAAH 20 initiates a service profile updating procedure in the following sequence of processing steps.

(S281) The AAAH 20 has been monitoring some conditions since the location registration of the mobile node 60, and it now produces an internal event signal indicating that one of the predefined conditions is met. Then the AAAH 20 searches for a relevant session transaction having a session ID that is indicated in the event signal. Subsequently, it extracts the user NAI from the session transaction, and then retrieves relevant service control data from the service control database 10 by using the NAI as a search keyword. From the retrieved service control data, the AAAH 20 produces a new service profile for the user, the profile identifier of which contains the session ID indicated in the event signal. The AAAH 20 also looks into the retrieved session transaction to investigate which AAA server allocated the current home agent 40.

(S282) Under the present assumption, the IP address of the AAAF 30*a* must be found in the HA-managing AAAF Address field of the session transaction. Therefore, the AAAH 20 sends an SCR message carrying the new service profile to the AAAF 30*a*. The AAAH 20 sets "HA Change Requested" to its session state because the above IP address value does not agree with the value in the "Current AAAF Address" field of the session transaction.

(S283) Upon receipt of the SCR, the previous AAAF 30*a* locates a relevant session transaction with the specified session ID and then tests whether the current home agent 40 has been allocated by the AAAF 30*a* itself. Since this test gives a result of "true" in the present context, the AAAF 30*a* forwards the SCR message to the home agent 40 whose IP address is found in the session transaction. It then sets "HA Change Requested" state to the Current State field of the session transaction.

(S284) Upon receipt of the SCR, the home agent 40 first removes the current service profile, which has the same profile identifier as that being specified in the received SCR message, from its local service profile cache. It then enrolls the received new service profile to the service profile cache. Referring to the session transaction to retrieve a relevant mobility binding, the home agent 40 identifies a correspondent node 70 having an optimized path to the mobile node 60, and sends to this correspondent node 70 a Binding Update message containing the new service profile.

(S285) The correspondent node 70 replaces its current service profile with the new service profile specified in the received Binding Update message. It then responds to the home agent 40 by sending back a Binding Acknowledge message.

(S286) Receiving the Binding Acknowledge message, the home agent 40 sends an SCA message back to the requesting AAAF 30*a* as a response to the SCR message received at step S283.

(S287) Upon receipt of the SCA message, the previous AAAF 30*a* checks the session transaction to determine whether the session is in the "HA Change Requested" state. Since this test yields a result of "true" in the present context, the AAAF 30 checks the session transaction to see whether its Previous Foreign Agent NAI field holds a valid NAI. In the present case, the NAI of the previous foreign agent 50*a* is not found in the Previous Foreign Agent NAI field, but still in the Current Foreign Agent NAI field of the session transaction. For this reason, the previous AAAF 30*a* forwards the SCR message to the foreign agent 50*a*, while setting an "FA Change Requested" state to the session transaction.

(S288) In response to the SCR message, the previous foreign agent 50*a* replaces its current service profile with the new service profile specified in the request. It then sends an SCA message back to the previous AAAF 30*a* as the response to the SCR.

(S289) Since the session is currently in the "FA Change Requested" state, the previous AAAF 30*a* transfers the received SCA message to the AAAH 20, which originated the SCR message at step S282.

(S290) In response to the SCA message, the AAAH 20 tests whether the session is in the "HA Change Requested" state. Since this test yields a result of "true" in the present context, the AAAH 20 sends an SCR message containing the new service profile to the current AAAF 30*b*. This destination address is found in the "Current AAAF Address" field of the session transaction (FIG. 11), and it then changes the session state from "HA Change Requested" to "FA Change Requested."

(S291) Upon receipt of the SCR, the current AAAF 30*b* locates a relevant session transaction with the specified session ID and then tests whether the current home agent 40 has been allocated by the AAAF 30*b* itself. This test results in "false" in the present example, and therefore the current AAAF 30*b* forwards the SCR message to the current foreign agent 50*b* which is specified in the session transaction. It sets "FA Change Requested" to the Current State field of the session transaction.

(S292) Receiving the SCR message, the current foreign agent 50*b* replaces its current service profile with the new service profile specified in the request, and then it returns an SCA message to the current AAAF 30*b* as the response to its request.

(S293) The SCA message arrives at the current AAAF 30*b*. Since the session is in the "FA Change Requested" state, the AAAF 30*b* forwards the SCA message to the AAAH 20, which originated the SCR message at step S290. The AAAH 20 neglects this SCA message because the session is in the "FA Change Requested" state.

Figure 50:
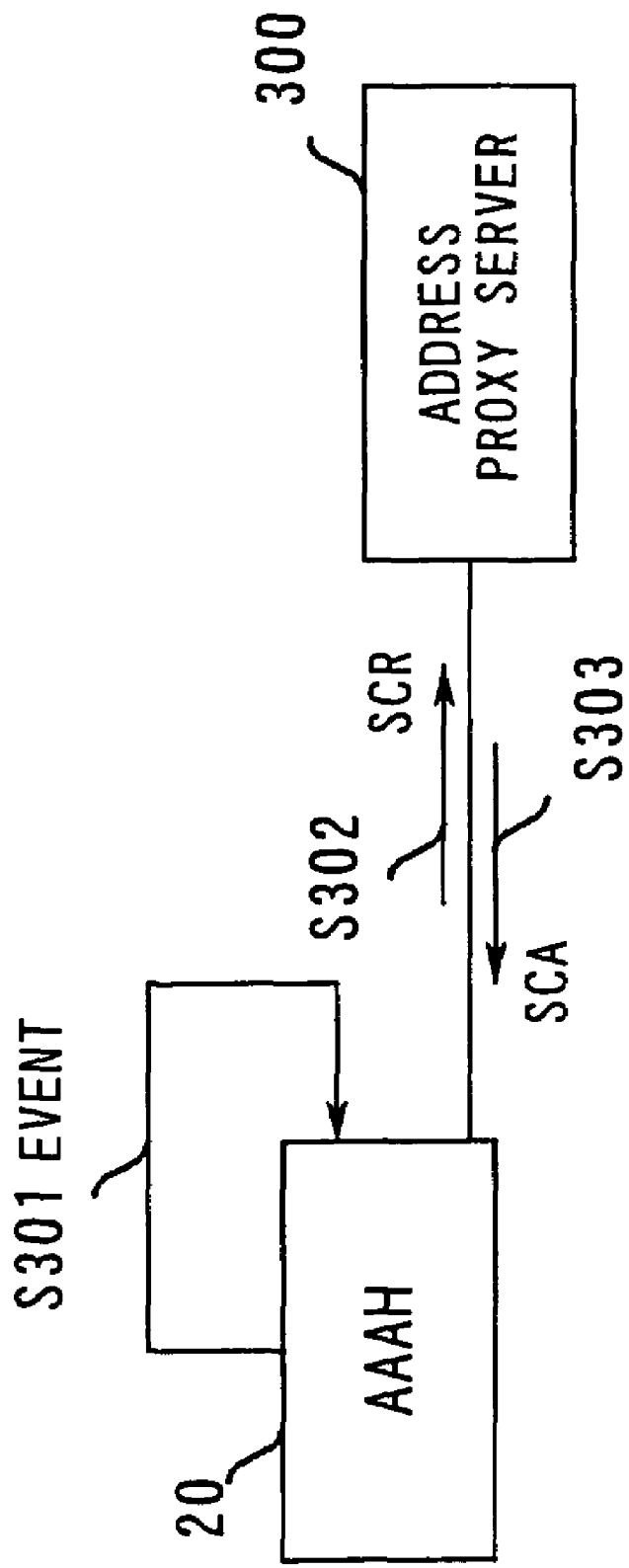
FIG. 50 shows a process of updating the service profile in an address proxy server, being triggered by an AAAH internal event.

Referring next to FIG. 50, the following section will describe how an address proxy server updates its service profile in response to an event detected within the AAAH 20. In order to provide ANYCAST and other services, an address proxy server 300 has address selection and translation functions which associate a plurality of physical addresses to an arbitrary virtual address.

(S301) The AAAH 20 detects an event that indicates some change in the network control conditions, necessitating a reconfiguration of the address selecting functions of the address proxy server 300. With the session ID indicated in the event signal, the AAAH 20 retrieves a session transaction and an address management table that are relevant to the address proxy server 300. The address management table provides a list of online terminal NAIs associated with each virtual address; the AAAH 20 maintains this table to create address selection policies. Now that the address management table is obtained, the AAAH 20 extracts all relevant terminal NAIs from the table and then retrieves corresponding service control data from the service control database 10 by using these NAIs. With the retrieved service control data, the AAAH 20 produces a new service profile for delivery to the address proxy server 300, the profile identifier of which contains the session ID indicated in the event signal.

(S302) The AAAH 20 sends an SCR message carrying the new service profile to the address proxy server 300, whose IP address is found in the Address Proxy Server Address field of the session transaction at hand (FIG. 11). The AAAH 20 then sets "Address Proxy Change Requested" to the Current State field of the session transaction.

(S303) Upon receipt of the SCR, the address proxy server 300 replaces its current service profile with the new one in the SCR. It then responds to the AAAH 20 by sending back an SCA message.

The present invention proposes a conflict avoidance mechanism to resolve concurrent accesses to the service control database 10 from the mobile user and AAAH 20. More specifically, suppose that the mobile node 60 has initiated location registration and has established the user's service profile in each relevant network node. The mobile user can change the details of his/her service contract through, for example, a web page of his/her service provider. The home server 20, on the other hand, is monitoring some service control conditions previously defined at the time of the user's location registration. If any of those conditions is met, an event signal is produced within the AAAH 20. Then the AAAH 20 searches for a relevant session transaction having a session ID that is indicated in the event signal. Subsequently, it extracts the user NAI from the session transaction, and then it attempts to read out relevant service control data from the service control database 10. The AAAH 20, however, is unable to make access to the service control database 10 because it is temporarily locked for exclusive access by the user. In such a situation, the AAAH 20 deactivates the event for the time being and tries access at appropriate intervals until it succeeds. Once its access attempt is accepted, the AAAH 20 creates a new service profile and reactivates the event, which permits the new service profile to be delivered to all the entities concerned in the way already described.

The above conflict avoidance mechanism coordinates the access to the service control database 10, allowing its records to be updated in parallel with the activities of other functional entities, including the event detection in the AAAH 20. This feature permits the user to edit a service profile without concern for the contention.

The quality of service provided to network users may not necessarily be invariant over time. Rather, the system can provide several different service classes to a single user, depending on, for example, the time of day. FIG. 51 shows an example of a service profile which provides Differentiated Services (Diffserv) using multiple service class definitions for different time slots. Suppose, for example, that a certain user made access to the network from 22:00 to 24:00. In the present example, the illustrated Diffserv service profile defines Class-C upstream data transmission without time constraints. As for the downstream direction, the policy enables Class-B service from 23:00 to 08:00, while allowing Class-C service from 08:00 to 23:00. The user logs in to the network at 22:00, which causes the authorization controller 24 to check the current time (22:00) and distribute a service profile including a Type of Service (TOS) value that specifies Class-C upstream/downstream transmission. Since the service profile includes some time specifications, the authorization controller 24 also requests the timebase server 84 to generate a timer event signal at 23:00. With the above setup, the authorization controller 24 is called up at 23:00 by the timebase server 84 through its activated timer signal. The authorization controller 24 then creates and delivers a new service profile including a TOS value for class-C upstream and Class-B downstream.

The service class may also be changed by an event related to the accounting operations. FIG. 52 shows an example of a service profile describing Diffserv policies, which downgrades the downstream service class from Class B to Class C when the amount of service charges exceeds a predetermined threshold.

More specifically, suppose that the service contract in the present example stipulates that the service class be changed when the charges have amounted to $100. As FIG. 52 shows, the Diffserv service profile allows the customer to use a Class-C upstream and Class-B downstream channels until the total amount of charges reaches the limit of $100. If it exceeds that limit, the downstream channel will be downgraded to Class C.

When the customer attaches himself/herself to the network, the authorization controller 24 asks the accounting controller 25 about the current total amount of charges. Suppose that it is within the limit of $100. Then the authorization controller 24 creates and distributes a service profile with a TOS value specifying Class-C upstream and Class-B downstream services. It also configures the accounting controller 25 so that an accounting management event will occur when the service usage exceeds $100. If this limit is reached, the accounting controller 25 notifies the authorization controller 24 by sending an accounting management event signal, causing a new service profile to be created and distributed for Class-C upstream and downstream services.

The present invention may also allows the service class to be changed by time-related events. Packet filtering rules in a service profile, for example, may include some time parameters as shown in FIG. 53. In this example, the IP address range "XXX.XXX.*.*" has to be restricted during the period between 08:00 and 21:00. Consider that the customer connects to the network at 20:00. At the time of his/her log-in, the authorization controller 24 in the AAAH 20 configures relevant network devices with a service profile intending immediate restriction of the address range "XXX.XXX.*.*" because the present time (20:00) is within the specified time range. The authorization controller 24 also makes a necessary arrangement for generating a timer event at 21:00, the time the restriction expires. At 21:00, the customer is still on line. The AAAH 20 now generates an internal event, which initiates the delivery of a new service profile to cease the IP packet filtering.

Figure 54:
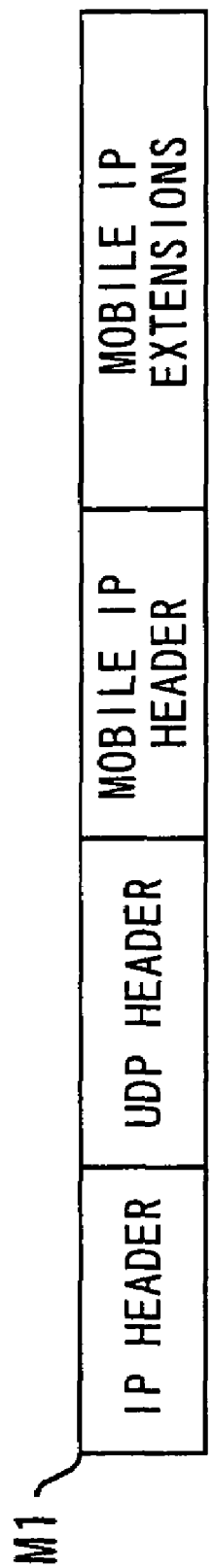
FIG. 54 shows the format of Mobile IP messages.
Figure 55:
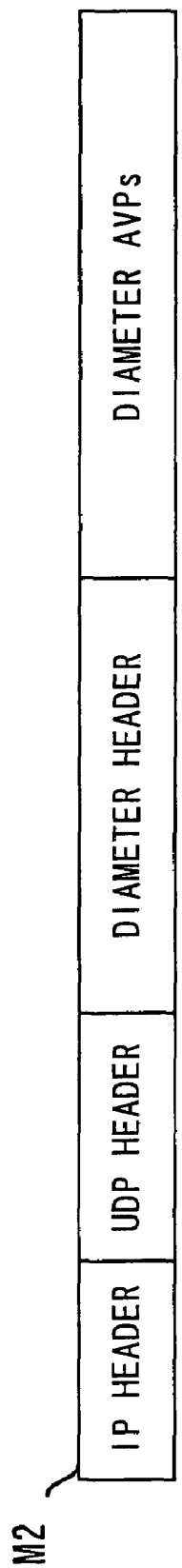
FIG. 55 shows the format of DIAMETER messages.

According to the present invention, the network entities communicate with each other by exchanging Mobile IP messages and DIAMETER messages. FIG. 54 shows the format of Mobile IP messages. The illustrated Mobile IP message Ml comprises the following components: IP header, UDP header, Mobile IP header, and Mobile IP extensions. FIG. 55 shows the structure of a DIAMETER message. This DIAMETER message M2 is composed of IP header, UDP header, DIAMETER header, and DIAMETER AVPs. FIG. 56 shows the detailed format of the IP header, which appears at the top of a Mobile IP message M1 and DIAMETER message M2.

The above explanation will now be summarized as follows. According to the present invention, the network system provides a dynamic service profile updating capability, which creates and distributes a new service profile in response to an event signal that is generated on the basis of control conditions specified in a service control database. Unlike the conventional systems, which continue to use the initial service profile provided at the time of location registration, the present invention enables the service profile to be dynamically updated even in the middle of a communication session over Mobile IP networks. The present invention also offers a conflict avoidance mechanism. With this feature, the mobile user can customize his/her service details without concern for the service profile updating operations being performed by the system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network system which controls communication between a user terminal and a peer terminal thereof over a network including a mobile domain, comprising:

(a) a home agent, coupled to the peer terminal, which maintains the location of the user terminal and tunnels packets for delivery to the user terminal;

(b) a foreign agent which detunnels and delivers the packets to the user terminal that is visiting a foreign network;

(c) a service control database which maintains a customizable service profile defining what class of service to provide to the user terminal;

(d) a home server located in a first administrative domain to which the user terminal belongs, comprising:

service profile setting means for retrieving the service profile from said service control database when the user terminal initiates a communication session, and distributing and setting the retrieved service profile to said home agent and foreign agent as an initial service profile, the service profile variably specifying services that the user terminal requires depending on control conditions, and service profile updating means for generating an event signal when one of the control conditions described in the retrieved service profile is met, obtaining a new service profile from said service control database in response to the event signal, and distributing the new service profile so as to replace the initial service profile being set in said home agent and foreign agent;

(e) a foreign server located in a second administrative domain, which forwards the initial service profile and new service profile from said home server to said foreign agent, wherein said home agent performs route optimization when a packet from the peer terminal is intercepted and tunneled to the user terminal, keeps a record about the peer terminal that has been subjected to the route optimization, and refers to the record to identify the peer terminal when a service profile change request is received from said home server; and (f) conflict avoiding means for avoiding a conflict between said service profile updating means activated by the event signal detected in said home server and a person who is attempting to modify the service profile stored in said service control database, wherein said conflict avoiding means deactivates the event signal in case of conflict, and after the modification of the service profile is finished, redistributes the service profile and reactivates the event signal.

2. The network system according to claim 1, wherein said home server generates the event signal for the update of the service profile by detecting at least one of:

an event related to user authentication.

an event related to authorized use of network resources, and an event related to accounting functions.

3. The network system according to claim 1, further comprising a network control mechanism which informs said home server of an event that is detected therein, while supervising and managing the network.

4. The network system according to claim 3, wherein said service profile updating means in said home server obtains and distributes the new service profile in response to the event informed by said network control mechanism.

5. The network system according to claim 1, wherein said home server allocates said home agent when the user terminal initiates the communication session.

6. The network system according to claim 5, further comprising another foreign agent located within the second administrative domain, and which sends a service profile change request message to the user terminal's previous foreign agent when the user terminal has moved and registered with said another foreign agent.

7. The network system according to claim 5, further comprising:
    another foreign server which covers a third administrative domain, and
    another foreign agent which is located within the third administrative domain,
    wherein said home server sends a service profile change request message to both the user terminal's previous foreign server and said another foreign server when the user terminal has moved and registered with said another foreign agent.

8. The network system according to claim 1, wherein said foreign server allocates said home agent when the user terminal initiates the communication session.

9. The network system according to claim 8, further comprising another foreign agent which is located within the second administrative domain, and which sends a service profile change request message to the user terminal's previous foreign agent when the user terminal has moved and registered with said another foreign agent.

10. The network system according to claim 8, further comprising:
    another foreign server which is located in a third administrative domain, and
    another foreign agent which covers another foreign network within the third administrative domain,
    wherein said home server sends a service profile change request message to both the user terminal's previous foreign server and said another foreign server when the user terminal has moved and registered with said another foreign agent.

11. The network system according to claim 1, further comprising an address translation server which provides a service using predetermined address translation rules, wherein said service profile updating means in said home server produces and distributes the new service profile when an event related to the address translation rules occurs during the service.

* * * * *